(12) United States Patent
Schiffmann et al.

(10) Patent No.: US 12,013,829 B2
(45) Date of Patent: *Jun. 18, 2024

(54) MANIPULATION AND/OR ANALYSIS OF HIERARCHICAL DATA

(71) Applicant: Lower48 IP LLC, Dallas, TX (US)

(72) Inventors: Karl Schiffmann, Santa Barbara, CA (US); Jack J. LeTourneau, Ventura, CA (US); Mark Andrews, Pleasant Hill, CA (US)

(73) Assignee: Lower48 IP LLC, Dallas, TX (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/378,119

(22) Filed: Jul. 16, 2021

(65) Prior Publication Data

US 2022/0043793 A1 Feb. 10, 2022

Related U.S. Application Data

(63) Continuation of application No. 16/164,535, filed on Oct. 18, 2018, now Pat. No. 11,194,777, and a continuation of application No. 16/048,061, filed on Jul. 27, 2018, now Pat. No. 11,100,070, which is a continuation of application No. 14/968,429, filed on Dec. 14, 2015, now Pat. No. 10,055,438, which is a continuation of application No. 13/030,084, filed on Feb. 17, 2011, now Pat. No. 9,245,050, which is a continuation of application No. 11/412,417, filed on Apr. 26, 2006, now Pat. No. 7,899,821.

(60) Provisional application No. 60/675,987, filed on Apr. 29, 2005.

(51) Int. Cl.
*G06F 16/90* (2019.01)
*G06F 16/22* (2019.01)
*G06F 16/245* (2019.01)
*G06F 16/28* (2019.01)
*G06F 16/901* (2019.01)

(52) U.S. Cl.
CPC ........ *G06F 16/2246* (2019.01); *G06F 16/245* (2019.01); *G06F 16/282* (2019.01); *G06F 16/9027* (2019.01)

(58) Field of Classification Search
CPC .............. G06F 16/2246; G06F 16/245; G06F 16/282; G06F 16/9027
See application file for complete search history.

(56) References Cited

U.S. PATENT DOCUMENTS 3,201,701 A 8/1965 Maitra
3,704,345 A 11/1972 Cecil et al.
4,001,951 A 1/1977 Fasse
(Continued)

FOREIGN PATENT DOCUMENTS

WO 2004012083 A2 2/2004
WO WO 2004/012083 2/2004

OTHER PUBLICATIONS

"Core Technology Benchmarks a White Paper" (Jul. 2002), downloaded from the internet Mar. 2, 2004, 11 pages, Doc 2178.
(Continued)

*Primary Examiner* — Tarek Chbouki

(57) ABSTRACT

Embodiments of methods, apparatuses, devices and/or systems for manipulating hierarchical sets of data are disclosed. In particular, methods, apparatus devices and or/or systems for analyzing hierarchical data are disclosed.

25 Claims, 21 Drawing Sheets

(56) References Cited

U.S. PATENT DOCUMENTS

| | | |
|---|---|---|
| 4,134,218 A | 1/1979 | Adams et al. |
| 4,156,910 A | 5/1979 | Barton et al. |
| 4,286,330 A | 8/1981 | Isaacson |
| 4,439,162 A | 3/1984 | Blaine |
| 4,677,550 A | 6/1987 | Ferguson |
| 4,737,109 A | 4/1988 | Abramson |
| 4,745,561 A | 5/1988 | Hirosawa et al. |
| 4,751,684 A | 6/1988 | Holt |
| 4,831,525 A | 5/1989 | Saito et al. |
| 4,867,686 A | 9/1989 | Goldstein |
| 4,905,138 A | 2/1990 | Bourne |
| 4,916,655 A | 4/1990 | Ohsone et al. |
| 4,931,928 A | 6/1990 | Greenfeld |
| 4,949,388 A | 8/1990 | Bhaskaran |
| 4,989,132 A | 1/1991 | Mellender et al. |
| 4,991,087 A | 2/1991 | Burkowski et al. |
| 5,010,478 A | 4/1991 | Deran |
| 5,021,943 A | 6/1991 | Grimes |
| 5,021,992 A | 6/1991 | Kondo |
| 5,050,071 A | 9/1991 | Harris et al. |
| 5,136,593 A | 8/1992 | Moon et al. |
| 5,191,522 A | 3/1993 | Bosco et al. |
| 5,235,701 A | 8/1993 | Ohler et al. |
| 5,265,245 A | 11/1993 | Nordstrom et al. |
| 5,295,261 A | 3/1994 | Simonetti |
| 5,325,531 A | 6/1994 | McKeeman et al. |
| 5,335,320 A | 8/1994 | Iwata et al. |
| 5,335,345 A | 8/1994 | Frieder et al. |
| 5,355,496 A | 10/1994 | Fant et al. |
| 5,450,581 A | 9/1995 | Bergen et al. |
| 5,463,777 A | 10/1995 | Bialkowski et al. |
| 5,493,504 A | 2/1996 | Minato |
| 5,493,678 A | 2/1996 | Arcuri et al. |
| 5,497,500 A | 3/1996 | Rogers et al. |
| 5,509,088 A | 4/1996 | Robson |
| 5,511,159 A | 4/1996 | Baker et al. |
| 5,519,627 A | 5/1996 | Mahmood et al. |
| 5,522,068 A | 5/1996 | Berkowitz |
| 5,544,301 A | 8/1996 | Orton et al. |
| 5,548,755 A | 8/1996 | Leung et al. |
| 5,577,253 A | 11/1996 | Blickstein |
| 5,590,319 A | 12/1996 | Cohen et al. |
| 5,598,350 A | 1/1997 | Kawanishi et al. |
| 5,606,669 A | 2/1997 | Bertin et al. |
| 5,636,155 A | 6/1997 | Kabuo |
| 5,687,362 A | 11/1997 | Bhargava et al. |
| 5,701,461 A | 12/1997 | Dalal et al. |
| 5,706,406 A | 1/1998 | Pollock |
| 5,724,512 A | 3/1998 | Winterbottom |
| 5,724,576 A | 3/1998 | Letourneau |
| 5,742,806 A | 4/1998 | Reiner et al. |
| 5,745,892 A | 4/1998 | Miyata et al. |
| 5,748,975 A | 5/1998 | LeTourneau |
| 5,758,152 A | 5/1998 | Letourneau |
| 5,778,354 A | 7/1998 | Leslie et al. |
| 5,778,371 A | 7/1998 | Fujihara |
| 5,781,906 A | 7/1998 | Aggarwal et al. |
| 5,784,557 A | 7/1998 | Oprescu |
| 5,787,415 A | 7/1998 | Jacobson et al. |
| 5,787,432 A | 7/1998 | Letourneau |
| 5,796,356 A | 8/1998 | Okada et al. |
| 5,802,370 A | 9/1998 | Sitbon et al. |
| 5,822,593 A | 10/1998 | Lamping et al. |
| 5,826,262 A | 10/1998 | Bui et al. |
| 5,838,319 A | 11/1998 | Guzak et al. |
| 5,848,159 A | 12/1998 | Collins et al. |
| 5,905,138 A | 5/1999 | Van Broekhoven |
| 5,930,805 A | 7/1999 | Marquis |
| 5,937,181 A | 8/1999 | Godefroid et al. |
| 5,940,619 A | 8/1999 | Abadi |
| 5,960,425 A | 9/1999 | Buneman et al. |
| 5,970,490 A | 10/1999 | Morgenstern |
| 5,978,790 A | 11/1999 | Buneman et al. |
| 5,987,449 A | 11/1999 | Suciu |
| 5,999,926 A | 12/1999 | Suciu |
| 6,002,879 A | 12/1999 | Radigan et al. |
| 6,003,033 A | 12/1999 | Amano et al. |
| 6,022,879 A | 2/2000 | Crow et al. |
| 6,028,987 A | 2/2000 | Hirairi |
| 6,055,537 A | 4/2000 | Letourneau |
| 6,076,087 A | 6/2000 | Suciu |
| 6,088,691 A | 7/2000 | Bhargava et al. |
| 6,141,655 A | 10/2000 | Johnson et al. |
| 6,199,059 B1 | 3/2001 | Dahan et al. |
| 6,199,103 B1 | 3/2001 | Sakaguchi et al. |
| 6,224,477 B1 * | 5/2001 | Ho .................... H04W 8/18 455/433 |
| 6,236,410 B1 | 5/2001 | Politis et al. |
| 6,240,418 B1 | 5/2001 | Shadmon |
| 6,243,859 B1 | 6/2001 | Chen-Kuang |
| 6,272,495 B1 | 8/2001 | Hetherington |
| 6,279,007 B1 | 8/2001 | Uppala |
| 6,289,354 B1 | 9/2001 | Aggarwal et al. |
| 6,292,938 B1 | 9/2001 | Sarkar et al. |
| 6,314,559 B1 | 11/2001 | Sollich |
| 6,336,812 B1 | 1/2002 | Cooper et al. |
| 6,341,372 B1 | 1/2002 | Datig |
| 6,377,953 B1 | 4/2002 | Gawlick et al. |
| 6,411,957 B1 | 6/2002 | Dijkstra |
| 6,438,540 B2 | 8/2002 | Nasr et al. |
| 6,442,584 B1 | 8/2002 | Kolli et al. |
| 6,446,256 B1 | 9/2002 | Hyman et al. |
| 6,466,240 B1 | 10/2002 | Maslov |
| 6,480,857 B1 | 11/2002 | Chandler |
| 6,499,036 B1 | 12/2002 | Gurevich |
| 6,505,205 B1 | 1/2003 | Kothuri et al. |
| 6,542,899 B1 | 4/2003 | Saulpaugh et al. |
| 6,550,024 B1 | 4/2003 | Pagurek et al. |
| 6,556,983 B1 | 4/2003 | Altschuler et al. |
| 6,598,052 B1 | 7/2003 | Saulpaugh et al. |
| 6,598,502 B1 | 7/2003 | Rosa |
| 6,606,632 B1 | 8/2003 | Saulpaugh et al. |
| 6,606,741 B2 | 8/2003 | Kojima et al. |
| 6,609,130 B1 | 8/2003 | Saulpaugh et al. |
| 6,610,106 B1 | 8/2003 | Jenks |
| 6,611,844 B1 | 8/2003 | Saulpaugh et al. |
| 6,640,218 B1 | 10/2003 | Golding et al. |
| 6,654,734 B1 | 11/2003 | Mani et al. |
| 6,658,649 B1 | 12/2003 | Bates et al. |
| 6,665,664 B2 | 12/2003 | Paulley et al. |
| 6,687,734 B1 | 2/2004 | Sellink et al. |
| 6,691,301 B2 | 2/2004 | Bowen |
| 6,708,164 B1 | 3/2004 | Cseri et al. |
| 6,714,939 B2 | 3/2004 | Saldanha et al. |
| 6,728,953 B1 | 4/2004 | Walster |
| 6,742,054 B1 | 5/2004 | Upton, IV |
| 6,745,384 B1 | 6/2004 | Biggerstaff |
| 6,748,378 B1 | 6/2004 | Lavender et al. |
| 6,763,515 B1 | 7/2004 | Vazquez et al. |
| 6,785,673 B1 | 8/2004 | Fernandez et al. |
| 6,785,685 B2 | 8/2004 | Soetarman et al. |
| 6,795,868 B1 | 9/2004 | Dingman et al. |
| 6,804,677 B2 | 10/2004 | Shadmon et al. |
| 6,817,865 B2 | 11/2004 | Charbonneau |
| 6,829,695 B1 | 12/2004 | Ross |
| 6,847,979 B2 | 1/2005 | Allemang et al. |
| 6,854,976 B1 | 2/2005 | Suhr |
| 6,874,005 B2 | 3/2005 | Fortenberry et al. |
| 6,880,148 B1 | 4/2005 | Raph et al. |
| 6,941,511 B1 | 9/2005 | Hind et al. |
| 6,950,815 B2 | 9/2005 | Tijare |
| 6,965,990 B2 | 11/2005 | Barsness et al. |
| 6,968,330 B2 | 11/2005 | Edwards et al. |
| 6,978,271 B1 | 12/2005 | Hoffman et al. |
| 7,043,555 B1 | 5/2006 | McClain et al. |
| 7,051,033 B2 | 5/2006 | Agarwal et al. |
| 7,072,904 B2 | 7/2006 | Najork et al. |
| 7,103,838 B1 | 9/2006 | Krishnamurthy et al. |
| 7,107,265 B1 | 9/2006 | Calvignac et al. |
| 7,111,016 B2 | 9/2006 | Gurevich |
| 7,117,196 B2 | 10/2006 | Gaur et al. |
| 7,117,479 B2 | 10/2006 | Vanter |
| 7,120,645 B2 | 10/2006 | Manikutty et al. |
| 7,127,704 B2 | 10/2006 | Vanter et al. |

(56) References Cited

U.S. PATENT DOCUMENTS

| | | |
|---|---|---|
| 7,134,075 B2 | 11/2006 | Hind et al. |
| 7,139,765 B1 | 11/2006 | Balkany |
| 7,140,006 B2 | 11/2006 | Harrison, III et al. |
| 7,162,485 B2 | 1/2007 | Gottlob et al. |
| 7,167,856 B2 | 1/2007 | Lawder |
| 7,190,376 B1 | 3/2007 | Tonisson |
| 7,191,182 B2 | 3/2007 | Anonsen et al. |
| 7,203,680 B2 | 4/2007 | Parida |
| 7,203,774 B1 | 4/2007 | Zhou et al. |
| 7,210,097 B1 | 4/2007 | Clarke et al. |
| 7,225,183 B2 | 5/2007 | Gardner |
| 7,225,199 B1 | 5/2007 | Green et al. |
| 7,263,525 B2 | 8/2007 | Shin |
| 7,287,026 B2 | 10/2007 | Oommen |
| 7,313,563 B2 | 12/2007 | Bordawekar et al. |
| 7,318,066 B2 | 1/2008 | Kaufman et al. |
| 7,318,215 B1 | 1/2008 | Krishnan et al. |
| 7,337,163 B1 | 2/2008 | Srinivasan et al. |
| 7,356,802 B2 | 4/2008 | Sutter et al. |
| 7,360,202 B1 | 4/2008 | Seshadri et al. |
| 7,386,541 B2 | 6/2008 | Pal |
| 7,392,239 B2 | 6/2008 | Fontoura et al. |
| 7,403,940 B2 | 7/2008 | Narsude |
| 7,409,673 B2 | 8/2008 | Kuo et al. |
| 7,419,376 B2 | 9/2008 | Sarvazyan et al. |
| 7,421,648 B1 | 9/2008 | Davis |
| 7,437,666 B2 | 10/2008 | Ramarao et al. |
| 7,475,070 B2 | 1/2009 | Fan et al. |
| 7,478,100 B2 | 1/2009 | Murthy et al. |
| 7,493,305 B2 | 2/2009 | Thusoo et al. |
| 7,496,892 B2 | 2/2009 | Nuss |
| 7,512,932 B2 | 3/2009 | Davidov et al. |
| 7,536,675 B2 | 5/2009 | Gallagher |
| 7,536,676 B2 | 5/2009 | Baker et al. |
| 7,544,062 B1 | 6/2009 | Hauschild et al. |
| 7,561,927 B2 | 7/2009 | Oyama et al. |
| 7,571,156 B1 | 8/2009 | Gupta et al. |
| 7,571,169 B2 | 8/2009 | Jones et al. |
| 7,574,692 B2 | 8/2009 | Herscu |
| 7,575,434 B2 | 8/2009 | Palakodeti |
| 7,620,632 B2 | 11/2009 | Andrews |
| 7,627,591 B2 | 12/2009 | Letourneau |
| 7,630,995 B2 | 12/2009 | Letourneau |
| 7,636,727 B2 | 12/2009 | Schiffmann et al. |
| 7,650,592 B2 | 1/2010 | Eckels et al. |
| 7,669,183 B2 | 2/2010 | Bowman et al. |
| 7,681,177 B2 | 3/2010 | Letourneau |
| 7,685,137 B2 | 3/2010 | Liu et al. |
| 7,720,830 B2 | 5/2010 | Wen et al. |
| 7,761,847 B2 | 7/2010 | Kornerup et al. |
| 7,761,858 B2 | 7/2010 | Chang et al. |
| 7,765,183 B2 | 7/2010 | Williams, Jr. |
| 7,779,396 B2 | 8/2010 | Meijer et al. |
| 7,792,866 B2 | 9/2010 | Linden et al. |
| 7,801,923 B2 | 9/2010 | Letourneau |
| 7,809,758 B2 | 10/2010 | Thurnhofer |
| 7,827,523 B2 | 11/2010 | Ahmed et al. |
| 7,861,304 B1 | 12/2010 | Nachenberg et al. |
| 7,882,147 B2 | 2/2011 | Letourneau |
| 7,890,471 B2 | 2/2011 | Fan et al. |
| 7,890,927 B2 | 2/2011 | Eldridge et al. |
| 7,890,928 B2 | 2/2011 | Patrudu |
| 7,899,821 B1 | 3/2011 | Schiffmann et al. |
| 7,962,494 B2 | 6/2011 | Furusho |
| 8,005,869 B2 | 8/2011 | Corl, Jr. et al. |
| 8,020,145 B2 | 9/2011 | Fant |
| 8,032,828 B2 | 10/2011 | Su et al. |
| 8,032,860 B2 | 10/2011 | Piehler et al. |
| 8,037,102 B2 | 10/2011 | Letourneau |
| 8,060,868 B2 | 11/2011 | Meijer et al. |
| 8,086,998 B2 | 12/2011 | Bansal et al. |
| 8,112,740 B2 | 2/2012 | Meijer et al. |
| 8,151,276 B2 | 4/2012 | Grechanik et al. |
| 8,181,155 B2 | 5/2012 | Pinto et al. |
| 8,203,972 B2 | 6/2012 | Sauermann |
| 8,230,526 B2 | 7/2012 | Holland et al. |
| 8,250,526 B2 | 8/2012 | Anderson et al. |
| 8,290,977 B2 | 10/2012 | Chinchwadkar et al. |
| 8,307,102 B2 | 11/2012 | Skog |
| 8,316,059 B1 | 11/2012 | Schiffmann et al. |
| 8,321,478 B2 | 11/2012 | Fong |
| 8,332,428 B2 | 12/2012 | Bonneau et al. |
| 8,356,040 B2 | 1/2013 | Letourneau |
| 8,365,137 B2 | 1/2013 | Fant |
| 8,438,534 B2 | 5/2013 | Thomson et al. |
| 8,443,339 B2 | 5/2013 | Letourneau |
| 8,447,774 B1 | 5/2013 | Robie et al. |
| 8,458,191 B2 | 6/2013 | Bhattacharjee et al. |
| 8,484,236 B1 | 7/2013 | Andrews et al. |
| 8,606,794 B2 | 12/2013 | Amer-Yahia et al. |
| 8,612,461 B2 | 12/2013 | Schiffmann et al. |
| 8,615,530 B1 | 12/2013 | Letourneau |
| 8,626,777 B2 | 1/2014 | Letourneau |
| 8,645,346 B2 | 2/2014 | Dumitru et al. |
| 8,650,201 B2 | 2/2014 | Letourneau |
| 8,683,431 B2 | 3/2014 | Thomson et al. |
| 8,745,070 B2 | 6/2014 | Krishnamurthy et al. |
| 8,762,942 B2 | 6/2014 | Langworthy et al. |
| 8,868,621 B2 | 10/2014 | D'Onofrio et al. |
| 8,869,106 B2 | 10/2014 | Jazdzewski et al. |
| 8,930,896 B1 | 1/2015 | Wiggins |
| 8,935,232 B2 | 1/2015 | Abadi et al. |
| 8,990,769 B2 | 3/2015 | Letourneau |
| 9,002,862 B2 | 4/2015 | Schiffmann et al. |
| 9,015,202 B2 | 4/2015 | Letourneau |
| 9,020,961 B2 | 4/2015 | Letoruneau et al. |
| 9,043,347 B2 | 5/2015 | Letourneau |
| 9,077,515 B2 | 7/2015 | Letourneau |
| 9,167,579 B2 | 10/2015 | Fettweis et al. |
| 9,177,003 B2 | 11/2015 | Letourneau |
| 9,245,050 B2 | 1/2016 | Schiffmann et al. |
| 9,330,128 B2 | 5/2016 | Schiffmann et al. |
| 9,411,841 B2 | 8/2016 | Schiffmann et al. |
| 9,425,951 B2 | 8/2016 | Letourneau et al. |
| 9,430,512 B2 | 8/2016 | Letourneau |
| 9,563,653 B2 | 2/2017 | Letourneau et al. |
| 9,563,663 B2 | 2/2017 | Shukla et al. |
| 9,646,034 B2 | 5/2017 | Schiffmann et al. |
| 9,646,107 B2 | 5/2017 | Letourneau et al. |
| 9,842,130 B2 | 12/2017 | Schiffmann et al. |
| 10,055,438 B2 | 8/2018 | Schiffmann et al. |
| 10,068,003 B2 | 9/2018 | Letourneau |
| 10,140,349 B2 | 11/2018 | Letourneau |
| 10,255,311 B2 | 4/2019 | Letourneau |
| 10,275,489 B1 | 4/2019 | Reddy et al. |
| 10,325,031 B2 | 6/2019 | Letourneau |
| 10,380,039 B2 | 8/2019 | Cooray et al. |
| 10,380,089 B2 | 8/2019 | Letourneau |
| 10,394,785 B2 | 8/2019 | Letourneau |
| 10,411,878 B2 | 9/2019 | Letourneau |
| 10,437,886 B2 | 10/2019 | Andrews et al. |
| 10,713,274 B2 | 7/2020 | Letourneau |
| 10,725,989 B2 | 7/2020 | Schiffmann et al. |
| 10,733,234 B2 | 8/2020 | Letourneau |
| 11,100,070 B2 | 8/2021 | Schiffmann et al. |
| 11,100,137 B2 | 8/2021 | Letourneau |
| 11,194,777 B2 | 12/2021 | Schiffmann et al. |
| 11,204,906 B2 | 12/2021 | Letourneau |
| 11,243,975 B2 | 2/2022 | Letourneau |
| 11,663,238 B2 | 5/2023 | Letourneau |
| 2001/0003211 A1 | 6/2001 | Bera |
| 2001/0037496 A1 | 11/2001 | Simonyi |
| 2002/0023166 A1 | 2/2002 | Bar-Noy et al. |
| 2002/0040292 A1 | 4/2002 | Marcu |
| 2002/0059281 A1 | 5/2002 | Watanabe et al. |
| 2002/0062259 A1 | 5/2002 | Katz et al. |
| 2002/0091676 A1 | 7/2002 | Agrawal et al. |
| 2002/0107860 A1 | 8/2002 | Gobeille et al. |
| 2002/0129129 A1 | 9/2002 | Bloch et al. |
| 2002/0130796 A1 | 9/2002 | Tsuchido et al. |
| 2002/0130907 A1 | 9/2002 | Chi et al. |
| 2002/0133347 A1 | 9/2002 | Schoneburg et al. |
| 2002/0133497 A1 | 9/2002 | Draper et al. |
| 2002/0149604 A1 | 10/2002 | Wilkinson |

(56) References Cited

U.S. PATENT DOCUMENTS

| | | |
|---|---|---|
| 2002/0169563 A1 | 11/2002 | Ferreira |
| 2002/0194163 A1 | 12/2002 | Hopeman et al. |
| 2003/0041088 A1 | 2/2003 | Wilson et al. |
| 2003/0065659 A1 | 4/2003 | Agarwal et al. |
| 2003/0074436 A1 | 4/2003 | Gieseke |
| 2003/0115559 A1 | 6/2003 | Sawada |
| 2003/0130977 A1 | 7/2003 | Oommen |
| 2003/0149934 A1 | 8/2003 | Worden |
| 2003/0167445 A1 | 9/2003 | Su et al. |
| 2003/0195885 A1 | 10/2003 | Emmick et al. |
| 2003/0195890 A1 | 10/2003 | Oommen |
| 2003/0236787 A1 | 12/2003 | Burges |
| 2003/0236794 A1 | 12/2003 | Hostetter et al. |
| 2004/0003028 A1 | 1/2004 | Emmett et al. |
| 2004/0010752 A1 | 1/2004 | Chan et al. |
| 2004/0019599 A1* | 1/2004 | Trappen ............... G06F 16/284 707/999.102 |
| 2004/0024724 A1 | 2/2004 | Rubin |
| 2004/0024790 A1 | 2/2004 | Everett |
| 2004/0044659 A1 | 3/2004 | Judd et al. |
| 2004/0054692 A1 | 3/2004 | Seyrat et al. |
| 2004/0060006 A1 | 3/2004 | Lindblad et al. |
| 2004/0060007 A1 | 3/2004 | Gottlob et al. |
| 2004/0068498 A1 | 4/2004 | Patchet et al. |
| 2004/0073541 A1 | 4/2004 | Lindblad |
| 2004/0075677 A1 | 4/2004 | Loyall et al. |
| 2004/0103105 A1 | 5/2004 | Lindblad et al. |
| 2004/0122844 A1 | 6/2004 | Malloy et al. |
| 2004/0125124 A1 | 7/2004 | Kim et al. |
| 2004/0160464 A1 | 8/2004 | Reyna |
| 2004/0205047 A1* | 10/2004 | Carpenter ............ G06F 40/143 |
| 2004/0215642 A1 | 10/2004 | Cameron et al. |
| 2004/0239674 A1 | 12/2004 | Ewald et al. |
| 2004/0254909 A1 | 12/2004 | Testa |
| 2004/0260683 A1 | 12/2004 | Chan et al. |
| 2004/0260684 A1 | 12/2004 | Agrawal et al. |
| 2004/0267958 A1 | 12/2004 | Reed et al. |
| 2004/0268236 A1 | 12/2004 | Chidlovskii et al. |
| 2005/0021548 A1 | 1/2005 | Bohannon et al. |
| 2005/0021683 A1 | 1/2005 | Newton et al. |
| 2005/0023524 A1 | 2/2005 | Beatty |
| 2005/0027495 A1 | 2/2005 | Matichuk |
| 2005/0027743 A1 | 2/2005 | O'Neil et al. |
| 2005/0028091 A1 | 2/2005 | Bordawekar et al. |
| 2005/0050016 A1 | 3/2005 | Stanoi et al. |
| 2005/0050066 A1 | 3/2005 | Hughes |
| 2005/0055369 A1 | 3/2005 | Gorelik et al. |
| 2005/0058976 A1 | 3/2005 | Vernon |
| 2005/0060320 A1 | 3/2005 | Bostrom |
| 2005/0060332 A1 | 3/2005 | Bernstein |
| 2005/0065964 A1 | 3/2005 | Ziemann |
| 2005/0065965 A1 | 3/2005 | Ziemann |
| 2005/0097084 A1 | 5/2005 | Balmin |
| 2005/0102636 A1 | 5/2005 | McKeon |
| 2005/0125432 A1 | 6/2005 | Lin |
| 2005/0138073 A1 | 6/2005 | Zhou |
| 2005/0149471 A1 | 7/2005 | Lassalle |
| 2005/0154265 A1 | 7/2005 | Miro |
| 2005/0154979 A1 | 7/2005 | Chidlovskii |
| 2005/0156761 A1 | 7/2005 | Oh |
| 2005/0165732 A1 | 7/2005 | Burges |
| 2005/0171962 A1 | 8/2005 | Martin |
| 2005/0187900 A1 | 8/2005 | Letourneau |
| 2005/0195741 A1 | 9/2005 | Doshi |
| 2005/0210014 A1 | 9/2005 | Asano |
| 2005/0214727 A1 | 9/2005 | Stoianovici |
| 2005/0216445 A1 | 9/2005 | Rao |
| 2005/0267908 A1 | 12/2005 | Letourneau |
| 2005/0286788 A1 | 12/2005 | Orr |
| 2005/0289125 A1 | 12/2005 | Liu |
| 2006/0004817 A1 | 1/2006 | Andrews |
| 2006/0005122 A1 | 1/2006 | Lemoine |
| 2006/0015538 A1 | 1/2006 | Letourneau |
| 2006/0053122 A1 | 3/2006 | Korn |
| 2006/0074838 A1 | 4/2006 | Srivastava |
| 2006/0095442 A1 | 5/2006 | Letourneau |
| 2006/0095455 A1 | 5/2006 | LeTourneau |
| 2006/0123029 A1 | 6/2006 | LeTourneau |
| 2006/0129582 A1 | 6/2006 | Schiffmann et al. |
| 2006/0209351 A1 | 9/2006 | Saito |
| 2006/0259533 A1 | 11/2006 | LeTourneau |
| 2006/0271573 A1 | 11/2006 | LeTourneau |
| 2007/0003917 A1 | 1/2007 | Kitching et al. |
| 2007/0198538 A1 | 8/2007 | Palacios |
| 2008/0270435 A1 | 10/2008 | Furusho |
| 2008/0313196 A1 | 12/2008 | Furusho |
| 2010/0094885 A1 | 4/2010 | Andrews |
| 2010/0094908 A1 | 4/2010 | Letourneau |
| 2010/0114969 A1 | 5/2010 | Letourneau |
| 2010/0191775 A1 | 7/2010 | Schiffmann et al. |
| 2010/0205581 A1 | 8/2010 | Letourneau |
| 2010/0318521 A1 | 12/2010 | Letourneau |
| 2011/0131259 A1 | 6/2011 | Letourneau |
| 2011/0282898 A1 | 11/2011 | Schiffmann et al. |
| 2011/0320499 A1 | 12/2011 | Letourneau |
| 2012/0144388 A1 | 6/2012 | Kurian et al. |
| 2013/0151566 A1 | 6/2013 | Schiffmann et al. |
| 2013/0198239 A1 | 8/2013 | LeToruneau |
| 2014/0040293 A1 | 2/2014 | Letourneau |
| 2014/0184430 A1 | 7/2014 | Jiang et al. |
| 2014/0289266 A1 | 9/2014 | Letourneau |
| 2014/0289278 A1 | 9/2014 | Schiffmann et al. |
| 2014/0289279 A1 | 9/2014 | Letourneau |
| 2014/0362961 A1 | 12/2014 | Letourneau |
| 2015/0193517 A1 | 7/2015 | Letourneau |
| 2015/0220582 A1 | 8/2015 | Letourneau |
| 2015/0242449 A1 | 8/2015 | Schiffmann et al. |
| 2015/0242450 A1 | 8/2015 | Letourneau |
| 2015/0310048 A1 | 10/2015 | Letourneau |
| 2015/0341165 A1 | 11/2015 | Letourneau |
| 2016/0117353 A1 | 4/2016 | Schiffmann et al. |
| 2016/0162528 A1 | 6/2016 | Letourneau |
| 2016/0283611 A1 | 9/2016 | Schiffmann et al. |
| 2016/0328431 A1 | 11/2016 | Schiffmann et al. |
| 2016/0359616 A1 | 12/2016 | Letourneau |
| 2017/0032053 A1 | 2/2017 | Letourneau |
| 2017/0053006 A1 | 2/2017 | Letourneau |
| 2017/0132301 A1 | 5/2017 | Letourneau |
| 2017/0255660 A1 | 9/2017 | Schiffmann et al. |
| 2018/0107698 A1 | 4/2018 | Schiffmann et al. |
| 2019/0026326 A1 | 1/2019 | Schiffmann et al. |
| 2019/0034510 A1 | 1/2019 | Letourneau |
| 2019/0121795 A1 | 4/2019 | Schiffmann et al. |
| 2019/0129899 A1 | 5/2019 | Letourneau |
| 2019/0171628 A1 | 6/2019 | Letourneau |
| 2019/0236078 A1 | 8/2019 | Letourneau |
| 2019/0356465 A1 | 11/2019 | Letourneau |
| 2019/0377718 A1 | 12/2019 | Letourneau |
| 2019/0384753 A1 | 12/2019 | Letourneau |
| 2019/0384792 A1 | 12/2019 | Andrews et al. |
| 2020/0218707 A1 | 7/2020 | Letourneau |
| 2020/0372041 A1 | 11/2020 | Letourneau |
| 2020/0394168 A1 | 12/2020 | Schiffmann et al. |
| 2020/0394224 A1 | 12/2020 | Letourneau |
| 2021/0149860 A1 | 5/2021 | Letourneau |
| 2021/0349871 A1 | 11/2021 | Letourneau |
| 2022/0043793 A1 | 2/2022 | Letourneau |
| 2022/0043832 A1 | 2/2022 | Letourneau |

OTHER PUBLICATIONS

"Origin Data, Inc. White Paper"(1999) pp. 1-13, 14 pages, Doc 2179.

ACM Portal Search—"The Art of Computer Programming", Fundamental Algorithms, 1 (1973), ACM Portal Search Results conducted by Examiner on Jul. 18, 2009, 6 pages, Doc 2180.

ACM Portal Search—"The Associative Model of Data White Paper", Lazy Software (2000), ACM Portal Search Results conducted by Examiner on Jul. 18, 2009, 1 page, Doc 2181.

Alderson, "Toward an Optimization Driven Framework for Designing and Generating Realistic Internet Topologies", Journal of the Association for Computing Machinery SIGCOMM Computer Communications Review 41, 33(1) (2003) pp. 41-46, 6 pages, Doc 2182.

(56) References Cited

OTHER PUBLICATIONS

Apostol, "A Centennial History of the Prime No. Theorem", Engineering and Science, 4, (1996), 10 pages, Doc 2183.
Benedikt, "Definable Relations and First-Order Query Languages over Strings", Journal of the Journal of the Association for Computing Machinery, 50 (2003) pp. 694-751, 58 pages, Doc 2186.
Boppana, "Full Fault Dictionary Storage Based on Labeled Tree Encoding", 14th VLSI Test Symposium (1996) pp. 174-179, 6 pages, Doc 2185.
Borodin, "A Tradeoff Between Search and Update Time for the Implicit Dictionary Problem", Theoretical Computer Science, 1(4) (1990), pp. 425-447, 12 pages, Doc 2184.
Cano, "Lazy Evaluation in Penniless Propagation Over Join Trees", Networks, 39(4) (2002), pp. 175-185, 11 pages, Doc 2187.
Caviness, "Simplification of Radical Expressions", Journal of the Association for Computing Machinery (1976), pp. 329-338, 10 pages, Doc 2188.
Coenen, "T-Trees, Vertical Partitioning and Distributed Association Rule Mining", IEEE (2003), 4 pages, Doc 2191.
Cole—"Tree Pattern Matching and Subset Matching in Deterministic O(n log 3 n)-time", Proceedings of the Tenth Annual Association for Computing Machinery-SIAM Symposium on Discrete Algorithms, (1999) pp. 1-10, 10 pages, Doc 2189.
Cooper, "Oh! Pascal!", Arrays for Random Access (1982) pp. 295-327, 18 pages, Doc 2190.
Dubiner—"Faster Tree Pattern Matching", Journal of the Association for Computing Machinery, 41(2) (1994) pp. 205-213, 9 pages, Doc 2192.
Durango Bill's—"Enumeration of Trees", http://web.archive.org/web/20021028184112/http://www.durangobill.com/Trees.html (1998), 3 pages, Doc 2193.
Er, "Enumerating Ordered Trees Lexicographically", Computation Journal, 28 (1985) pp. 538-542, 5 pages, Doc 2194.
Ferragina, "The String B-Tree: A New Data Structure for String Search in External Memory and Its Applications", Journal of the Association for Computing Machinery, 46(2) (1999) pp. 236-280, 45 pages, Doc 2196.
Google search (Kleene prime number enumeration operation natural numerals sequences "Kleene prime") conducted by Examiner on Jul. 18, 2009, 2 pages, Doc 2195.
Google search (Kleene prime number enumeration operation natural numerals sequences "enumeration operation") conducted by Examiner on Jul. 18, 2009, 2 pages, Doc 2197.
Google search (Kleene prime enumeration operation) conducted by Examiner on Jul. 18, 2009, 2 pages, Doc 2198.
Hirschberg, "Algorithm for Computing Maximal Common Subsequences", Journal of the Association for Computing Machinery, 18(6) (1975) pp. 341-343, 3 pages, Doc 2199.
Hoffmann, "Pattern Matching in Trees" 29(1) (1982) pp. 68-95 28 page, Doc 2200.
Iacob, "Xpath Extension for Querying Concurrent XML Markup," Technical Report #TR-394-04, Department of Computer Science, University of Kentucky (2004), 15 pages, Doc 2201.
IEEE Explore Digital Library Search Result Conducted by Examiner on Jul. 18, 2009, 1 page, Doc 2202.
Johnston, "Advances in Dataflow Programming Languages", Journal of the Association for Computing Machinery Computing Surveys, 36 (2004) pp. 1-34, 34 pages, Doc 2203.
Katajainen, "Tree Compression and Optimization with Applications", International Journal of Foundations of Computer Science, 1(4) 1990, pp. 425-447, 24 pages, Doc 2204.
Kharbutli, "Using Prime Numbers for Cache Indexing to Eliminate Conflict Misses" North Carolina State University Dept. of Electronical and Computer Engineering (2004) 24 pages, Doc 2206.
Kilpelainen, "Tree Matching Problems with Applications to Structured Text Databases," University of Helsinki Ph. D. Dissertation, Report A-1992-6 (1992) pp. 1-109, 113 pages, Doc 2207.
Knuth—"The Art of Computer Programming", Fundamental Algorithms, 1 (1973), pp. 162-163, 3 pages, Doc 2208.
Krishna, "A VLSI Architecture for Object Recognition Using Tree Matching", IEEE International Conference on Application-Specific Systems, Architecture and Processors (2000), 78 pages, Doc 2226.
Leinonen, "Automation of Document Structure Transformations", University of Kuopio (2004) 68 pages, Doc 2209.
Lerman, "Learning the Common Structure of Data," American Association for Artificial Intelligence, AAAI-00 Proceedings (2000) 6 pages, Doc 2210.
Letourneau, "The Elementary Theory of Object Oriented Arithmetic" (1990) pp. 1-9, 9 pages, Doc 2211.
Malhotra "A Methodology for Formal Expression of Hierarchy in Model Solution", IEEE (1983) pp. 258-267, 10 pages, Doc 2244.
Navarro, "A Guided Tour to Approximate String Matching", Journal of the Association for Computing Machinery Computing Surveys, 33 (2001) pp. 31-88, 58 pages, Doc 2213.
Neven, "Expressive and Efficient Pattern Languages for Tree-Structured Data," Proceedings of the 19th Association for Computing Machinery SIGACT-SIGMOD-SIGART Symposium on Principles of Database Systems (2000), 12 pages, Doc 2216.
Prasad, "Efficient Bit-Parallel Multi-Patterns String Matching Algorithms for Limited Expression", Journal of the Association for Computing Machinery (2010) pp. 1-6, 6 pages, Doc 2217.
Ramesh—"Nonlinear Pattern Matching in Trees", Journal of the Association for Computer Machinery, 39 (1992) pp. 295-316, 22 pages, Doc 2218.
Reiss, "Semantics-Based Code Search", IEEE ICSE (2009) pp. 243-253, 11 pages, Doc 2219.
Schmidt, "Comparison of Tree and Graph Encodings as Function of Problem Complexity", Journal of the Association for Computing Machinery (2007) pp. 1674-1679, 6 pages, Doc 2221.
Sechrest, "Blending Hierarchical and Attribute-Based File Naming", Distributed Computing System of the 12th International Conference (1992), pp. 572-580, 9 pages, Doc 2222.
Shanmugasundaram, "Querying SML Views of Relational Data" 27th VLDB Conference (2001), 9 pages, Doc 2223.
Siegel, "All Searches Are Divided into Three Parts String Searches Using Ternary Trees", Journal of the Association for Computing Machinery (1988) pp. 57-68, 12 pages, Doc 2224.
Sinha, "Efficient Trie Based Sorting of Large Sets of Strings", Journal of the Association for Computing Machinery (2003) pp. 1-8, 8 pages, Doc 2225.
Smorynski, "Logical No. Theory 1: An Introduction", Springer-Verlag (1991) pp. 14-23, 305, 16 pages, Doc 2227.
Somani, "Phased-Mission System Analysis Using Boolean Algebraic Methods" 22(1) (1994), 10 pages, Doc 2228.
Spinellis, "Declarative Peephole Optimization Using String Pattern Matching", Journal of the Association for Computing Machinery (1999) pp. 47-51, 5 pages, Doc 2229.
Sproat, "Compilation of Weighted Finite-State Transducers from Decision Trees", Journal of the Association for Computing Machinery (1996) pp. 215-222, 8 pages, Doc 2230.
Stanat, "Discrete Mathematics in Computer Science," (1977) pp. 131-145, 16 pages, Doc 2231.
Talukdar, "Learning to Create Data-Integrating Queries", Journal of the Association for Computing Machinery PVLDB (2008) pp. 785-796, 12 pages, Doc 2232.
Thiemann, "Grammar Based Analysis of String Expressions", Journal of the Association for Computing Machinery (2005) pp. 59-70, 12 pages, Doc 2233.
Valiente, "Algorithms on Trees and Graphs", Tree Isomorphism (2002) pp. 151-251, 100 pages, Doc 2235.
Valiente, "Tree Isomorphism", Algorithms on Trees and Graphs (2002), 51 pages, Doc 2236.
Wagner, "The String-to-String Correction Problem", Journal of the Association for Computing Machinery, 21(1) (1974) pp. 168-173, 9 pages, Doc 2237.
Wu, "A Prime Number Labeling Scheme for Dynamic Ordered XML Trees", IEEE (2004) 13 pages, Doc 2238.
Xie, "S-Looper: Automatic Summarization for Multipath String Loops", Journal of the Association for Computing Machinery, (2015) pp. 188-198, 11 pages, Doc 2239.

(56) References Cited

OTHER PUBLICATIONS

Yates, "A New Approach to Text Searching", Communication of the Journal of the Association for Computing Machinery, 35(1) (1992) pp. 74-82, 9 pages, Doc 2240.

Zaks, "Lexicographic Generation of Ordered Trees," The Journal of Theoretical Computer Science, 10(1) (1980) pp. 63-82, 11 pages, Doc 2241.

Zhang, "B ed-Tree: An All-Purpose Index Structure for String Similarity Search Based on Edit Distance", ACM, pp. 915-926 (2010), Doc 2351.

U.S. Appl. No. 16/209,872: Issue Fee Payment and 312 Response filed Oct. 11, 2021, 14 pages, Doc 2357.

U.S. Appl. No. 16/209,872: Issue Notification dated Dec. 1, 2021, 1 page, Doc 2369.

U.S. Appl. No. 17/381,142: Notice of Publication dated Nov. 11, 2021, 1 page, Doc 2370.

U.S. Appl. No. 16/379,674: Notice of Allowance/Allowability dated Dec. 8, 2021, 28 pages, Doc 2367.

U.S. Appl. No. 16/909,899: Response to Non-final Office Action filed Nov. 11, 2021, 27 pages, Doc 2366.

U.S. Appl. No. 16/909,899: Non-Final Office Action dated Jan. 27, 2022, 27 pages, Doc 2371.

U.S. Appl. No. 16/459,930: Response to Non-final Office Action filed Oct. 12, 2021, 18 pages, Doc 2358.

U.S. Appl. No. 16/459,930: Notice of Allowance/Allowability dated Dec. 29, 2021, 8 pages, Doc 2372.

U.S. Appl. No. 16/513,021: Final Office Action dated Nov. 2, 2021, 37 pages, Doc 2359.

U.S. Appl. No. 16/513,021: Response to Final Office Action filed Feb. 2, 2022, 31 pages, Doc 2374.

U.S. Appl. No. 16/513,021: Advisory Action dated Feb. 22, 2022, pages, Doc 2375.

U.S. Appl. No. 15/464,205: Notice of Allowance/Allowability dated Oct. 29, 2021, 105 pages, Doc 2360.

U.S. Appl. No. 16/710,731: Final Office Action dated Nov. 2, 2021, 39 pages, Doc 2361.

U.S. Appl. No. 17/396,488: Response to Notice of Missing Parts and Preliminary Amendment filed Nov. 3, 2021, 95 pages, Doc 2365.

U.S. Appl. No. 17/396,488: Notice of Publication dated Feb. 10, 2022, 1 page, Doc 2381.

U.S. Appl. No. 16/898,134: Supplemental Notice of Allowability dateed Oct. 14, 2021, 23 pages, Doc 2362.

U.S. Appl. No. 16/898,134: Supplemental Notice of Allowability dated Oct. 20, 2021, 23 pages, Doc 2363.

U.S. Appl. No. 16/898,134: Issue Fee and 312 Response filed Dec. 22, 2021, 7 pages, Doc 2376.

U.S. Appl. No. 16/898,134: Issue Fee Notification dated Jan. 19, 2022, 1 page, Doc 2377.

U.S. Appl. No. 17/565,326, filed Dec. 29, 2021, 84 pages, Doc 2373.

U.S. Appl. No. 17/565,326: Filing Receipt date Jan. 13, 2022, 4 pages, Doc 2378.

U.S. Appl. No. 17/565,326: Notice of File Missing Parts dated Jan. 13, 2022, 2 pages, Doc 2379.

U.S. Appl. No. 16/164,535: Issue Notification dated Nov. 17, 2021, 1 page, Doc 2368.

U.S. Appl. No. 11/005,859, filed Dec. 6, 2004, 124 pages, Doc 1070.

U.S. Appl. No. 11/005,859: Notice to File Missing Parts, dated Jan. 10, 2022, 2 pages, Doc 1071.

U.S. Appl. No. 11/005,859: Response to Notice to File Missing Parts, dated Mar. 29, 2005, 9 pages, Doc 1072.

U.S. Appl. No. 11/005,859: Preliminary Amendment, dated Apr. 28, 2005, 193 pages, Doc 1073.

U.S. Appl. No. 11/005,859: Restriction Requirement, dated Dec. 12, 2007, 7 pages, Doc 1074.

U.S. Appl. No. 11/005,859: Response to Restriction Requirement, dated Jan. 14, 2008, 82 pages, Doc 1075.

U.S. Appl. No. 11/005,859: Office Action, dated Mar. 21, 2008, 21 pages, Doc 1076.

U.S. Appl. No. 11/005,859: Response to Office Action, dated Jul. 21, 2008, 89 pages, Doc 1077.

U.S. Appl. No. 11/005,859: Final Office Action, dated Oct. 30, 2008, 14 pages, Doc 1078.

U.S. Appl. No. 11/005,859: Response to Final Office Action, dated Dec. 30, 2008, 84 pages, Doc 1079.

U.S. Appl. No. 11/005,859: Advisory Action, dated Jan. 13, 2009, 3 pages, Doc 1080.

U.S. Appl. No. 11/005,859: RCE Amendment, dated Apr. 30, 2009, 88 pages, Doc 1081.

U.S. Appl. No. 11/005,859: Final Office Action, dated Jul. 8, 2009, 8 pages, Doc 1082.

U.S. Appl. No. 11/005,859: Interview Summary, dated Oct. 27, 2009, 3 pages, Doc 1083.

U.S. Appl. No. 11/005,859: Response to Final Office Action, dated Dec. 8, 2009, 85 pages, Doc 1084.

U.S. Appl. No. 11/005,859: Advisory Action, dated Dec. 22, 2009, 2 pages, Doc 1085.

U.S. Appl. No. 11/005,859: RCE Amendment, dated Jan. 7, 2010, 87 pages, Doc 1086.

U.S. Appl. No. 11/005,859: Office Action, dated Jan. 21, 2010, 17 pages, Doc 1087.

U.S. Appl. No. 11/005,859: Response to Office Action, dated Feb. 25, 2020, 85 pages, Doc 1088.

U.S. Appl. No. 11/005,859: Final Office Action, dated Jun. 8, 2010, 9 pages, Doc 1089.

U.S. Appl. No. 11/005,859: Response to Final Office Action, dated Sep. 1, 2010, 91 pages, Doc 1090.

U.S. Appl. No. 11/005,859: Advisory Action, dated Sep. 14, 2010, 7 pages, Doc 1091.

U.S. Appl. No. 11/005,859: Notice of Appeal, dated Sep. 29, 2010, 3 pages, Doc 1092.

U.S. Appl. No. 11/005,859: Office Action, dated Oct. 15, 2010, 5 pages, Doc 1093.

U.S. Appl. No. 11/005,859: Response to Office Action, dated Jan. 18, 2011, 97 pages, Doc 1094.

U.S. Appl. No. 11/005,859: Final Office Action, dated Mar. 30, 2011, 8 pages, Doc 1095.

U.S. Appl. No. 11/005,859: Proposed Examiner's Amendment, dated May 4, 2011, 4 pages, Doc 1096.

U.S. Appl. No. 11/005,859: Clarification of Examiner's Amendment, dated May 11, 2011, 4 pages, Doc 1097.

U.S. Appl. No. 11/005,859: Notice of Allowance, dated Jun. 9, 2011, 19 pages, Doc 1098.

U.S. Appl. No. 11/005,859: Issue Fee, dated Sep. 9, 2011, 6 pages, Doc 1099.

U.S. Appl. No. 11/005,859: Issue Notification, dated Sep. 21, 2011, 1 page, Doc 1100.

U.S. Appl. No. 13/229,624, filed Sep. 9, 2011, 137 pages, Doc 1101.

U.S. Appl. No. 13/229,624, Filing Receipt, dated Sep. 21, 2011, 3 pages, Doc 1102.

U.S. Appl. No. 13/229,624, Office Action, dated Nov. 23, 2011, 8 pages, Doc 1104.

U.S. Appl. No. 13/229,624, Notice of Publication, dated Dec. 29, 2011, 1 page, Doc 1103.

U.S. Appl. No. 13/229,624, Response to Office Action, dated Feb. 23, 2012, 24 pages, Doc 1105.

U.S. Appl. No. 13/229,624, Final Office Action, dated Mar. 20, 2012, 10 pages, Doc 1106.

U.S. Appl. No. 13/229,624, Response to Final Office Action, dated Jun. 13, 2012, 25 pages, Doc 1107.

U.S. Appl. No. 13/229,624, Advisory Action, dated Jun. 20, 2012, 3 pages, Doc 1108.

U.S. Appl. No. 13/229,624, RCE Amendment, dated Jul. 20, 2012, 28 pages, Doc 1109.

U.S. Appl. No. 13/229,624, Office Action, dated Oct. 2, 2013, 38 pages, Doc 1110.

U.S. Appl. No. 13/229,624, Response to Office Action, dated Dec. 27, 2013, 13 pages, Doc 1111.

U.S. Appl. No. 13/229,624, Office Action, dated Apr. 4, 2014, 9 pages, Doc 1112.

U.S. Appl. No. 13/229,624, Response to Office Action, dated Aug. 1, 2014, 11 pages, Doc 1113.

(56) References Cited

OTHER PUBLICATIONS

U.S. Appl. No. 13/229,624, Final Office Action, dated Oct. 30, 2014, 9 pages, Doc 1114.
U.S. Appl. No. 13/229,624, Response to Final Office Action, dated Jan. 30, 2015, 13 pages, Doc 1115.
U.S. Appl. No. 13/229,624, Advisory Action, dated Mar. 11, 2015, 3 pages, Doc 1116.
U.S. Appl. No. 13/229,624, Interview Summary, dated Mar. 19, 2015, 3 pages, Doc 1117.
U.S. Appl. No. 13/229,624, Interview Summary, dated Mar. 27, 2015, 4 pages, Doc 1118.
U.S. Appl. No. 13/229,624, Response to Advisory Action & Final Office Action, dated Mar. 27, 2015, 18 pages, Doc 1119.
U.S. Appl. No. 13/229,624, Advisory Action, dated Apr. 15, 2015, 6 pages, Doc 1120.
U.S. Appl. No. 13/229,624, RCE Amendment, dated Apr. 27, 2015, 19 pages, Doc 1121.
U.S. Appl. No. 13/229,624, Notice of Allowance, dated Jul. 6, 2015, 10 pages, Doc 1122.
U.S. Appl. No. 13/229,624, Issue Fee, dated Sep. 28, 2015, 6 pages, Doc 1123.
U.S. Appl. No. 13/229,624, Issue Notification, dated Oct. 14, 2015, 1 page, Doc 1124.
U.S. Appl. No. 14/870,744, filed Sep. 30, 2015, 131 pages, Doc 1125.
U.S. Appl. No. 14/870,744, Preliminary Amendment, dated Oct. 6, 2015, 12 pages, Doc 1128.
U.S. Appl. No. 14/870,744, Filing Receipt & Notice to File Missing Parts, dated Oct. 16, 2015, 5 pages, Doc 1126.
U.S. Appl. No. 14/870,744, Response to Notice to File Missing Parts, dated Feb. 19, 2016, 6 pages, Doc 1129.
U.S. Appl. No. 14/870,744, Updated Filing Receipt & Informational Notice, dated Mar. 2, 2016, 4 pages, Doc 1130.
U.S. Appl. No. 14/870,744, Notice of Publication, dated Jun. 9, 2016, 1 page, Doc 1127.
U.S. Appl. No. 14/870,744, Response to Informational Notice, dated Jun. 22, 2016, 5 pages, Doc 1131.
U.S. Appl. No. 14/870,744, Office Action, dated Aug. 24, 2017, 58 pages, Doc 1132.
U.S. Appl. No. 14/870,744, Response to Office Action, dated Nov. 24, 2017, 32 pages, Doc 1133.
U.S. Appl. No. 14/870,744, Final Office Action, dated Mar. 30, 2018, 30 pages, Doc 1134.
U.S. Appl. No. 14/870,744, Response to Final Office Action, dated May 30, 2018, 35 pages, Doc 1135.
U.S. Appl. No. 14/870,744, Advisory Action, dated Jul. 3, 2018, 7 pages, Doc 1136.
U.S. Appl. No. 14/870,744, RCE Amendment, dated Jul. 27, 2018, 35 pages, Doc 1137.
U.S. Appl. No. 14/870,744, Notice of Allowance, dated Sep. 6, 2018, 11 pages, Doc 1138.
U.S. Appl. No. 14/870,744, Issue Fee, dated Dec. 4, 2018, 21 pages, Doc 1139.
U.S. Appl. No. 14/870,744, Interview Summary, dated Mar. 8, 2019, 2 pages, Doc 1140.
U.S. Appl. No. 14/870,744, Issue Notification, dated Mar. 20, 2019, 1 page, Doc 1141.
U.S. Appl. No. 16/209,872, filed Dec. 4, 2018, 134 pages, Doc 1142.
U.S. Appl. No. 16/209,872, Filing Receipt & Notice to File Missing Parts, dated Dec. 28, 2018, 5 pages, Doc 1143.
U.S. Appl. No. 16/209,872, Preliminary Amendment and Response to Notice to File Missing Parts, dated Feb. 21, 2019, 20 pages, Doc 1145.
U.S. Appl. No. 16/209,872, Update Filing Receipt, Feb. 26, 2019, 3 pages, Doc 1146.
U.S. Appl. No. 16/209,872, Notice of Publication, dated Jun. 6, 2019, 1 page, Doc 1144.
U.S. Appl. No. 16/209,872, Office Action, dated Sep. 17, 2020, 63 pages, Doc 2155.
U.S. Appl. No. 16/209,872, Response to Office Action, dated Sep. 17, 2020, 63 pages, Doc 2156.
U.S. Appl. No. 16/209,872, Terminal Disclaimer, Sep. 17, 2020, 6 pages, Doc 2157.
U.S. Appl. No. 16/209,872: Notice of Allowance and Allowability dated Mar. 26, 2021, 17 pages, Doc 2171.
U.S. Appl. No. 16/209,872: 312 Amendment After filed Apr. 30, 2021, 11 pages, Doc 2245.
U.S. Appl. No. 16/209,872: Response to 312 Amendment dated Jun. 10, 2021, 4 pages, Doc 2297.
U.S. Appl. No. 16/209,872: Request for Continued Examination and Amendment filed Jun. 25, 2021, 17 pages, Doc 2299.
U.S. Appl. No. 16/209,872: Notice of Allowance/Allowability dated Jul. 13, 2021, 12 pages, Doc 2314.
U.S. Appl. No. 16/820,457, Application and Preliminary Amendment filed Mar. 16, 2020, 148 pages, Doc 1147.
U.S. Appl. No. 16/820,457, Filing Receipt, Mar. 31, 2020, 3 pages, Doc 1148.
U.S. Appl. No. 16/820,457, Notice of Publication, dated Jul. 9, 2020, 1 page, Doc 1149.
U.S. Appl. No. 16/820,457, Supplemental Preliminary Amendment filed Jul. 30, 2021, 17 pages, Doc 2315.
U.S. Appl. No. 17/158,804: Patent Application filed Jan. 26, 2021, 146 pages, Doc 2158.
U.S. Appl. No. 17/158,804: Filing Receipt dated Feb. 9, 2021, 5 pages, Doc 2172.
U.S. Appl. No. 17/158,804: Notice of Publication dated Feb. 9, 2021, 1 page, Doc 2246.
U.S. Appl. No. 17/158,804: Supplemental Preliminary Amendment filed Jul. 30, 2021, 14 pages, Doc 2316.
U.S. Appl. No. 17/381,142: Patent Application and Preliminary Amendment filed Jul. 20, 2021, 146 pages, Doc 2317.
U.S. Appl. No. 17/381,142: Filing Receipt dated Aug. 3, 2021, 4 pages, Doc 2318.
U.S. Appl. No. 11/007,139, Application filed Dec. 7, 2004, 90 pages, Doc 1152.
U.S. Appl. No. 11/007,139, Notice to File Missing Parts dated Jan. 19, 2005, 2 pages, Doc 1153.
U.S. Appl. No. 11/007,139, Response to Notice to File Missing Parts dated Mar. 29, 2005, 9 pages, Doc 1154.
U.S. Appl. No. 11/007,139, Preliminary Amendment dated Apr. 28, 2005, 146 pages, Doc 1155.
U.S. Appl. No. 11/007,139, Office Action, dated May 14, 2007, 2 pages, Doc 1156.
U.S. Appl. No. 11/007,139, Response to Office Action dated Oct. 15, 2007, 29 pages, Doc 1157.
U.S. Appl. No. 11/007,139, Supplemental Amendment dated Oct. 17, 2007, 6 pages, Doc 1158.
U.S. Appl. No. 11/007,139, Office Action dated Jan. 2, 2008, 15 pages, Doc 1159.
U.S. Appl. No. 11/007,139, Response to Office Action dated Apr. 2, 2008, 29 pages, Doc 1160.
U.S. Appl. No. 11/007,139, Final Office Action dated Aug. 15, 2008, 22 pages, Doc 1161.
U.S. Appl. No. 11/007,139, Response to Final Office Action dated Oct. 15, 2008, 25 pages, Doc 1162.
U.S. Appl. No. 11/007,139, Advisory Action dated Oct. 22, 2008, 3 pages, Doc 1163.
U.S. Appl. No. 11/007,139, RCE Amendment dated Nov. 14, 2008, 29 pages, Doc 1164.
U.S. Appl. No. 11/007,139, Office Action, dated Dec. 8, 2008, 17 pages, Doc 1165.
U.S. Appl. No. 11/007,139, Response to Office Action dated May 8, 2009, 28 pages, Doc 1166.
U.S. Appl. No. 11/007,139, Final Office Action dated Aug. 4, 2009, 18 pages, Doc 1167.
U.S. Appl. No. 11/007,139, Response to Final Office Action dated Dec. 4, 2009, 25 pages, Doc 1168.
U.S. Appl. No. 11/007,139, Advisory Action dated Dec. 14, 2009, 3 pages, Doc 1169.
U.S. Appl. No. 11/007,139, RCE Amendment dated Jan. 4, 2010, 3 pages, Doc 1170.

(56) References Cited

OTHER PUBLICATIONS

U.S. Appl. No. 11/007,139, Office Action dated Jan. 27, 2010, 31 pages, Doc 1171.
U.S. Appl. No. 11/007,139, Response to Office Action dated Apr. 27, 2010, 30 pages, Doc 1172.
U.S. Appl. No. 11/007,139, Final Office Action dated Jul. 20, 2010, 22 pages, Doc 1173.
U.S. Appl. No. 11/007,139, Response to Final Office Action dated Oct. 20, 2010, 35 pages, Doc 1174.
U.S. Appl. No. 11/007,139, Advisory Action dated Oct. 25, 2010, 2 pages, Doc 1175.
U.S. Appl. No. 11/007,139, Response to Final Office Action and Advisory Action dated Nov. 18, 2010, 26 pages, Doc 1176.
U.S. Appl. No. 11/007,139, Advisory Action dated Dec. 1, 2010, 4 pages, Doc 1177.
U.S. Appl. No. 11/007,139, Notice of Appeal dated Dec. 20, 2010, 3 pages, Doc 1178.
U.S. Appl. No. 11/007,139, Response to Final Office Action and Advisory Action, dated Dec. 20, 2010, 30 pages, Doc 1179.
U.S. Appl. No. 11/007,139, Office Action dated Jan. 3, 2011, 24 pages, Doc 1180.
U.S. Appl. No. 11/007,139, Response to Office Action dated May 3, 2011, 29 pages, Doc 1181.
U.S. Appl. No. 11/007,139, Final Office Action dated Jul. 18, 2011, 23 pages, Doc 1182.
U.S. Appl. No. 11/007,139, Response to Final Office Action dated Oct. 18, 2011, 32 pages, Doc 1183.
U.S. Appl. No. 11/007,139, Advisory Office Action dated Nov. 4, 2011, 12 pages, Doc 1184.
U.S. Appl. No. 11/007,139, Notice of Appeal dated Nov. 16, 2011, 4 pages, Doc 1185.
U.S. Appl. No. 11/007,139, Appeal Brief dated May 1, 2012, 91 pages, Doc 1186.
U.S. Appl. No. 11/007,139, Notice of Non-Compliant Appeal Brief dated May 7, 2012, 3 pages, Doc 1187.
U.S. Appl. No. 11/007,139, Response to Notice of Non-Compliant Appeal Brief dated May 15, 2012, 9 pages, Doc 1188.
U.S. Appl. No. 11/007,139, Examiner's Answer dated Aug. 20, 2012, 35 pages, Doc 1189.
U.S. Appl. No. 11/007,139, Reply Brief dated Oct. 22, 2012, 29 pages, Doc 1190.
U.S. Appl. No. 11/007,139, Patent Trial and Appeal Board Docketing Notice dated Nov. 6, 2012, 2 pages, Doc 1191.
U.S. Appl. No. 11/007,139, Decision on Appeal dated Jul. 24, 2015, 8 pages, Doc 1192.
U.S. Appl. No. 11/007,139, RCE and Amendment dated Aug. 19, 2015, 21 pages, Doc 1193.
U.S. Appl. No. 11/007,139, Office Action dated Dec. 31, 2015, 24 pages, Doc 1194.
U.S. Appl. No. 11/007,139, Response to Office Action dated Mar. 28, 2016, 21 pages, Doc 1195.
U.S. Appl. No. 11/007,139, Final Office Action dated Jun. 20, 2016, 13 pages, Doc 1196.
U.S. Appl. No. 11/007,139, Response to Final Office Action dated Jul. 29, 2016, 19 pages, Doc 1197.
U.S. Appl. No. 11/007,139, Notice of Allowance dated Aug. 23, 2016, 12 pages, Doc 1198.
U.S. Appl. No. 11/007,139, Corrected Filing Receipt, Sep. 2, 2016, 3 pages, Doc 1199.
U.S. Appl. No. 11/007,139, Application Data Sheet dated Oct. 24, 2016, 10 pages, Doc 1200.
U.S. Appl. No. 11/007,139, Notice of Allowance dated Dec. 29, 2016, 14 pages, Doc 1201.
U.S. Appl. No. 11/007,139, Issue Fee dated Mar. 23, 2017, 6 pages, Doc 1202.
U.S. Appl. No. 11/007,139, Issue Notification dated Apr. 19, 2017, 1 page, Doc 1203.
U.S. Appl. No. 15/043,267, Application dated Feb. 12, 2016, 104 pages, Doc 1204.
U.S. Appl. No. 15/043,267, Filing Receipt dated Mar. 7, 2016, 3 pages, Doc 1205.
U.S. Appl. No. 15/043,267, Informational Notice dated Mar. 7, 2016, 1 page, Doc 1206.
U.S. Appl. No. 15/043,267, Request to Submit Priority Claim and Preliminary Amendment dated Jun. 10, 2016, 11 pages, Doc 1208.
U.S. Appl. No. 15/043,267, Response to Informational Notice dated Oct. 14, 2016, 5 pages, Doc 1209.
U.S. Appl. No. 15/043,267, Corrected Filing Receipt dated Oct. 25, 2016, 3 pages, Doc 1211.
U.S. Appl. No. 15/043,267, Notice of Publication dated Feb. 2, 2017, 1 page, Doc 1207.
U.S. Appl. No. 15/043,267, Office Action dated Apr. 2, 2019, 80 pages, Doc 1210.
U.S. Appl. No. 15/043,267, Response to Office Action dated Jul. 2, 2019, 24 pages, Doc 1212.
U.S. Appl. No. 15/043,267, Final Office Action dated Oct. 18, 2019, 14 pages, Doc 1213.
U.S. Appl. No. 15/043,267, Response to Final Office Action dated Jan. 21, 2020, 20 pages, Doc 1214.
U.S. Appl. No. 15/043,267, Advisory Action dated Jan. 29, 2020, 12 pages, Doc 1215.
U.S. Appl. No. 15/043,267, RCE Amendment dated Mar. 3, 2020, 21 pages, Doc 1216.
U.S. Appl. No. 15/043,267, Notice of Allowance dated Mar. 23, 2020, 9 pages, Doc 1217.
U.S. Appl. No. 15/043,267, Issue Fee Payment, dated Jun. 23, 2020, 18 pages, Doc 1218.
U.S. Appl. No. 15/043,267, Issue Notification dated Jul. 15, 2020, 1 page, Doc 1219.
U.S. Appl. No. 16/911,282, Application filed Jun. 24, 2020, 98 pages, Doc 1220.
U.S. Appl. No. 16/911,282, Filing Receipt and Notice to File Missing Parts dated Jul. 7, 2020, 7 pages, Doc 1221.
U.S. Appl. No. 16/911,282, Preliminary Amendment and Response to Notice to File Missing Parts filed Sep. 8, 2020, 18 pages, Doc 2145.
U.S. Appl. No. 16/911,282, Updated Filing Receipt dated Sep. 10, 2020, 5 pages, Doc 2146.
U.S. Appl. No. 16/911,282, Notice of Publication dated Dec. 17, 2020, 1 page, Doc 2159.
U.S. Appl. No. 11/006,320, filed Dec. 6, 2004, 75 pages, Doc 1223.
U.S. Appl. No. 11/006,320, Notice to File Missing Parts dated Feb. 7, 2005, 2 pages, Doc 1224.
U.S. Appl. No. 11/006,320, Response to Notice to File Missing Parts dated May 6, 2005, 140 pages, Doc 1225.
U.S. Appl. No. 11/006,320, Notice of Publication dated Jan. 19, 2006, 1 page, Doc 1226.
U.S. Appl. No. 11/006,320, Restriction Requirement dated Mar. 26, 2007, 6 pages, Doc 1227.
U.S. Appl. No. 11/006,320, Response to Restriction Requirement dated Apr. 27, 2007, 32 pages, Doc 1228.
U.S. Appl. No. 11/006,320, Notice of Non-Compliant Amendment dated Jul. 6, 2007, 3 pages, Doc 1229.
U.S. Appl. No. 11/006,320, Response to Notice of Non-Compliant Amendment dated Jul. 25, 2007, 32 pages, Doc 1230.
U.S. Appl. No. 11/006,320, Office Action dated Oct. 1, 2007, 19 pages, Doc 1231.
U.S. Appl. No. 11/006,320, Response to Office Action dated Jan. 29, 2008, 42 pages, Doc 1232.
U.S. Appl. No. 11/006,320, Notice of Non-Compliant Amendment dated Apr. 8, 2008, 4 pages, Doc 1233.
U.S. Appl. No. 11/006,320, Response to Notice of Non-Compliant Amendment dated May 5, 2008, 43 pages, Doc 1234.
U.S. Appl. No. 11/006,320, Office Action dated Aug. 15, 2008, 28 pages, Doc 1235.
U.S. Appl. No. 11/006,320, Response to Office Action dated Nov. 14, 2008, 39 pages, Doc 1236.
U.S. Appl. No. 11/006,320, Office Communication dated Jan. 27, 2009, 2 pages, Doc 1237.
U.S. Appl. No. 11/006,320, Response to Office Communication dated Apr. 27, 2009, 43 pages, Doc 1238.

(56) References Cited

OTHER PUBLICATIONS

U.S. Appl. No. 11/006,320, Final Office Action dated Jul. 29, 2009, 7 pages, Doc 1239.
U.S. Appl. No. 11/006,320, Response to Final Office Action dated Nov. 30, 2009, 8 pages, Doc 1240.
U.S. Appl. No. 11/006,320, Office Action, dated Dec. 4, 2009, 12 pages, Doc 1241.
U.S. Appl. No. 11/006,320, Response to Office Action filed Feb. 23, 2010, 11 pages, Doc 1242.
U.S. Appl. No. 11/006,320, Response to Final Office Action dated May 24, 2010, 11 pages, Doc 1243.
U.S. Appl. No. 11/006,320, Response to Final Office Action filed Aug. 24, 2010, 17 pages, Doc 1244.
U.S. Appl. No. 11/006,320, Notice of Allowance dated Sep. 17, 2010, 18 pages, Doc 1245.
U.S. Appl. No. 11/006,320, Issue Fee dated Dec. 17, 2010, 12 pages, Doc 1246.
U.S. Appl. No. 11/006,320, Issue Notification dated Jan. 12, 2011, 1 page, Doc 1247.
U.S. Appl. No. 12/972,326: Application filed Dec. 17, 2010, 76 pages, Doc 2247.
U.S. Appl. No. 12/972,326: Filing Receipt and Notice to File Missing Parts dated Jan. 6, 2011, 5 pages, Doc 2248.
U.S. Appl. No. 12/972,326: Preliminary Amendment and Response to Notice to File Missing Parts dated Jan. 26, 2011, 16 pages, Doc 2249.
U.S. Appl. No. 12/972,326: Preliminary Amendment filed May 20, 2011, 17 pages, Doc 2250.
U.S. Appl. No. 12/972,326: Notice of Non-compliant Amendment dated Jun. 2, 2011, 2 pages, Doc 2251.
U.S. Appl. No. 12/972,326: Notice of Publication dated Jun. 2, 2011, 1 page, Doc 2252.
U.S. Appl. No. 12/972,326: Substitute Preliminary Amendment filed Jul. 5, 2011, 23 pages, Doc 2253.
U.S. Appl. No. 12/972,326: Preliminary Amendment filed Aug. 10, 2011, 9 pages, Doc 2254.
U.S. Appl. No. 12/972,326: Non-final Office Action dated Feb. 23, 2011, 9 pages, Doc 2255.
U.S. Appl. No. 12/972,326: Advisory Action dated Jun. 26, 2012, 3 pages, Doc 2256.
U.S. Appl. No. 12/972,326: Notice of Abandonment dated Sep. 18, 2012, 2 pages, Doc 2257.
U.S. Appl. No. 11/006,848: Application filed Dec. 7, 2004, 61 pages, Doc 1249.
U.S. Appl. No. 11/006,848: Notice to File Missing Parts dated Mar. 18, 2005, 2 pages, Doc 1250.
U.S. Appl. No. 11/006,848: Response to Notice to File Missing Parts dated Apr. 28, 2005, 101 pages, Doc 1251.
U.S. Appl. No. 11/006,848: Office Action dated Apr. 4, 2007, 38 pages, Doc 1252.
U.S. Appl. No. 11/006,848: Response to Office Action filed Oct. 3, 2007, 22 pages, Doc 1253.
U.S. Appl. No. 11/006,848: Supplemental Amendment filed Nov. 13, 2007, 6 pages, Doc 1254.
U.S. Appl. No. 11/006,848: Office Action dated Feb. 5, 2008, 47 pages, Doc 1255.
U.S. Appl. No. 11/006,848: Response to Office Action dated Aug. 4, 2008, 30 pages, Doc 1256.
U.S. Appl. No. 11/006,848: Final Office Action dated Dec. 2, 2008, 30 pages, Doc 1257.
U.S. Appl. No. 11/006,848: RCE and Amendment filed May 4, 2009, 26 pages, Doc 1258.
U.S. Appl. No. 11/006,848: Notice of Allowance dated Jun. 11, 2009, 8 pages, Doc 1259.
U.S. Appl. No. 11/006,848: Issue Fee Payment filed Sep. 11, 2009, 16 pages, Doc 1260.
U.S. Appl. No. 11/006,848: Issue Notification dated 10/28/009, 1 page, Doc 1261.
U.S. Appl. No. 11/006,848: Request to Correct Inventorship and for a Certificate of Correction filed Sep. 12, 2016, 14 pages, Doc 1262.
U.S. Appl. No. 11/006,848: Certificate of Correction dated Aug. 8, 2017, 1 page, Doc 1263.
U.S. Appl. No. 12/573,829: Patent Application filed Oct. 5, 2009, 67 pages, Doc 1264.
U.S. Appl. No. 12/573,829: Notice to File Missing Parts Oct. 20, 2009, 2 pages, Doc 1265.
U.S. Appl. No. 12/573,829: Filing Receipt Oct. 20, 2009, 3 pages, Doc 1266.
U.S. Appl. No. 12/573,829: Preliminary Amendment filed Dec. 21, 2009, 17 pages, Doc 1267.
U.S. Appl. No. 12/573,829: Filing Receipt Jan. 4, 2010, 3 pages, Doc 1268.
U.S. Appl. No. 12/573,829: Notice of Publication Apr. 15, 20, 1 page, Doc 1269.
U.S. Appl. No. 12/573,829: Non-Final Rejection dated Jun. 28, 2010, 49 pages, Doc 1271.
U.S. Appl. No. 12/573,829: Amendment/Request for Reconsideration After Non-Final Rejection filed Sep. 28, 2010, 25 pages, Doc 1273.
U.S. Appl. No. 12/573,829: Final Office Action dated Nov. 1, 2010, 53 pages, Doc 1274.
U.S. Appl. No. 12/573,829: Response After Final Action filed Jan. 3, 2011, 32 pages, Doc 1275.
U.S. Appl. No. 12/573,829: Advisory Action Jan. 7, 2011, 3 pages, Doc 1276.
U.S. Appl. No. 12/573,829: Notice of Appeal filed Jan. 11, 2011, 5 pages, Doc 1277.
U.S. Appl. No. 12/573,829: Appeal Brief filed May 4, 2011, 72 pages, Doc 1278.
U.S. Appl. No. 12/573,829: Examiner's Answer to Appeal Brief, 31 pages, Doc 1279.
U.S. Appl. No. 12/573,829: Reply Brief filed Sep. 21, 2011, 19 pages, Doc 1280.
U.S. Appl. No. 12/573,829: Reply Brief Noted—Patent Board Oct. 5, 2011, 2 pages, Doc 1281.
U.S. Appl. No. 12/573,829: Appeal Docketing Notice Oct. 11, 2011, 2 pages, Doc 1282.
U.S. Appl. No. 12/573,829: Patent Board Decision—Examiner Affirmed May 9, 2014, 10 pages, Doc 1284.
U.S. Appl. No. 12/573,829: Request for Continued Examination filed Jul. 9, 2014, 25 pages, Doc 1285.
U.S. Appl. No. 12/573,829: Non-Final Office Action dated Apr. 28, 2015, 52 pages, Doc 1288.
U.S. Appl. No. 12/573,829: Request for Consideration after Non-Final Rejection filed Jul. 27, 2015, 24 pages, Doc 1289.
U.S. Appl. No. 12/573,829: Final Rejection dated Sep. 15, 2015, 24 pages, Doc 1291.
U.S. Appl. No. 12/573,829: Response After Final Action filed Nov. 16, 2015, 21 pages, Doc 1293.
U.S. Appl. No. 12/573,829: Advisory Action dated Dec. 2, 2015, 4 pages, Doc 1294.
U.S. Appl. No. 12/573,829: Request for Continued Examination filed Dec. 14, 2015, 24 pages, Doc 1295.
U.S. Appl. No. 12/573,829: Non-Final Rejection dated Jun. 13, 2016, 25 pages, Doc 1297.
U.S. Appl. No. 12/573,829: Request for Corrected Filing Receipt to Correct Inventorship filed Sep. 13, 2016, 30 pages, Doc 1298.
U.S. Appl. No. 12/573,829: Updated Filing Receipt and Notice of Acceptance of Request to Correct Inventorship dated Sep. 15, 2016, 5 pages, Doc 1299
U.S. Appl. No. 12/573,829: Non-Final Rejection dated Dec. 16, 2016, 21 pages, Doc 1300.
U.S. Appl. No. 12/573,829: Final Request for Reconsideration After Non-Final Request filed Mar. 16, 2017, 21 pages, Doc 1301.
U.S. Appl. No. 12/573,829: Final Rejection dated May 2, 2017, 24 pages, Doc 1303.
U.S. Appl. No. 12/573,829: Response After Final Action filed Jul. 5, 2017, 23 pages, Doc 1304.
U.S. Appl. No. 12/573,829: Advisory Action, Applicant Initiated Review Summary, Amendment After Final Action, After Final Consideration Program Decision dated Aug. 29, 2017, 8 pages, Doc 1305.

(56) References Cited

OTHER PUBLICATIONS

U.S. Appl. No. 12/573,829: Request for Continued Examination filed Sep. 5, 2017, 29 pages, Doc 1306.
U.S. Appl. No. 12/573,829: Non-Final Rejection datedd Dec. 27, 2017, 24 pages, Doc 1308.
U.S. Appl. No. 12/573,829: Request for Reconsideration After Non-Final Rejection filed Mar. 27, 2018, 25 pages, Doc 1309.
U.S. Appl. No. 12/573,829: Final Rejection dated Jul. 11, 2018, 26 pages, Doc 1311.
U.S. Appl. No. 12/573,829: Request for Consideration After Final Consideration filed Sep. 7, 2018, 25 pages, Doc 1312.
U.S. Appl. No. 12/573,829: Advisory Action dated Sep. 24, 2018, 6 pages, Doc 1314.
U.S. Appl. No. 12/573,829: Request for Continued Examination filed Oct. 9, 2018, 25 pages, Doc 1315.
U.S. Appl. No. 12/573,829: Notice of Allowance dated May 21, 2019, 32 pages, Doc 1318.
U.S. Appl. No. 12/573,829: Issue Fee & Terminal Disclaimer filed Aug. 21, 2019, 12 pages, 1320.
U.S. Appl. No. 12/573,829: Issue Notification dated Sep. 18, 2019, 1 page, Doc 1322.
U.S. Appl. No. 16/549,185, filed Sep. 23, 2019, 73 pages, Doc 1323.
U.S. Appl. No. 16/549,185: Filing Receipt and Notice to File Missing Parts dated Sep. 4, 2019, 6 pages, Doc 1324.
U.S. Appl. No. 16/549,185: Response to Notice to File Missing Parts and Preliminary Amendment filed Sep. 5, 2019, 18 pages, Doc 2147.
U.S. Appl. No. 16/549,185: Updated Filing Receipt Sep. 6, 2019, 4 pages, Doc 1326.
U.S. Appl. No. 16/549,185: Notice of Publication Dec. 19, 2019, 1 page, Doc 1325.
U.S. Appl. No. 11/006,841, filed Dec. 7, 2004, 67 pages, Doc 1329.
U.S. Appl. No. 11/006,841: Pre-Exam Formalities Notice dated Jan. 10, 2005, 2 pages, Doc 1330.
U.S. Appl. No. 11/006,841: Applicant Response to Pre-Exam Formalities Notice filed Apr. 14, 2005, 105 pages, Doc 1331.
U.S. Appl. No. 11/006,841: Examiner's Search Strategies and Results dated Mar. 30, 2007, 14 pages, Doc 1332.
U.S. Appl. No. 11/006,841: Non-Final Rejection dated Apr. 6, 2007, 18 pages, Doc 1333.
U.S. Appl. No. 11/006,841: Response to Non-Final Rejection filed Sep. 6, 2007, 67 pages, Doc 1334.
U.S. Appl. No. 11/006,841: Requirement for Restriction/Election dated Nov. 27, 2007, 5 pages, Doc 1335.
U.S. Appl. No. 11/006,841: Request for Reconsideration after Non-Final Rejection filed Dec. 27, 2007, 41 pages, Doc 1336.
U.S. Appl. No. 11/006,841: Requirement for Restriction/Election dated Mar. 17, 2008, 9 pages, Doc 1337.
U.S. Appl. No. 11/006,841: Response to Election/Restriction filed Jul. 17, 2008, 38 pages, Doc 1339.
U.S. Appl. No. 11/006,841: Final Office Action dated Oct. 29, 2008, 79 pages, Doc 1340.
U.S. Appl. No. 11/006,841: RCE and Amendment filed Dec. 29, 2008, 48 pages, Doc 1341.
U.S. Appl. No. 11/006,841: Advisory Action dated Jan. 6, 2009, 3 pages, Doc 1342.
U.S. Appl. No. 11/006,841: Request for Continued Examination filed Apr. 23, 2009, 54 pages, Doc 1343.
U.S. Appl. No. 11/006,841: Information Disclosure Statement and Remarks in an Amendment filed Jun. 26, 2009, 43 pages, Doc 1345.
U.S. Appl. No. 11/006,841: Notice of Allowance and Fees Due dated Jun. 29, 2009, 69 pages, Doc 1346.
U.S. Appl. No. 11/006,841: Issue Fee Payment; Information Disclosure Statement; Amendment After Notice of Allowance filed Sep. 29, 2009, 17 pages, Doc 1350.
U.S. Appl. No. 11/006,841: Miscellaneous Communication to Applicant dated Oct. 21, 2009, 5 pages, Doc 1351.
U.S. Appl. No. 11/006,841: Issue Notification dated Nov. 11, 2009, 1 page, Doc 1352.
U.S. Appl. No. 12/578,411, filed Oct. 13, 2009, 75 pages, Doc 1354.
U.S. Appl. No. 12/578,411: Notice to File Missing Parts dated Oct. 28, 2009, 6 pages, Doc 1355.
U.S. Appl. No. 12/578,411: Applicant Response to Pre-Exam Formalities Notice filed Dec. 28, 2009, 27 pages, Doc 1356.
U.S. Appl. No. 12/578,411: Filing Receipt Jan. 7, 2010, 3 pages, Doc 1357.
U.S. Appl. No. 12/578,411: Requirement for Restriction/Election Jun. dated 8, 2011, 6 pages, Doc 1358.
U.S. Appl. No. 12/578,411: Response to Election/Restriction filed Jul. 6, 2011, 20 pages, Doc 1359.
U.S. Appl. No. 12/578,411: Non-Final Rejection dated Aug. 23, 2011, 25 pages, Doc 1360.
U.S. Appl. No. 12/578,411: Amendment After Non-Final Rejection filed Dec. 22, 2011, 42 pages, Doc 1361.
U.S. Appl. No. 12/578,411: Search Results by Examiner dated Jan. 20, 2012, 57 pages, Doc 1363.
U.S. Appl. No. 12/578,411: Applicant Amendment submitted/Entered with Filing of CPA/RCE filed May 21, 2012, 28 pages, Doc 1364.
U.S. Appl. No. 12/578,411: Refund Request filed May 24, 2012, 4 pages, Doc 1365.
U.S. Appl. No. 12/578,411: Advisory Action dated May 31, 2012, 4 pages, Doc 1366.
U.S. Appl. No. 12/578,411: Request for Continued Examination filed Jun. 12, 2012, 38 pages, Doc 1367.
U.S. Appl. No. 12/578,411: Notice of Allowance and Fees Due, dated Aug. 19, 2012, 35 pages, Doc 1369.
U.S. Appl. No. 12/578,411: Amendment After Notice of Allowance dated Nov. 14, 2013, 16 pages, Doc 1371.
U.S. Appl. No. 12/578,411: Amendment After Final and Response to Amendment dated Nov. 19, 2013, 2 pages, Doc 1372.
U.S. Appl. No. 12/578,411: Response to Amendment dated Dec. 3, 2013, 8 pages, Doc 1373.
U.S. Appl. No. 12/578,411: Issue Notification dated Dec. 18, 2013, 1 page, Doc 1375.
U.S. Appl. No. 12/578,411: Terminal Disclaimer Nov. 8, 2017, 7 pages, Doc 1376.
U.S. Appl. No. 14/086,837: Application filed Nov. 21, 2013, 70 pages, Doc 2258.
U.S. Appl. No. 14/086,837: Filing Receipt dated Dec. 12, 2013, 3 pages, Doc 2259.
U.S. Appl. No. 14/086,837: Notice to File Missing Parts dated Dec. 12, 2013, 2 pages, Doc 2261.
U.S. Appl. No. 14/086,837: Preliminary Amendment and Response to Notice to File Missing Parts filed Jun. 11, 2013, 28 pages, Doc 2262.
U.S. Appl. No. 14/086,837: Notice of Publication dated Sep. 25, 2014, 1 page, Doc 2260.
U.S. Appl. No. 14/086,837: Two Terminal Disclaimers filed Nov. 14, 2014, 4 pages, Doc 2263.
U.S. Appl. No. 14/086,837: Notice of Allowance/Allowability dated Dec. 2, 2014, 19 pages, Doc 2264.
U.S. Appl. No. 14/086,837: Issue Fee and 312 Amendment filed Feb. 27, 2015, 12 pages, Doc 2265.
U.S. Appl. No. 14/086,837: Issue Notification dated May 6, 2015, 1 page, Doc 2266.
U.S. Appl. No. 14/635,836, filed Mar. 2, 2015, 75 pages, Doc 2267.
U.S. Appl. No. 14/635,836: Filing Receipt dated Mar. 12, 2015, 3 pages, Doc 2268.
U.S. Appl. No. 14/635,836: Notice to File Missing Parts dated Mar. 12, 2015, 2 pages, Doc 2270.
U.S. Appl. No. 14/635,836: Preliminary Amendment and Response to Notice to File Missing Parts filed May 12, 2015, 42 pages, Doc 2271.
U.S. Appl. No. 14/635,836: Notice of Publication dated Aug. 27, 2015, 1 page, Doc 2269.
U.S. Appl. No. 14/635,836: Terminal Disclaimer filed Nov. 13, 2015, 5 pages, Doc 2272.
U.S. Appl. No. 14/635,836: Notice of Allowance/Allowability dated Apr. 18, 2016, 65 pages, Doc 2273.
U.S. Appl. No. 14/635,836: Issue Fee and 312 Amendment filed Jul. 15, 2016, 17 pages, Doc 2274.

(56) References Cited

OTHER PUBLICATIONS

U.S. Appl. No. 14/635,836: Issue Notification dated Aug. 16, 2016, 1 page, Doc 2275.
U.S. Appl. No. 15/250,118, filed Aug. 29, 2016, 96 pages, Doc 2276.
U.S. Appl. No. 15/250,118: Notice to File Corrected Application Papers dated Sep. 9, 2016, 2 pages, Doc 2277.
U.S. Appl. No. 15/250,118: Filing Receipt dated Sep. 9, 2016, 3 pages, Doc 2278.
U.S. Appl. No. 15/250,118: Response to Notice to File Corrected Application Papers and Revised Figures filed Nov. 8, 2016, 23 pages, Doc 2280.
U.S. Appl. No. 15/250,118: Notice of Publication dated Feb. 23, 2017, 1 page, Doc 2279.
U.S. Appl. No. 15/250,118: Non-final Office Action dated Jun. 15, 2017, 30 pages, Doc 2281.
U.S. Appl. No. 15/250,118: Response to Non-final Office Action filed Sep. 14, 2017, 46 pages, Doc 2282.
U.S. Appl. No. 15/250,118: Final Office Action dated Dec. 15, 2017, 69 pages, Doc 2283.
U.S. Appl. No. 15/250,118: RCE and Amendment filed Dec. 15, 2017, 48 pages, Doc 2284.
U.S. Appl. No. 15/250,118: Terminal Disclaimer filed Dec. 11, 2017, 6 pages, Doc 2285.
U.S. Appl. No. 15/250,118: Notice of Allowance/Allowability filed Jan. 8, 2019, 41 pages, Doc 2286.
U.S. Appl. No. 15/250,118: 312 Amendment filed Jan. 23, 2019, 20 pages, Doc 2287.
U.S. Appl. No. 15/250,118: Issue Fee and 312 Amendment filed Apr. 5, 2019, 22 pages, Doc 2288.
U.S. Appl. No. 15/250,118: Issue Notification dated Apr. 5, 2019, 1 page, Doc 2298.
U.S. Appl. No. 16/379,674, filed Apr. 9, 2019, 88 pages, Doc 2148.
U.S. Appl. No. 16/379,674: Filing Receipt Apr. 24, 2019, 4 pages, Doc 2149.
U.S. Appl. No. 16/379,674: Notice of Publication dated Aug. 1, 2019, 1 page, Doc 1016.
U.S. Appl. No. 16/379,674: Office Action, dated Oct. 19, 2020, 69 pages, Doc 2151.
U.S. Appl. No. 16/379,674: Response to Office Action filed Feb. 19, 2021, 21 pages, Doc 2173.
U.S. Appl. No. 16/379,674: Final Office Action dated Apr. 5, 2021, 21 pages, Doc 2289.
U.S. Appl. No. 16/379,674: Final Office Action dated Apr. 9, 2021, 21 pages, Doc 2301.
U.S. Appl. No. 16/379,674: Request for Continued Examination, Amendment and Terminal Disclaimer filed Jul. 1, 2021, 25 pages, Doc 2302.
U.S. Appl. No. 11/006,440, filed Dec. 6, 2004, 87 pages, Doc 1377.
U.S. Appl. No. 11/006,440: Pre-Exam Formalities Notice Jan. 11, 2005, 2 pages, Doc 1378.
U.S. Appl. No. 11/006,440: Preliminary Amendment filed May 2, 2005, 140 pages, Doc 1379.
U.S. Appl. No. 11/006,440: Preliminary Amendment filed Oct. 10, 2006, 139 pages, Doc 1380.
U.S. Appl. No. 11/006,440: Requirement for Restriction/Election dated Mar. 29, 2007, 5 pages, Doc 1381.
U.S. Appl. No. 11/006,440: Response to Election/Restriction filed Apr. 30, 2007, 43 pages, Doc 1382.
U.S. Appl. No. 11/006,440: Examiner's Search Strategies and Results Jun. 19, 2007, 5 pages, Doc 1383.
U.S. Appl. No. 11/006,440: Non-Final Rejection Jun. 21, 2007, 21 pages, Doc 1384.
U.S. Appl. No. 11/006,440: Request for Reconsideration After Non-Final Rejection filed Nov. 20, 2007, 47 pages, 1385.
U.S. Appl. No. 11/006,440: Examiner's Search Strategies and Results, dated Feb. 1, 2008, 11 pages, Doc 1386.
U.S. Appl. No. 11/006,440: Final Rejection dated Feb. 6, 2008, 18 pages, Doc 1387.
U.S. Appl. No. 11/006,440: Response After Final Action dated Apr. 7, 2008, 37 pages, Doc 1388.
U.S. Appl. No. 11/006,440: Notice of Appeal filed Aug. 4, 2008, 6 pages, Doc 1390.
U.S. Appl. No. 11/006,440: Request for Continued Examination filed Nov. 4, 2008, 43 pages, Doc 1391.
U.S. Appl. No. 11/006,440: Non-Final Rejection dated Jan. 23, 2009, 69 pages, Doc 1392.
U.S. Appl. No. 11/006,440: Request for Reconsideration After Non-Final Rejection filed Apr. 23, 2009, 36 pages, Doc 1393.
U.S. Appl. No. 11/006,440: Supplemental Response or Supplemental Amendment filed Jul. 17, 2009, 31 pages, Doc 1394.
U.S. Appl. No. 11/006,440: Notice of Allowance and Fees Due Jul. 31, 2009, 58 pages, Doc 1395.
U.S. Appl. No. 11/006,440: Amendment After Notice of Allowance and Issue Fee Payment filed Nov. 2, 2009, 14 pages, Doc 1402.
U.S. Appl. No. 11/006,440: Issue Notification dated Dec. 2, 2009, 1 page, Doc 1405.
U.S. Appl. No. 12/627,816: Claims Worksheet filed Nov. 24, 2009, 1 page, Doc 1406.
U.S. Appl. No. 12/627,816: Preliminary Amendment, Application and Declaration filed Nov. 30, 2009, 94 pages, Doc 1407.
U.S. Appl. No. 12/627,816: Notice to File Missing Parts, dated Dec. 15, 2009, 5 pages, Doc 1408.
U.S. Appl. No. 12/627,816: Applicant Response to Pre-Exam Formalities Notice filed Apr. 12, 2010, 25 pages, Doc 1409.
U.S. Appl. No. 12/627,816: Filing Receipt Apr. 20, 2010, 3 pages, Doc 1410.
U.S. Appl. No. 12/627,816: Notice of Publication dated Jul. 29, 2010, 1 page, Doc 1411.
U.S. Appl. No. 12/627,816: Non-Final Rejection dated May 5, 2011, 94 pages, Doc 1412.
U.S. Appl. No. 12/627,816: Response to Final Office Action filed Nov. 7, 2011, 17 pages, Doc 1413.
U.S. Appl. No. 12/627,816: Final Rejection Nov. 17, 2011, 21 pages, Doc 1414.
U.S. Appl. No. 12/627,816: Terminal Disclaimer Review Decision Feb. 7, 2012, 1 page, Doc 1416.
U.S. Appl. No. 12/627,816: Request for Continued Examination filed Feb. 17, 2012, 21 pages, Doc 1415.
U.S. Appl. No. 12/627,816: Notice of Allowance and Fees Due dated Aug. 1, 2013, 51 pages, Doc 1417.
U.S. Appl. No. 12/627,816: Issue Fee Payment and Amendment After Notice of Allowance dated Nov. 1, 2013, 16 pages, Doc 1420.
U.S. Appl. No. 12/627,816: Miscellaneous Communication to Applicant dated Nov. 5, 2013, 4 pages, Doc 1421.
U.S. Appl. No. 12/627,816: Amendment After Final Initialed by Examiner dated Nov. 9, 2013, 2 pages, Doc 1422.
U.S. Appl. No. 12/627,816: Response to Amendment Under Rule 312 dated Nov. 12, 2013, 3 pages, Doc 1423.
U.S. Appl. No. 12/627,816: Issue Notification dated Nov. 26, 2013, 1 page, Doc 1425.
U.S. Appl. No. 14/086,808: Application filed Nov. 21, 2013, 89 pages, Doc 1428.
U.S. Appl. No. 14/086,808: Notice to File Missing Parts dated Dec. 11, 2013, 6 pages, Doc 1429.
U.S. Appl. No. 14/086,808: Applicant Response to Pre-Exam Formalities Notice and Declaration and Preliminary Amendment filed Jun. 11, 2014, 71 pages, Doc 1430.
U.S. Appl. No. 14/086,808: Filing Receipt Jun. 17, 2014, 4 pages, Doc 1431.
U.S. Appl. No. 14/086,808: Notice of Publication dated Sep. 25, 2014, 1 page, Doc 1432.
U.S. Appl. No. 14/086,808: Terminal Disclaimer filed Oct. 24, 2014, 6 page, Doc 1433.
U.S. Appl. No. 14/086,808: Terminal Disclaimer Review Decision Oct. 29, 2014, 1 page, Doc 1434.
U.S. Appl. No. 14/086,808: Terminal Disclaimer and Power of Attorney filed Nov. 4, 2014, 6 pages, Doc 1435.
U.S. Appl. No. 14/086,808: Terminal Disclaimer Review Decision Nov. 13, 2014, 1 page, Doc 1437.
U.S. Appl. No. 14/086,808: Notice of Allowance and Fees Due dated Nov. 17, 2014, 68 pages, Doc 1438.

(56) References Cited

OTHER PUBLICATIONS

U.S. Appl. No. 14/086,808: Amendment After Notice of Allowance and Issue Fee Payment dated Feb. 17, 2015, 25 pages, Doc 1439.
U.S. Appl. No. 14/086,808: Response to Amendment under Rule 312 and Miscellaneous Communication to Applicant Feb. 20, 2015, 2 pages, Doc 1440.
U.S. Appl. No. 14/086,808: Amendment After Final, Initialed by Examiner and Response to Amendment Under Rule 312 dated Feb. 25, 2015, 10 pages, Doc 1441.
U.S. Appl. No. 14/086,808: Issue Notification dated Mar. 18, 2015, 1 page, Doc 1443.
U.S. Appl. No. 14/625,473: Application, Declaration and Power of Attorney filed Feb. 18, 2015, 97 pages, Doc 1444.
U.S. Appl. No. 14/625,473: Notice to File Missing Parts dated Mar. 18, 2015, 6 pages, Doc 1445.
U.S. Appl. No. 14/625,473: Applicant Response to Pre-Exam Formalities Notice and Applicant Arguments/ Remarks Made in an Amendment filed May 18, 2015, 33 pages, Doc 1446.
U.S. Appl. No. 14/625,473: Filing Receipt May 20, 2015, 4 pages, Doc 1447.
U.S. Appl. No. 14/625,473: Notice of Publication dated Aug. 27, 2015, 1 page, Doc 1448.
U.S. Appl. No. 14/625,473: Terminal Disclaimer filed Nov. 13, 2015, 7 pages, Doc 1449.
U.S. Appl. No. 14/625,473: Notice of Allowance and Fees Due and List of References and Considered By Examiner dated Mar. 28, 2016, 91 pages, Doc 1450.
U.S. Appl. No. 14/625,473: Amendment After Notice of Allowance and Issue Fee Paid filed Jun. 28, 2016, 28 pages, Doc 1453.
U.S. Appl. No. 14/625,473: Response to Amendment Under Rule 312 dated Jun. 30, 2016, 1 page, Doc 1454.
U.S. Appl. No. 14/625,473: Response to Amendment Under Rule 312 dated Jul. 6, 2016, 3 pages, Doc 1455.
U.S. Appl. No. 14/625,473: Issue Notification dated Jul. 20, 2016, 1 page, Doc 1457.
U.S. Appl. No. 15/214,168: Application, Declaration and Preliminary Amendment filed Jul. 19, 2016, 124 pages, Doc 1458.
U.S. Appl. No. 15/214,168: Filing Receipt and Response Re: Informal Power of Attorney Aug. 3, 2016, 6 pages, Doc 1459.
U.S. Appl. No. 15/214,168: Request for Corrected Filing Receipt and Power of Attorney filed Oct. 7, 2016, 14 pages, Doc 1462.
U.S. Appl. No. 15/214,168: Filing Receipt Oct. 12, 2016, 5 pages, Doc 1463.
U.S. Appl. No. 15/214,168: Notice of Publication dated Nov. 10, 2016, 1 page, Doc 1464.
U.S. Appl. No. 15/214,168: Non-Final Rejection dated Mar. 2, 2017, 38 pages, Doc 1465.
U.S. Appl. No. 15/214,168: Amendment / Request for Reconsideration After Non-Final Rejection filed Jun. 2, 2017, 42 pages, Doc 1466.
U.S. Appl. No. 15/214,168: Terminal Disclaimer filed Jul. 17, 2017, 8 pages, Doc 1467.
U.S. Appl. No. 15/214,168: Notice of Allowance and Fees Due dated Aug. 1, 2017, 124 pages, Doc 1468.
U.S. Appl. No. 15/214,168: Amendment After Notice of Allowance and Issue Fee Payment filed Nov. 1, 2017, 27 pages, Doc 1469.
U.S. Appl. No. 15/214,168: Miscellaneous Communication to Applicant and Amendment After Final or Under 37CFR 1.312, Initialed by Examiner dated Nov. 6, 2017, 5 pages, Doc 1470.
U.S. Appl. No. 15/214,168: Issue Notification dated Nov. 21, 2017, 1 page, Doc 1472.
U.S. Appl. No. 16/710,577: US Reissue Patent Application and Preliminary Amendment filed Dec. 11, 2019, 88 pages, Doc 1017.
U.S. Appl. No. 16/710,577: Filing Receipt dated Jan. 10, 2020, 4 pages, Doc 1018.
U.S. Appl. No. 16/710,577: Non-final Office Action dated Mar. 19, 2021, 11 pages, Doc 2174.
U.S. Appl. No. 15/802,348: Application, Preliminary Amendment and Declaration filed Nov. 2, 2017, 134 pages, Doc 1475.
U.S. Appl. No. 15/802,348: Notice to File Corrected Application Papers dated Nov. 30, 2017, 7 pages, Doc 1476.
U.S. Appl. No. 15/802,348: Applicant Response to Pre-Exam Formalities Notice filed Jan. 9, 2018, 19 pages, Doc 1477.
U.S. Appl. No. 15/802,348: Filing Receipt Jan. 11, 2018, 5 pages, Doc 1478.
U.S. Appl. No. 15/802,348: Notice of Publication dated Apr. 19, 2018, 1 page, Doc 1479.
U.S. Appl. No. 15/802,348: Preliminary Amendment filed Oct. 26, 2018, 27 pages, Doc 1480.
U.S. Appl. No. 15/802,348: Non-Final Rejection dated Feb. 11, 2019, 174 pages, Doc 1481.
U.S. Appl. No. 15/802,348: Amendment / Request for Reconsideration After Non-Final Rejection filed May 13, 2019, 25 pages, Doc 1482.
U.S. Appl. No. 15/802,348: Final Office Action dated Jul. 9, 2019, 24 pages, Doc 1019.
U.S. Appl. No. 15/802,348: Response to Final Office Action filed Aug. 20, 2019, 29 pages, Doc 1020.
U.S. Appl. No. 15/802,348: Advisory Action dated Sep. 4, 2019, 3 pages, Doc 1021.
U.S. Appl. No. 15/802,348: RCE and Amendment filed Sep. 16, 2019, 30 pages, Doc 1022.
U.S. Appl. No. 15/802,348: Terminal Disclaimer filed Mar. 18, 2020, 9 pages, Doc 1488.
U.S. Appl. No. 15/802,348: Notice of Allowance and Fees Due dated Mar. 27, 2020, 178 pages, Doc 1489.
U.S. Appl. No. 15/802,348: Issue Fee Payment filed Jun. 19, 2020, 9 pages, Doc 1491.
U.S. Appl. No. 15/802,348: Issue Notification dated Jul. 8, 2020, 1 page, Doc 1494.
U.S. Appl. No. 16/909,899, filed Jun. 23, 2020, 98 pages, Doc 2140.
U.S. Appl. No. 16/909,899: Filing Receipt and Notice to File Missing Parts Jul. 6, 2020, 8 pages, Doc 2141.
U.S. Appl. No. 16/909,899: Preliminary Amendment and Response to Missing Parts filed Sep. 8, 2020, 31 pages, Doc 2142.
U.S. Appl. No. 16/909,899: Updated Filing Receipt Sep. 10, 2020, 6 pages, Doc 2143.
U.S. Appl. No. 16/909,899: Notice of Publication dated Dec. 17, 2020, 6 pages, Doc 2161.
U.S. Appl. No. 16/909,899: Non-final Office Action dated Aug. 11, 2021, pages, Doc 2336.
U.S. Appl. No. 11/006,446, filed Dec. 6, 2004, 91 pages, Doc 1495.
U.S. Appl. No. 11/006,446: Pre-Exam Formalities Notice dated Jan. 24, 2005, 3 pages, Doc 1496.
U.S. Appl. No. 11/006,446: Preliminary Amendment filed May 2, 2005, 118 pages, Doc 1497.
U.S. Appl. No. 11/006,446: Requirement for Restriction / Election dated Apr. 4, 2007, 5 pages, Doc 1498.
U.S. Appl. No. 11/006,446: Response to Election / Restriction filed May 3, 2007, 6 pages, Doc 1499.
U.S. Appl. No. 11/006,446: Non-Final Rejection dated Jul. 26, 2007, 34 pages, Doc 1502.
U.S. Appl. No. 11/006,446: Amendment, Request for Reconsideration After Non-Final Rejection filed Nov. 26, 2007, 37 pages, Doc 1503.
U.S. Appl. No. 11/006,446: Examiner's Search Strategies and Results dated Feb. 7, 2008, 1 page, Doc 1504.
U.S. Appl. No. 11/006,446: Non-Final Rejection dated Feb. 20, 2008, 58 pages, Doc 1506.
U.S. Appl. No. 11/006,446: Amendment / Request for Reconsideration After Non-Final Rejection dated Jul. 21, 2008, 33 pages, Doc 1507.
U.S. Appl. No. 11/006,446: Final Rejection dated Oct. 28, 2008, 49 pages, Doc 1508.
U.S. Appl. No. 11/006,446: Amendment Submitted / Entered with Filing of CPA/RCE filed Dec. 29, 2008, 33 pages, Doc 1509.
U.S. Appl. No. 11/006,446: Advisory Action dated Jan. 7, 2009, 4 pages, Doc 1510.
U.S. Appl. No. 11/006,446: Request for Continued Examination Apr. 28, 2009, 38 pages, Doc 1511.
U.S. Appl. No. 11/006,446: Non-Final Rejection dated Jul. 7, 2009, 41 pages, Doc 1512.

(56) References Cited

OTHER PUBLICATIONS

U.S. Appl. No. 11/006,446: Examiner Interview Summary Record and Examiner's Search Strategy and Results dated Oct. 26, 2009, 6 pages, Doc 1513.
U.S. Appl. No. 11/006,446: Amendment / Request for Reconsideration After Non-Final Rejection dated Dec. 7, 2009, 33 pages, Doc 1514.
U.S. Appl. No. 11/006,446: Notice of Allowance and Fees Due dated Mar. 19, 2010, 135 pages, Doc 1515.
U.S. Appl. No. 11/006,446: Amendment After Notice of Allowance and Issue Fee Payment filed Jun. 21, 2010, 25 pages, Doc 1518.
U.S. Appl. No. 11/006,446: Response to Amendment After Rule 312 dated Aug. 19, 2010, 3 pages, Doc 1520.
U.S. Appl. No. 11/006,446: Drawings filed Aug. 25, 2010, 31 pages, Doc 1521.
U.S. Appl. No. 11/006,446: Issue Notification dated Sep. 1, 2010, 1 page, Doc 1522.
U.S. Appl. No. 12/830,236: Application, Declaration and Preliminary Amendment filed Jul. 2, 2010, 106 pages, Doc 1524.
U.S. Appl. No. 12/830,236: Fee Worksheet filed Jul. 15, 2010, 1 page, Doc 1525.
U.S. Appl. No. 12/830,236: Notice to File Corrected Application Papers dated Jul. 16, 2010, 5 pages, Doc 1526.
U.S. Appl. No. 12/830,236: Applicant Response to Pre-Exam Formalities Notice filed Aug. 25, 2010, 34 pages, Doc 1527.
U.S. Appl. No. 12/830,236: Filing Receipt Sep. 3, 2010, 3 pages, Doc 1528.
U.S. Appl. No. 12/830,236: Notice of Publication dated Dec. 16, 2010, 1 page, Doc 1529.
U.S. Appl. No. 12/830,236: Requirement for Restriction / Election dated Mar. 18, 2011, 6 pages, Doc 1530.
U.S. Appl. No. 12/830,236: Response to Election / Restriction filed Apr. 18, 2011, 8 pages, Doc 1531.
U.S. Appl. No. 12/830,236: Non-Final Rejection dated May 11, 2011, 29 pages, Doc 1532.
U.S. Appl. No. 12/830,236: Amendment / Request for Reconsideration After Non-Final Rejection filed Jul. 6, 2011, 20 pages, Doc 1533.
U.S. Appl. No. 12/830,236: Final Rejection dated Oct. 14, 2011, 54 pages, Doc 1534.
U.S. Appl. No. 12/830,236: Response After Final Action filed Jan. 17, 2012, 26 pages, Doc 1535.
U.S. Appl. No. 12/830,236: Advisory Action dated Feb. 8, 2012, 6 pages, Doc 1536.
U.S. Appl. No. 12/830,236: Notice of Appeal filed Mar. 8, 2012, 6 pages, Doc 1537.
U.S. Appl. No. 12/830,236: Request for Continued Examination filed Jun. 5, 2012, 24 pages, Doc 1538.
U.S. Appl. No. 12/830,236: Non-Final Rejection dated Jul. 31, 2012, 28 pages, Doc 1540.
U.S. Appl. No. 12/830,236: Amendment / Request for Reconsideration After Non-Final Rejection filed Nov. 1, 2012, 28 pages, Doc 1541.
U.S. Appl. No. 12/830,236: Final Rejection dated Feb. 27, 2013, 42 pages, Doc 1542.
U.S. Appl. No. 12/830,236: Response After Final Action dated Jun. 27, 2013, 42 pages, Doc 1543.
U.S. Appl. No. 12/830,236: Advisory Action and Amendment After Final dated Jul. 12, 2013, 4 pages, Doc 1544.
U.S. Appl. No. 12/830,236: Notice of Appeal Filed Jul. 19, 2013, 6 pages, Doc 1545.
U.S. Appl. No. 12/830,236: Appeal Brief filed Sep. 18, 2013, 44 pages, Doc 1546.
U.S. Appl. No. 12/830,236: Examiner's Answer to Appeal Brief Dec. 18, 2013, 35 pages, Doc 1547.
U.S. Appl. No. 12/830,236: Reply Brief filed Feb. 18, 2014, 18 pages, Doc 1548.
U.S. Appl. No. 12/830,236: Appeal Docketing Notice filed Mar. 21, 2014, 2 pages, Doc 1550.
U.S. Appl. No. 12/830,236: Patent Board Decision—Examiner Affirmed Mar. 9, 2016, 6 pages, Doc 1551.
U.S. Appl. No. 12/830,236: Request for Continued Examination filed Apr. 27, 2016, 20 pages, Doc 1552.
U.S. Appl. No. 12/830,236: Non-Final Rejection dated Jun. 29, 2016, 113 pages, Doc 1553.
U.S. Appl. No. 12/830,236: Applicant Initiated Review Summary dated Aug. 30, 2016, 6 pages, Doc 1555.
U.S. Appl. No. 12/830,236: Amendment / Request for Reconsideration After Non-Final Rejection filed Sep. 6, 2016, 15 pages, Doc 1556.
U.S. Appl. No. 12/830,236: Applicant Initiated Interview Summary dated Sep. 9, 2016, 5 pages, Doc 1557.
U.S. Appl. No. 12/830,236: Final Rejection dated Dec. 14, 2016, 98 pages, Doc 1558.
U.S. Appl. No. 12/830,236: Response After Final Action filed Feb. 13, 2017, 17 pages, Doc 1559.
U.S. Appl. No. 12/830,236: Amendment After Final Action or under 37CFR 1.312 dated Mar. 3, 2017, 3 pages, Doc 1560.
U.S. Appl. No. 12/830,236: Request for Continued Examination filed Apr. 4, 2017, 23 pages, Doc 1561.
U.S. Appl. No. 12/830,236: Non-Final Rejection dated Jun. 21, 2017, 90 pages, Doc 1562.
U.S. Appl. No. 12/830,236: Applicant Initiated Review Summary dated Oct. 5, 2017, 9 pages, Doc 1563.
U.S. Appl. No. 12/830,236: Amendment / Request for Reconsideration After Non-Final Rejection filed Oct. 23, 2017, 23 pages, Doc 1564.
U.S. Appl. No. 12/830,236: Non-Final Rejection dated Feb. 6, 2018, 91 pages, Doc 1565.
U.S. Appl. No. 12/830,236: Amendment / Request for Reconsideration After Non-Final Rejection filed May 4, 2018, 29 pages, Doc 1566.
U.S. Appl. No. 12/830,236: Final Rejection Sep. 5, 2018, 65 pages, Doc 1567.
U.S. Appl. No. 12/830,236: After Final Consideration Program Request filed Nov. 5, 2018, 27 pages, Doc 1568.
U.S. Appl. No. 12/830,236: Advisory Action dated Nov. 19, 2018, 7 pages, Doc 1569.
U.S. Appl. No. 12/830,236: Request for Continued Examination filed Dec. 31, 2018, 30 pages, Doc 1570.
U.S. Appl. No. 12/830,236: Notice of Allowance and Fees Due dated Apr. 2, 2019, 53 pages, Doc 1571.
U.S. Appl. No. 12/830,236: Supplemental Notice of Allowability dated May 21, 2019, 24 pages, Doc 1023.
U.S. Appl. No. 12/830,236: Issue Fee Payment dated Jul. 1, 2019, 3 pages, Doc 1024.
U.S. Appl. No. 12/830,236: Supplemental Allowability dated Jul. 9, 2019, 8 pages, Doc 1573.
U.S. Appl. No. 12/830,236: Issue Notification dated Jul. 24, 2019, 1 page, Doc 1025.
U.S. Appl. No. 16/459,930: U.S. Appl. No. 16/459,930, filed Jul. 2, 2019, 99 pages, Doc 1026.
U.S. Appl. No. 16/459,930: Filing Receipt and Notice to File Missing Parts and Filing Receipt dated Jul. 18, 2019, 7 pages, Doc 1577.
U.S. Appl. No. 16/459,930: Response to Notice to File Missing Parts and Preliminary Amendment dated Sep. 4, 2019, 19 pages, Doc 1029.
U.S. Appl. No. 16/459,930: Updated Filing Receipt dated Sep. 6, 2019, 4 pages, Doc 1030.
U.S. Appl. No. 16/459,930: Notice of Publication dated Dec. 12, 2019, 1 page, Doc 1031.
U.S. Appl. No. 16/459,930: Non-Final Rejection dated Oct. 6, 2020, 43 pages, Doc 1581.
U.S. Appl. No. 16/459,930: Response to Non-Final Rejection filed Mar. 8, 2021, 19 pages, Doc 2175.
U.S. Appl. No. 16/459,930: Non-final Office Action dated Jun. 9, 2021, 17 pages, Doc 2304.
U.S. Appl. No. 11/385,257, filed Mar. 20, 2006, 118 pages, Doc 1582.
U.S. Appl. No. 11/385,257: Pre-Exam Formalities Notice dated May 3, 2006, 2 pages, Doc 1583.

(56) References Cited

OTHER PUBLICATIONS

U.S. Appl. No. 11/385,257: Applicant Response to Pre-Exam Formalities Notice filed Aug. 3, 2006, 46 pages, Doc 1584.
U.S. Appl. No. 11/385,257: Notice of Publication dated Nov. 30, 2006, 1 page, Doc 1585.
U.S. Appl. No. 11/385,257: Non-Final Rejection dated Apr. 29, 2008, 44 pages, Doc 1586.
U.S. Appl. No. 11/385,257: Transmittal Letter May 23, 2008, 2 pages, Doc 1587.
U.S. Appl. No. 11/385,257: Amendment / Request for Reconsideration After Non-Final Rejection filed Jul. 29, 2008, 29 pages, Doc 1588.
U.S. Appl. No. 11/385,257: Final Rejection dated Dec. 9, 2008, 47 pages, Doc 1589.
U.S. Appl. No. 11/385,257: Request for Continued Examination filed May 11, 2009, 36 pages, Doc 1590.
U.S. Appl. No. 11/385,257: Supplemental Response or Supplemental Amendment filed May 26, 2009, 3 pages, Doc 1591.
U.S. Appl. No. 11/385,257: Notice to the Applicant Regarding a Non- Compliant or Non-Responsive Amendment dated Jun. 1, 2009, 3 pages, Doc 1592.
U.S. Appl. No. 11/385,257: Amendment / Request for Reconsideration After Non-Final Rejection filed Jun. 30, 2009, 34 pages, Doc 1593.
U.S. Appl. No. 11/385,257: Non-Final Rejection dated Sep. 14, 2009, 47 pgs, Doc 1594.
U.S. Appl. No. 11/385,257: Amendment / Request After Non-Final Rejection filed Jan. 13, 2010, 37 pages, Doc 1595.
U.S. Appl. No. 11/385,257: Final Rejection dated Apr. 12, 2010, 55 pages, Doc 1596.
U.S. Appl. No. 11/385,257: Request for Continued Examination filed Aug. 12, 2010, 40 pages, Doc 1597.
U.S. Appl. No. 11/385,257: Non-Final Rejection dated Sep. 30, 2010, 56 pages, Doc 1598.
U.S. Appl. No. 11/385,257: Amendment / Request for Reconsideration After Non-Final Rejection filed Mar. 29, 2011, 36 pages, Doc 1599.
U.S. Appl. No. 11/385,257: Final Rejection dated Jun. 1, 2011, 47 pages, Doc 1600.
U.S. Appl. No. 11/385,257: Request for Continued Examination Nov. 2, 2011, 37 pages, Doc 1601.
U.S. Appl. No. 11/385,257: Non-Final Rejection dated Jan. 9, 2012, 53 pages, Doc 1602.
U.S. Appl. No. 11/385,257: Amendment / Request for Reconsideration After Non-Final Rejection filed Apr. 6, 2012, 30 pages, Doc 1603.
U.S. Appl. No. 11/385,257: Notice of Allowance and Fees Due dated Jun. 22, 2012, 45 pages, Doc 1604.
U.S. Appl. No. 11/385,257: Notice of Allowance and Fees Due dated Oct. 4, 2012, 4 pages, Doc 1606.
U.S. Appl. No. 11/385,257: Amendment After Notice of Allowance filed Dec. 12, 2012, 8 pages, Doc 1608.
U.S. Appl. No. 11/385,257: Issue Notification dated Dec. 22, 2012, 1 page, Doc 1610.
U.S. Appl. No. 13/625,812, filed Sep. 24, 2012, 123 pages, Doc 1612.
U.S. Appl. No. 13/625,812: Notice to File Missing Parts and Filing Receipt dated Oct. 15, 2012, 6 pages, Doc 1613.
U.S. Appl. No. 13/625,812: Preliminary Amendment dated Mar. 8, 2013, 50 pages, Doc 1614.
U.S. Appl. No. 13/625,812: Notice of Incomplete Reply dated Mar. 15, 2013, 3 pages, Doc 1615.
U.S. Appl. No. 13/625,812: Applicant Response to Pre-Exam Formalities Notice filed Apr. 2, 2013, 5 pages, Doc 1616.
U.S. Appl. No. 13/625,812: Notice of Incomplete Reply dated Apr. 10, 2013, 3 pages, Doc 1617.
U.S. Appl. No. 13/625,812: Filing Receipt and Miscellaneous Communication to Applicant dated Apr. 22, 2013, 5 pages, Doc 1619.
U.S. Appl. No. 13/625,812: General Transmittal of Replacement Application Data Sheet filed May 10, 2013, 8 pages, Doc 1620.
U.S. Appl. No. 13/625,812: Non-Final Rejection dated Jul. 26, 2013, 64 pages, Doc 1621.
U.S. Appl. No. 13/625,812: Notice of Publication dated Aug. 1, 2013, 1 page, Doc 1622.
U.S. Appl. No. 13/625,812: Amendment / Request for Reconsideration After Non-Final Rejection filed Oct. 9, 2013, 18 pages, Doc 1623.
U.S. Appl. No. 13/625,812: Final Rejection dated Dec. 3, 2013, 35 pages, Doc 1624.
U.S. Appl. No. 13/625,812: Response After Final Action filed Apr. 1, 2014, 25 pages, Doc 1625.
U.S. Appl. No. 13/625,812: Advisory Action dated Apr. 9, 2014, 3 pages, Doc 1626.
U.S. Appl. No. 13/625,812: Notice of Appeal filed May 5. 2014, 6 pages, Doc 1627
U.S. Appl. No. 13/625,812: Request for Continued Examination filed Aug. 4, 2014, 25 pages, Doc 1628.
U.S. Appl. No. 13/625,812: Request for Corrected Filing Receipt filed Aug. 21, 2014, 9 pages, Doc 1629.
U.S. Appl. No. 13/625,812: Filing Receipt Aug. 27, 2014, 3 pages, Doc 1630.
U.S. Appl. No. 13/625,812: Notice of Allowance and Fees Due dated Dec. 9, 2014, 36 pages, Doc 1631.
U.S. Appl. No. 13/625,812: Filing Receipt Feb. 2, 2015, 3 pages, Doc 1632.
U.S. Appl. No. 13/625,812: Filing Receipt Feb. 6, 2015, 3 pages, Doc 1634.
U.S. Appl. No. 13/625,812: Terminal Disclaimer filed Mar. 2, 2015, 5 pages, Doc 1635.
U.S. Appl. No. 13/625,812: Post-Allowance Communication—Incoming filed Mar. 6, 2015, 8 pages, Doc 1636.
U.S. Appl. No. 13/625,812: Issue Fee Payment and Amendment After Notice of Allowance filed Mar. 9, 2015, 8 pages, Doc 1637.
U.S. Appl. No. 13/625,812: Terminal Disclaimer Review Decision Mar. 12, 2015, 1 page, Doc 1639.
U.S. Appl. No. 13/625,812: Issue Notification dated Apr. 8, 2015, 1 page, Doc 1641.
U.S. Appl. No. 13/625,812: Terminal Disclaimer filed Apr. 14, 2015, 14 pages, Doc 1642.
U.S. Appl. No. 13/625,812: Terminal Disclaimer Review Decision Apr. 17, 2015, 1 page, Doc 1643.
U.S. Appl. No. 14/641,735: Application, Declaration and Power of Attorney filed Mar. 9, 2015, 128 pages, Doc 1645.
U.S. Appl. No. 14/641,735: Notice to File Missing Parts dated Mar. 20, 2015, 6 pages, Doc 1646.
U.S. Appl. No. 14/641,735: Preliminary Amendment filed Jun. 22, 2015, 41 pages, Doc 1647.
U.S. Appl. No. 14/641,735: Notice of Incomplete Reply dated Jun. 26, 2015, 3 pages, Doc 1648.
U.S. Appl. No. 14/641,735: Applicant Response to Pre-Exam Formalities Notice filed Jul. 8, 2015, 36 pages, Doc 1649.
U.S. Appl. No. 14/641,735: Filing Receipt Jul. 22, 2015, 4 pages, Doc 1650.
U.S. Appl. No. 14/641,735: Terminal Disclaimer filed Aug. 27, 25, 7 pages, Doc 1651.
U.S. Appl. No. 14/641,735: Notice of Publication dated Oct. 29, 2015, 1 page, Doc 1652.
1/14/201614/641,735: Preliminary Amendment filed Jan. 14, 2016, 11 pages, Doc 1653.
U.S. Appl. No. 14/641,735: Non-Final Rejection dated Jul. 14, 2017, 103 pages, Doc 1654.
U.S. Appl. No. 14/641,735: Letter Restarting Period for Response and Examiner's Search Strategy and Results dated Aug. 24, 2017, 34 pages, Doc 1655.
U.S. Appl. No. 14/641,735: Amendment / Request for Reconsideration After Non-Final Rejection filed Nov. 24, 2017, 30 pages, Doc 1656.
U.S. Appl. No. 14/641,735: Final Rejection dated Mar. 15, 2018, 30 pages, Doc 1657.
U.S. Appl. No. 14/641,735: Response After Final Action filed May 15, 2018, 31 pages, Doc 1658.

(56) References Cited

OTHER PUBLICATIONS

U.S. Appl. No. 14/641,735: Advisory Action dated Jun. 8, 2018, 5 pages, Doc 1659.
U.S. Appl. No. 14/641,735: Applicant Initiated Review Summary dated Jul. 10, 2018, 5 pages, Doc 1661.
U.S. Appl. No. 14/641,735: Request for Continued Examination filed Jul. 16, 2018, 39 pages, Doc 1662.
U.S. Appl. No. 14/641,735: Preliminary Amendment filed Oct. 26, 2018, 13 pages, Doc 1663.
U.S. Appl. No. 14/641,735: Non-Final Rejection dated Nov. 2, 2018, 46 pages, Doc 1664.
U.S. Appl. No. 14/641,735: Amendment / Request for Reconsideration After Non-Final Rejection filed Feb. 4, 2019, 30 pages, Doc 1665.
U.S. Appl. No. 14/641,735: Notice of Allowance and Fees Due dated Apr. 15, 2019, 37 pages, Doc 1666.
U.S. Appl. No. 14/641,735: Issue Fee Payment and Response under 37 CFR § 1.312 dated Jul. 12, 2019, 8 pages, Doc 1032.
U.S. Appl. No. 14/641,735: Notice of Allowance and Fees Due dated Jul. 26, 2019, 7 pages, Doc 1667.
U.S. Appl. No. 14/641,735: Supplemental Notice of Allowability dated Jul. 26, 2019, 7 pages, Doc 1033.
U.S. Appl. No. 14/641,735: Issue Notification dated Aug. 7, 2019, 1 page, Doc 1034.
U.S. Appl. No. 16/513,021: U.S. Appl. No. 16/513,021, filed Jul. 16, 2019, 130 pages, Doc 1035.
U.S. Appl. No. 16/513,021: Filing Receipt and Notice to File Missing Parts dated Jul. 30, 2019, 7 pages, Doc 1671.
U.S. Appl. No. 16/513,021: Response to Notice to File Missing Parts and Preliminary Amendment dated Sep. 11, 2019, 45 pages, Doc 1038.
U.S. Appl. No. 16/513,021: Updated Filing Receipt dated Sep. 12, 2019, 4 pages, Doc 1039.
U.S. Appl. No. 16/513,021: Notice of Publication dated Dec. 19, 2019, 1 page, Doc 1040.
U.S. Appl. No. 16/513,021: Non-final Office Action dated May 5, 2021, 36 pages, Doc 2290.
U.S. Appl. No. 16/513,021: Response to Non-final Office Action filed Sep. 28, 2021, 36 pages, Doc 2346.
U.S. Appl. No. 11/319,758: Transmittal of New Application filed Dec. 27, 2005, 79 pages, Doc 1675.
U.S. Appl. No. 11/319,758: Pre-Exam Formalities Notice dated Feb. 1, 2006, 2 pages, Doc 1676.
U.S. Appl. No. 11/319,758: Applicant Response to Pre-Exam Formalities Notice filed Jul. 3, 2006, 15 pages, Doc 1677.
U.S. Appl. No. 11/319,758: Non-Final Rejection dated Nov. 12, 2008, 46 pages, Doc 1678.
U.S. Appl. No. 11/319,758: Amendment / Request for Reconsideration After Non-Final Rejection dated May 12, 2009, 40 pages, Doc 1679.
U.S. Appl. No. 11/319,758: Final Rejection dated Aug. 3, 2009, 39 pages, Doc 1680.
U.S. Appl. No. 11/319,758: Non-Final Rejection dated Mar. 30, 2010, 58 pages, Doc 1681.
U.S. Appl. No. 11/319,758: Final Rejection dated Oct. 28, 2010, 58 pages, Doc 1682.
U.S. Appl. No. 11/319,758: Request for Continued Examination filed Mar. 28, 2011, 37 pages, Doc 1683.
U.S. Appl. No. 11/319,758: Non-Final Rejection dated Jun. 3, 2011, 57 pages, Doc 1684.
U.S. Appl. No. 11/319,758: Amendment / Request for Reconsideration After Non-Final Rejection filed Nov. 3, 2011, 35 pages, Doc 1685.
U.S. Appl. No. 11/319,758: Final Rejection dated Jan. 17, 2012, 41 pages, Doc 1686.
U.S. Appl. No. 11/319,758: Response After Final Action dated May 17, 2012, 35 pages, Doc 1687.
U.S. Appl. No. 11/319,758: Advisory Action dated Jun. 20, 2012, 3 pages, Doc 1690.
U.S. Appl. No. 11/319,758: Response After Final Action filed Jun. 28, 2012, 30 pages, Doc 1691.
U.S. Appl. No. 11/319,758: Notice of Allowance and Fees Due dated Jul. 17, 2012, 48 pages, Doc 1692.
U.S. Appl. No. 11/319,758: Amendment After Notice of Allowance and Issue Fee Payment filed Oct. 12, 2012, 12 pages, Doc 1693.
U.S. Appl. No. 11/319,758: Issue Notification dated Oct. 31, 2012, 4 pages, Doc 1695.
U.S. Appl. No. 13/632,581: Preliminary Amendment and Application filed Oct. 1, 2012, 90 pages, Doc 1697.
U.S. Appl. No. 13/632,581: Notice to File Missing Parts and Filing Receipt dated Oct. 2, 2012, 6 pages, Doc 1698.
U.S. Appl. No. 13/632,581: Applicant Response to Pre-Exam Formalities Notice filed Feb. 22, 2013, 26 pages, Doc 1699.
U.S. Appl. No. 13/632,581: Filing Receipt Mar. 5, 2013, 4 pages, Doc 1700.
U.S. Appl. No. 13/632,581: Notice of Publication dated Jun. 13, 2013, 1 page, Doc 1701.
U.S. Appl. No. 13/632,581: Non-Final Rejection dated Jul. 3, 2013, 43 pages, Doc 1702.
U.S. Appl. No. 13/632,581: Amendment / Request for Reconsideration After Non-Final Rejection filed Sep. 11, 2013, 48 pages, Doc 1703.
U.S. Appl. No. 13/632,581: Final Rejection dated Dec. 18, 2013, 47 pages, Doc 1704.
U.S. Appl. No. 13/632,581: Response After Final Action filed Mar. 18, 2014, 40 pages, Doc 1705.
U.S. Appl. No. 13/632,581: Advisory Action dated Apr. 3, 2014, 15 pages, Doc 1706.
U.S. Appl. No. 13/632,581: Notice of Appeal filed Apr. 17, 2014, 6 pages, Doc 1707.
U.S. Appl. No. 13/632,581: Request for Continued Examination filed Jul. 16, 2014, 28 pages, Doc 1708.
U.S. Appl. No. 13/632,581: Notice of Informal or Non-Responsive CPA Amendment dated Oct. 20, 2014, 5 pages, Doc 1709.
U.S. Appl. No. 13/632,581: Amendment / Request for Reconsideration After Non-Final Rejection filed Nov. 4, 2014, 19 pages, Doc 1710.
U.S. Appl. No. 13/632,581: Non-Final Rejection dated Jan. 27, 2015, 81 pages, Doc 1711.
U.S. Appl. No. 13/632,581: Amendment / Request for Reconsideration After Non-Final Rejection filed Apr. 20, 2015, 27 pages, Doc 1712.
U.S. Appl. No. 13/632,581: Final Rejection dated Jul. 20, 2015, 47 pages, Doc 1713.
U.S. Appl. No. 13/632,581: After Final Consideration Program Request filed Sep. 21, 2015, 31 pages, Doc 1714.
U.S. Appl. No. 13/632,581: Advisory Action and After Final Consideration Program Decision dated Oct. 2, 2015, 18 pages, Doc 1715.
U.S. Appl. No. 13/632,581: Request for Continued Examination filed Nov. 30, 2015, 60 pages, Doc 1716.
U.S. Appl. No. 13/632,581: Notice of Allowance and Fees Due Dec. 17, 2015, 89 pages, Doc 1717.
U.S. Appl. No. 13/632,581: Filing Receipt Jan. 22, 2016, 4 pages, Doc 1719.
U.S. Appl. No. 13/632,581: Terminal Disclaimer filed Mar. 7, 2016, 8 pages, Doc 1723.
U.S. Appl. No. 13/632,581: Issue Fee Payment and Amendment After Notice of Allowance filed Mar. 6, 2016, 24 pages, Doc 1724.
U.S. Appl. No. 13/632,581: Response to Amendment Under Rule 312 dated Mar. 22, 2016, 18 pages, Doc 1725.
U.S. Appl. No. 13/632,581: Issue Notification dated Apr. 13, 2016, 1 page, Doc 1726.
U.S. Appl. No. 15/081,612: Application, Declaration, and Power of Attorney filed Mar. 25, 2016, 91 pages. Doc 1727.
U.S. Appl. No. 15/081,612: Notice to File Missing Parts dated Apr. 11, 2016, 8 pages, Doc 1728.
U.S. Appl. No. 15/081,612: Preliminary Amendment filed Jun. 13, 2016, 38 pages, Doc 1729.
U.S. Appl. No. 15/081,612: Preliminary Amendment filed Jun. 14, 2016, 6 pages, Doc 1730.

(56) References Cited

OTHER PUBLICATIONS

U.S. Appl. No. 15/081,612: Filing Receipt Jun. 21, 2016, 4 pages, Doc 1731.
U.S. Appl. No. 15/081,612: Non-Final Rejection dated Jul. 27, 2016, 91 pages, Doc 1732.
U.S. Appl. No. 15/081,612: Terminal Disclaimer Sep. 23, 2016, 7 pages, Doc 1733.
U.S. Appl. No. 15/081,612: Notice of Publication dated Sep. 29, 2016, 1 page, Doc 1734.
U.S. Appl. No. 15/081,612: Notice of Allowance and Fees Due dated Oct. 17, 2016, 38 pages, Doc 1735.
U.S. Appl. No. 15/081,612: Notice of Allowance and Fees Due dated Jan. 4, 2017, 4 pages, Doc 1736.
U.S. Appl. No. 15/081,612: Request for Continued Examination, Amendment After Notice of Allowance and Issue Fee Payment filed Jan. 30, 2017, 11 pages, Doc 1737.
U.S. Appl. No. 15/081,612: Notice of Allowance and Fees Due dated Jan. 30, 2017, 3 pages, Doc 1738.
U.S. Appl. No. 15/081,612: Notice of Allowance and Fees Due dated Feb. 13, 2017, 51 pages, Doc 1739.
U.S. Appl. No. 15/081,612: Amendment After Notice of Allowance and Issue Fee Payment Filed Mar. 20, 2017, 8 pages, Doc 1740.
U.S. Appl. No. 15/081,612: Issue Notification dated Apr. 20, 2017, 1 page, Doc 1742.
U.S. Appl. No. 15/464,205: Application, Power of Attorney and Declarations filed Mar. 20, 2017, 122 pages, Doc 1743.
U.S. Appl. No. 15/464,205: Notice to File Missing Parts dated Mar. 28, 2017, 10 pages, Doc 1744.
U.S. Appl. No. 15/464,205: Applicant Response to Pre-Exam Formalities Notice dated May 31, 2017, 99 pages, Doc 1745.
U.S. Appl. No. 15/464,205: Filing Receipt Jun. 2, 2017, 5 pages, Doc 1746.
U.S. Appl. No. 15/464,205: Notice of Publication dated Sep. 7, 2017, 1 page, Doc 1747.
U.S. Appl. No. 15/464,205: Preliminary Amendment filed Feb. 22, 2019, 14 pages, Doc 1748.
U.S. Appl. No. 15/464,205: Non-final Office Action dated Jul. 25, 2019, 64 pages, Doc 1041.
U.S. Appl. No. 15/464,205: Response to Non-Final Rejection filed Oct. 22, 2019, 21 pages, Doc 1750.
U.S. Appl. No. 15/464,205: Terminal Disclaimer filed Oct. 22, 2019, 5 pages, Doc 1043.
U.S. Appl. No. 15/464,205: Final Office Action dated Nov. 14, 2019, 11 pages, Doc 1044.
U.S. Appl. No. 15/464,205: Response to Final Office Action dated Feb. 12, 2020, 11 pages, Doc 1062.
U.S. Appl. No. 15/464,205: Advisory Action dated Feb. 25, 2020, 5 pages, Doc 1063.
U.S. Appl. No. 15/464,205: Request for Continued Examination and Amendment filed Mar. 5, 2020, 20 pages, Doc 1064.
U.S. Appl. No. 15/464,205: Non-Final Rejection dated Mar. 27, 2020, 52 pages, Doc 1755.
U.S. Appl. No. 15/464,205: Response to Non-Final Rejection, 19 pages, Doc 1756.
U.S. Appl. No. 15/464,205: Final Rejection dated Sep. 3, 2020, 100 pages, Doc 1757.
U.S. Appl. No. 15/464,205: Interview Summary dated Oct. 26, 2020, 8 pages, Doc 1758.
U.S. Appl. No. 15/464,205: Response to Final Rejection filed Nov. 3, 2020, 21 pages, Doc 1759.
U.S. Appl. No. 15/464,205: Advisory Action dated Nov. 16, 2020, 10 pages, Doc 1760.
U.S. Appl. No. 15/464,205: Request for Continued Examination filed Nov. 20, 2020, 24 pages, Doc 1761.
U.S. Appl. No. 15/464,205: Notice of Allowance/Allowability filed May 26, 2020, 20 pages, Doc 2291.
U.S. Appl. No. 15/464,205: Request for Continued Examination and 312 Response filed Aug. 26, 2021, 13 pages, Doc 2337.
U.S. Appl. No. 15/464,205: Notice of Allowance/Allowability dated Sep. 9, 2021, 5 pages, Doc 2347.
U.S. Appl. No. 11/006,842: Transmittal of New Application filed Dec. 7, 2004, 86 pages, Doc 1762.
U.S. Appl. No. 11/006,842: Pre-Exam Formalities Notice dated Jan. 10, 2005, 2 pages, Doc 1763.
U.S. Appl. No. 11/006,842: Applicant Response to Pre-Exam Formalities Notice filed Apr. 1, 2005, 9 pages, Doc 1764.
U.S. Appl. No. 11/006,842: Preliminary Amendment filed May 2, 2005, 94 pages, Doc 1765.
U.S. Appl. No. 11/006,842: Requirement for Restriction / Election dated Jan. 23, 2008, 5 pages, Doc 1766.
U.S. Appl. No. 11/006,842: Response to Election / Restriction filed Feb. 25, 2008, 28 pages, Doc 1767.
U.S. Appl. No. 11/006,842: Requirement for Restriction / Election dated May 13, 2008, 5 pages, Doc 1768.
U.S. Appl. No. 11/006,842: Miscellaneous Communication to Applicant dated May 15, 2008, 4 pages, Doc 1769.
U.S. Appl. No. 11/006,842: Amendment / Request for Reconsideration After Non-Final Rejection filed Aug. 13, 2008, 29 pages, Doc 1770.
U.S. Appl. No. 11/006,842: Non-Final Rejection dated Nov. 3, 2008, 28 pages, Doc 1771.
U.S. Appl. No. 11/006,842: Amendment / Request for Reconsideration After Non-Final Rejection filed May 4, 2009, 40 pages, Doc 1772.
U.S. Appl. No. 11/006,842: Supplemental Response or Supplemental Amendment filed Jul. 17, 2009, 25 pages, Doc 1773.
U.S. Appl. No. 11/006,842: Notice of Allowance and Fees Due dated Jul. 27, 2009, 37 pages, Doc 1774.
U.S. Appl. No. 11/006,842: Amendment After Notice of Allowance and Issue Fee Payment filed Oct. 27, 2009, 4 pages, Doc 1776.
U.S. Appl. No. 11/006,842: Miscellaneous Communication to Applicant and Bibliographic Data Sheet dated Nov. 3, 2009, 2 pages, Doc 1777.
U.S. Appl. No. 11/006,842: Issue Notification dated Nov. 18, 2009, 1 page, Doc 1778.
U.S. Appl. No. 11/006,842: Request for Certificate of Correction filed Jun. 1, 2015, 5 pages, Doc 1779.
U.S. Appl. No. 11/006,842: Certificate of Correction dated Sep. 15, 2015, 1 page, Doc 1780.
U.S. Appl. No. 12/613,450: Application, Declaration and Power of Attorney filed Nov. 5, 2009, 63 pages, Doc 1781.
U.S. Appl. No. 12/613,450: Notice to File Missing Parts dated Nov. 18, 2009, 6 pages, Doc 1782.
U.S. Appl. No. 12/613,450: Applicant Response to Pre-Exam Formalities Notice and Preliminary Amendment filed Jan. 19, 2010, 19 pages, Doc 1783.
U.S. Appl. No. 12/613,450: Filing Receipt Jan. 27, 2010, 3 pages, Doc 1784.
U.S. Appl. No. 12/613,450: Notice of Publication dated May 6, 2010, 1 page, Doc 1785.
U.S. Appl. No. 12/613,450: Requirement for Restriction / Election dated Jun. 10, 2011, 5 pages, Doc 1786.
U.S. Appl. No. 12/613,450: Response to Election / Restriction filed Jul. 6, 2011, 20 pages, Doc 1787.
U.S. Appl. No. 12/613,450: Non-Final Rejection dated Aug. 25, 2011, 20 pages, Doc 1788.
U.S. Appl. No. 12/613,450: Amendment / Request for Reconsideration After Non-Final Rejection filed Dec. 27, 2011, 33 pages, Doc 1789.
U.S. Appl. No. 12/613,450: Final Rejection dated Feb. 14, 2012, 18 pages, Doc 1790.
U.S. Appl. No. 12/613,450: Response After Final Action filed Jun. 8, 2012, 24 pages, Doc 1791.
U.S. Appl. No. 12/613,450: Advisory Action and Amendment After Final or Under 37CFR 1.312 dated Jun. 20, 2012, 4 pages, Doc 1792.
U.S. Appl. No. 12/613,450: Request for Continued Examination filed Jul. 12, 2012, 26 pages, Doc 1793.
U.S. Appl. No. 12/613,450: Notice of Allowance and Fees Due filed Oct. 7, 2013, 70 pages, Doc 1794.
U.S. Appl. No. 12/613,450: Terminal Disclaimer filed Jan. 2, 2014, 7 pages, Doc 1798.

(56) References Cited

OTHER PUBLICATIONS

U.S. Appl. No. 12/613,450: Miscellaneous Communication to Applicant dated Jan. 14, 2014, 6 pages, Doc 1799.
U.S. Appl. No. 12/613,450: Issue Notification dated Jan. 22, 2014, 1 page, Doc 1800.
U.S. Appl. No. 14/149,749, filed Jan. 7, 2014, 61 pages, Doc 1801.
U.S. Appl. No. 14/149,749: Notice to File Missing Parts dated Jan. 23, 2014, 7 pages, Doc 1802.
U.S. Appl. No. 14/149,749: Applicant Response to Pre-Exam Formalities Notice filed May 23, 2014, 18 pages, Doc 1803.
U.S. Appl. No. 14/149,749: Notice of Incomplete Reply dated May 29, 2014, 3 pages, Doc 1804.
U.S. Appl. No. 14/149,749: Applicant Response to Pre-Exam Formalities Notice filed Aug. 25, 2014, 108 pages, Doc 1805.
U.S. Appl. No. 14/149,749: Filing Receipt Sep. 4, 2014, 4 pages, Doc 1806.
U.S. Appl. No. 14/149,749: Notice of Publication dated Dec. 11, 2014, 1 page, Doc 1809.
U.S. Appl. No. 14/149,749: Terminal Disclaimer filed Feb. 23, 2015, 5 pages, Doc 1810.
U.S. Appl. No. 14/149,749: Terminal Disclaimer—Electronic—Approved Feb. 23, 2015, 1 page, Doc 1811.
U.S. Appl. No. 14/149,749: Examiner Initiated Interview Summary dated Feb. 24, 2015, 2 pages, Doc 1812.
U.S. Appl. No. 14/149,749: Notice of Allowance and Fees Due dated Apr. 17, 2015, 113 pages, Doc 1813.
U.S. Appl. No. 14/149,749: e-Terminal Disclaimer filed and approved, and Issue Fee Payment filed May 27, 2015, 22 pages, Doc 1815.
U.S. Appl. No. 14/149,749: Response to Amendment Under Rule 312 dated May 29, 2015, 1 page, Doc 1816.
U.S. Appl. No. 14/149,749: Response to Amendment Under Rule 312 dated Jun. 1, 2015, 6 pages, Doc 1817.
U.S. Appl. No. 14/149,749: Issue Notification dated Jun. 17, 2015, 1 page, Doc 1819.
U.S. Appl. No. 14/149,749: Fee Worksheet Aug. 12, 2015, 1 page, Doc 1820.
U.S. Appl. No. 14/726,192: Application, Declaration and Power of Attorney filed May 29, 2015, 65 pages, Doc 1821.
U.S. Appl. No. 14/726,192: Notice to File Missing Parts dated Jun. 9, 2015, 6 pages, Doc 1822.
U.S. Appl. No. 14/726,192: Preliminary Amendment filed Aug. 12, 2015, 119 pages, Doc 1823.
U.S. Appl. No. 14/726,192: Filing Receipt Aug. 20, 2015, 4 pages, Doc 1824.
U.S. Appl. No. 14/726,192: Terminal Disclaimer filed Nov. 20, 2015, 6 pages, Doc 1825.
U.S. Appl. No. 14/726,192: Terminal Disclaimer—Electronic—Approved Nov. 20, 2015, 1 page, Doc 1826.
U.S. Appl. No. 14/726,192: Notice of Publication dated Nov. 27, 2015, 1 page, Doc 1827.
U.S. Appl. No. 14/726,192: Notice of Allowance and Fees Due dated May 2, 2016, 139 pages, Doc 1828.
U.S. Appl. No. 14/726,192: Issue Fee Payment and Amendment After Notice of Allowance filed Jul. 18, 2016, 17 pages, Doc 1830.
U.S. Appl. No. 14/726,192: Response to Amendment Under Rule 312 dated Jul. 21, 2016, 1 page, Doc 1831.
U.S. Appl. No. 14/726,192: Response to Amendment Under Rule 312 and Amendment After Final filed Jul. 22, 2016, 3 pages, Doc 1832.
U.S. Appl. No. 14/726,192: Issue Notification dated Aug. 3, 2016, 1 page, Doc 1834.
U.S. Appl. No. 15/240,964: Preliminary Amendment, Declaration and Power of Attorney filed Aug. 31, 2016, 80 pages, Doc 1835.
U.S. Appl. No. 15/240,964: Filing Receipt and Response Re: Informal Power of Attorney Aug. 31, 2016, 5 pages, Doc 1836.
U.S. Appl. No. 15/240,964: Notice of Publication dated Dec. 8, 2016, 1 page, Doc 1839.
U.S. Appl. No. 15/240,964: Non-Final Rejection dated Mar. 14, 2017, 58 pages, Doc 1840.
U.S. Appl. No. 15/240,964: Amendment / Request for Reconsideration After Non-Final Rejection filed Jun. 14, 2017, 30 pages, Doc 1841.
U.S. Appl. No. 15/240,964: Final Rejection dated Aug. 9, 2017, 185 pages, Doc 1842.
U.S. Appl. No. 15/240,964: Response After Final Action filed Oct. 10, 2017, 33 pages, Doc 1843.
U.S. Appl. No. 15/240,964: Advisory Action dated Oct. 30, 2017, 3 pages, Doc 1844.
U.S. Appl. No. 15/240,964: Request for Continued Examination filed Nov. 9, 2017, 36 pages, Doc 1845.
U.S. Appl. No. 15/240,964: Non-Final Rejection dated Jul. 30, 2018, 267 pages, Doc 1846.
U.S. Appl. No. 15/240,964: Response to Non-Final Rejection filed Oct. 30, 2018, 45 pages, Doc 1847.
U.S. Appl. No. 15/240,964: e-Terminal Disclaimer Filed and Approved Feb. 8, 2019, 8 pages, Doc 1848.
U.S. Appl. No. 15/240,964: Notice of Allowance dated Feb. 21, 2019, 276 pages, Doc 1849.
U.S. Appl. No. 15/240,964: Issue Fee Payment and Response Under 37 CFR § 1.312 filed May 16, 2019, 16 pages, Doc 1045.
U.S. Appl. No. 15/240,964: Notice to File Corrected Application Papers dated May 16, 2019, 3 pages, Doc 1046.
U.S. Appl. No. 15/240,964: Response to Notice to File Corrected Application Papers filed Jul. 22, 2019, 11 pages, Doc 1853.
U.S. Appl. No. 15/240,964: Issue Notification dated Aug. 21, 2019, 1 page, Doc 1048.
U.S. Appl. No. 16/427,054: U.S. Appl. No. 16/427,054, filed May 30, 2019, 68 pages, Doc 1049.
U.S. Appl. No. 16/427,054: Filing Receipt and Notice to File Missing Parts dated Jun. 6, 2019, 7 pages, Doc 1857.
U.S. Appl. No. 16/427,054: Response to Notice to File Missing Parts and Preliminary Amendment filed Aug. 8, 2019, 19 pages, Doc 1052.
U.S. Appl. No. 16/427,054: Updated Filing Receipt dated Aug. 12, 2019, 4 pages, Doc 1053.
U.S. Appl. No. 16/427,054: Notice of Publication dated Nov. 21, 2019, 1 page, Doc 1054.
U.S. Appl. No. 16/427,054: Non-Final Rejection dated Nov. 9, 2020, 367 pages, Doc 1861.
U.S. Appl. No. 16/427,054: Response to Non-Final Rejection dated Feb. 8, 2021, 22 pages, Doc 2163.
U.S. Appl. No. 16/427,054: Terminal Disclaimer Feb. 8, 2021, 5 pages, Doc 2164.
U.S. Appl. No. 16/427,054: Final Office Action dated Mar. 25, 2021, 22 pages, Doc 2176.
U.S. Appl. No. 16/427,054: Request for Continued Examination filed Aug. 25, 2021, 3 pages, Doc 2338.
U.S. Appl. No. 11/320,538: Transmittal of New Application filed Dec. 27, 2005, 76 pages, Doc 1862.
U.S. Appl. No. 11/320,538: Pre-Exam Formalities Notice dated Feb. 2, 2006, 2 pages, Doc 1863.
U.S. Appl. No. 11/320,538: Applicant Response to Pre-Exam Formalities Notice filed Aug. 4, 2006, 36 pages, Doc 1864.
U.S. Appl. No. 11/320,538: Non-Final Rejection dated Apr. 1, 2009, 27 pages, Doc 1865.
U.S. Appl. No. 11/320,538: Amendment / Request for Reconsideration After Non-Final Rejection dated Jul. 1, 2009, 26 pages, Doc 1866.
U.S. Appl. No. 11/320,538: Final Rejection dated Nov. 2, 2009, 29 pages, Doc 1867.
U.S. Appl. No. 11/320,538: Amendment Submitted / Entered with Filing of CPA / RCE filed Jan. 4, 2010, 24 pages, Doc 1868.
U.S. Appl. No. 11/320,538: Advisory Action dated Jan. 19, 2010, 4 pages, Doc 1869.
U.S. Appl. No. 11/320,538: Request for Continued Examination filed Apr. 2, 2010, 29 pages, Doc 1870.
U.S. Appl. No. 11/320,538: Non-Final Rejection dated Jun. 9, 2010, 24 pages, Doc 1871.
U.S. Appl. No. 11/320,538: Final Rejection dated Dec. 22, 2010, 28 pages, Doc 1872.
U.S. Appl. No. 11/320,538: Notice of Appeal Filed and Pre-Brief Conference Request filed May 23, 2011, 10 pages, Doc 1873.

(56) References Cited

OTHER PUBLICATIONS

U.S. Appl. No. 11/320,538: Pre-Brief Appeal Conference Decision Jun. 30, 2011, 2 pages, Doc 1874.
U.S. Appl. No. 11/320,538: Request for Continued Examination filed Dec. 23, 2011, 26 pages, Doc 1875.
U.S. Appl. No. 11/320,538: Non-Final Rejection dated Dec. 19, 2012, 50 pages, Doc 1876.
U.S. Appl. No. 11/320,538: Amendment / Request for Reconsideration After Non-Final Rejection filed Apr. 17, 2013, 25 pages, Doc 1877.
U.S. Appl. No. 11/320,538: Notice of Allowance and Fees Due dated Aug. 1, 2013, 49 pages, Doc 1878.
U.S. Appl. No. 11/320,538: Issue Fee Payment filed Nov. 1, 2013, 9 pages, Doc 1879.
U.S. Appl. No. 11/320,538: Notice of Allowance and Fees Due dated Nov. 19, 2013, 46 pages, Doc 1880.
U.S. Appl. No. 11/320,538: Issue Notification dated Dec. 4, 2013, 1 page, Doc 1882.
U.S. Appl. No. 14/086,741, filed Nov. 21, 2013, 79 pages, Doc 1883.
U.S. Appl. No. 14/086,741: Notice to File Missing Parts and Filing Receipt dated Dec. 12, 2013, 7 pages, Doc 1884.
U.S. Appl. No. 14/086,741: Preliminary Amendment and Applicant Response to Pre-Exam Formalities Notice filed Jun. 12, 2014, 89 pages, Doc 1885.
U.S. Appl. No. 14/086,741: Filing Receipt Jun. 17, 2014, 4 pages, Doc 1886.
U.S. Appl. No. 14/086,741: Notice of Publication dated Sep. 25, 2014, 1 page, Doc 1887.
U.S. Appl. No. 14/086,741: Terminal Disclaimer and Power of Attorney filed Sep. 29, 2014, 7 pages, Doc 1888.
U.S. Appl. No. 14/086,741: Terminal Disclaimer Review Decision Sep. 30, 2014, 1 page, Doc 1889.
U.S. Appl. No. 14/086,741: Notice of Allowance and Fees Due and Communication Re: Power of Attorney dated Oct. 3, 2014, 46 pages, Doc 1890.
U.S. Appl. No. 14/086,741: Miscellaneous Communication to Applicant and List of References dated Nov. 26, 2014, 3 pages, Doc 1891.
U.S. Appl. No. 14/086,741: Amendment after Notice of Allowance and Issue Fee Payment filed Jan. 5, 2015, 19 pages, Doc 1892.
U.S. Appl. No. 14/086,741: Petition Auto-Grant Letter from EFS Jan. 7, 2015, 2 pages, Doc 1894.
U.S. Appl. No. 14/086,741: Response to Amendment under Rule 312 filed Jan. 22, 2015, 2 pages, Doc 1895.
U.S. Appl. No. 14/086,741: Notice of Allowance and Fees Due dated Mar. 16, 2015, 48 pages, Doc 1896.
U.S. Appl. No. 14/086,741: Issue Notification dated Apr. 1, 2015, 1 page, Doc 1898.
U.S. Appl. No. 14/596,154: Application and Declaration filed Jan. 13, 2015, 82 pages, Doc 1899.
U.S. Appl. No. 14/596,154: Notice to File Missing Parts and Filing Receipt dated Jan. 27, 2015, 7 pages, Doc 1901.
U.S. Appl. No. 14/596,154: Preliminary Amendment and Applicant Response to Pre-Exam Formalities Notice filed Mar. 27, 2015, 88 pages, Doc 1902.
U.S. Appl. No. 14/596,154: Filing Receipt Apr. 2, 2015, 3 pages, Doc 1903.
U.S. Appl. No. 14/596,154: e-Terminal Disclaimer filed and Approved Nov. 20, 2015, 7 pages, Doc 1905.
U.S. Appl. No. 14/596,154: Non-Final Rejection dated Sep. 21, 2017, 121 pages, Doc 1906.
U.S. Appl. No. 14/596,154: Amendment / Request for Reconsideration After Non-Final Rejection filed Dec. 21, 2017, 48 pages, Doc 1907.
U.S. Appl. No. 14/596,154: Notice of Allowance and Fees Due dated May 2, 2018, 56 pages, Doc 1908.
U.S. Appl. No. 14/596,154: Notice of Allowance and Fees Due dated May 21, 2018, 11 pages, Doc 1909.
U.S. Appl. No. 14/596,154: Issue Fee Payment filed Jul. 27, 2018, 8 pages, Doc 1910.
U.S. Appl. No. 14/596,154: List of References and Considered by Examiner Aug. 8, 2018, 2 pages, Doc 1912.
U.S. Appl. No. 14/596,154: Issue Notification dated Aug. 21, 2018, 1 page, Doc 1913.
U.S. Appl. No. 16/710,731: Reissue Application filed Dec. 11, 2019, 91 pages, Doc 1914.
U.S. Appl. No. 16/710,731: Filing Receipt dated Dec. 12, 2019, 5 pages, Doc 1915.
U.S. Appl. No. 16/710,731: Request for Corrected Filing Receipt filed Feb. 19, 2020, 16 pages, Doc 1916.
U.S. Appl. No. 16/710,731: Corrected Filing Receipt dated Feb. 24, 2020, 4 pages, Doc 1066.
U.S. Appl. No. 16/710,731: Non-Final Rejection dated Nov. 24, 2020, 15 pages, Doc 1918.
U.S. Appl. No. 16/710,731: Response to Non-Final Rejection dated Nov. 24, 2020, 21 pages, Doc 2177.
U.S. Appl. No. 16/710,731: Response to Non-Final Rejection filed Mar. 23, 2021, 21 pages, Doc 2307.
U.S. Appl. No. 16/710,731: Non-Final Rejection dated Apr. 21, 2021, 11 pages, Doc 2292.
U.S. Appl. No. 16/710,731: Response to Non-Final Rejection filed Sep. 15, 2021, 24 pages, Doc 2348.
U.S. Appl. No. 16/048,113, filed Jul. 27, 2018, 86 pages, Doc 1919.
U.S. Appl. No. 16/048,113: Filing Receipt and Notice to File Missing Parts dated Aug. 24, 2018, 6 pages, Doc 1920.
U.S. Appl. No. 16/048,113: Notice of Publication dated Jan. 31, 2019, 1 page, Doc 1923.
U.S. Appl. No. 16/048,113: Non-Final Rejection dated Oct. 2, 2020, 130 pages, Doc 1924.
U.S. Appl. No. 16/048,113: Response to Non-Final Rejection dated Feb. 2, 2021, 22 pages, Doc 2165.
U.S. Appl. No. 16/048,113: Terminal Disclaimer Oct. 2, 2020, 5 pages, Doc 2166.
U.S. Appl. No. 16/048,113: Notice of Allowance/Allowability dated Apr. 6, 2021, 75 pages, Doc 2293.
U.S. Appl. No. 16/048,113: Issue Fee Payment and 312 Response filed Jul. 6, 2021, 12 pages, Doc 2307.
U.S. Appl. No. 16/048,113: Issue Notification dated Aug. 4, 2021, 1 page, Doc 2339.
U.S. Appl. No. 17/396,488: Patent Application filed Aug. 6, 2021, 84 pages, Doc 2340.
U.S. Appl. No. 17/396,488: Filing Receipt and Notice of Missing Parts dated Aug. 19, 2021, 7 pages, Doc 2341.
U.S. Appl. No. 11/361,500: Transmittal of New Application Feb. 23, 2006, 77 pages, Doc 1925.
U.S. Appl. No. 11/361,500: Pre-Exam Formalities Notice dated Mar. 23, 2006, 2 pages, Doc 1926.
U.S. Appl. No. 11/361,500: Applicant Response to Pre-Exam Formalities Notice filed Jul. 19, 2006, 27 pages, Doc 1927.
U.S. Appl. No. 11/361,500: Notice of Publication dated Nov. 16, 2006, 1 page, Doc 1928.
U.S. Appl. No. 11/361,500: Non-Final Rejection dated May 27, 2009, 27 pages, Doc 1929.
U.S. Appl. No. 11/361,500: Amendment / Request for Reconsideration After Non-Final Rejection filed Aug. 27, 2009, 37 pages, Doc 1930.
U.S. Appl. No. 11/361,500: Notice of Allowance and Fees Due dated Dec. 11, 2009, 134 pages, Doc 1931.
U.S. Appl. No. 11/361,500: Issue Fee Payment and Amendment After Notice of Allowance filed Jan. 6, 2010, 26 pages, Doc 1932.
U.S. Appl. No. 11/361,500: Response to Amendment Under Rule 312 dated Jan. 25, 2010, 7 pages, Doc 1933.
U.S. Appl. No. 11/361,500: Issue Notification dated Feb. 24, 2010, 1 page, Doc 1934.
U.S. Appl. No. 11/361,500: Filing Receipt and Notice to File Missing Parts dated Feb. 25, 2010, 5 pages, Doc 1936.
U.S. Appl. No. 11/361,500: Applicant Response to Pre-Exam Formalities Notice filed Apr. 26, 2010, 13 pages, Doc 1937.
U.S. Appl. No. 11/361,500: Filing Receipt May 4, 2010, 3 pages, Doc 1938.
U.S. Appl. No. 11/361,500: Notice of Publication dated Aug. 12, 2010, 1 page, Doc 1939.

(56) References Cited

OTHER PUBLICATIONS

U.S. Appl. No. 11/361,500: Non-Final Rejection dated Aug. 30, 2012, 31 pages, Doc 1940.
U.S. Appl. No. 11/361,500: Amendment / Request for Reconsideration After Non-Final Rejection filed Nov. 20, 2012, 15 pages, Doc 1941.
U.S. Appl. No. 11/361,500: Terminal Disclaimer filed Jan. 2, 2013, 5 pages, Doc 1942.
U.S. Appl. No. 11/361,500: Terminal Disclaimer Review Decision Jan. 4, 2013, 1 page, Doc 1943.
U.S. Appl. No. 11/361,500: Notice of Allowance and Fees Due dated Jan. 10, 2013, 144 pages, Doc 1944.
U.S. Appl. No. 11/361,500: Issue Fee Payment dateed Apr. 10, 2013, 8 pages, Doc 1945.
U.S. Appl. No. 11/361,500: Issue Notification dated Apr. 24, 2013, 1 page, Doc 1948.
U.S. Appl. No. 12/702,243: Application and Preliminary Amendment filed Feb. 8, 2010, 84 pages, Doc 1952.
U.S. Appl. No. 12/702,243: Notice to File Missing Parts and Filing Receipt dated Feb. 25, 2010, 5 pages, Doc 1953.
U.S. Appl. No. 12/702,243: Applicant Response to Pre-Exam Formalities Notice dated Apr. 26, 2010, 13 pages, Doc 1954.
U.S. Appl. No. 12/702,243: Filing Receipt May 4, 2010, 3 pages, Doc 1955.
U.S. Appl. No. 12/702,243: Notice of Publication dated Aug. 12, 2010, 1 page, Doc 1956.
U.S. Appl. No. 12/702,243: Non-Final Rejection dated Aug. 30, 2012, 31 pages, Doc 1957.
U.S. Appl. No. 12/702,243: Amendment / Request for Reconsideration After Non-Final Rejection filed Nov. 20, 2012, 15 pages, Doc 1958.
U.S. Appl. No. 12/702,243: Terminal Disclaimer filed Jan. 2, 2013, 5 pages, Doc 1959.
U.S. Appl. No. 12/702,243: Terminal Disclaimer Review Decision Jan. 4, 2013, 1 page, Doc 1960.
U.S. Appl. No. 12/702,243: Notice of Allowance and Fees Due dated Jan. 10, 2013, 120 pages, Doc 1961.
U.S. Appl. No. 12/702,243: Issue Fee Payment and Post-Allowance Communication filed Apr. 10, 2013, 8 pages, Doc 1962.
U.S. Appl. No. 12/702,243: List of References and Considered by Examiner Apr. 13, 2013, 4 pages, Doc 1964.
U.S. Appl. No. 12/702,243: Issue Notification dated Apr. 24, 2013, 1 page, Doc 1965.
U.S. Appl. No. 13/860,482: Application and Preliminary Amendment filed Apr. 10, 2013, 99 pages, Doc 1969.
U.S. Appl. No. 13/860,482: Notice to File Missing Parts and Filing Receipt dated May 21, 2013, 6 pages, Doc 1970.
U.S. Appl. No. 13/860,482: Applicant Response to Pre-Exam Formalities Notice filed Oct. 22, 2013, 7 pages, Doc 1971.
U.S. Appl. No. 13/860,482: Filing Receipt and Fee Worksheet Oct. 28, 2013, 4 pages, Doc 1972.
U.S. Appl. No. 13/860,482: Notice of Publication dated Feb. 6, 2014, 1 page, Doc 1973.
U.S. Appl. No. 13/860,482: Non-Final Rejection dated Jun. 9, 2014, 14 pages, Doc 1974.
U.S. Appl. No. 13/860,482: Amendment / Request for Reconsideration After Non-Final Rejection and Terminal Disclaimer filed Sep. 8, 2014, 24 pages, Doc 1975.
U.S. Appl. No. 13/860,482: Terminal Disclaimer Review Decision Sep. 9, 2014, 1 page, Doc 1976.
U.S. Appl. No. 13/860,482: Terminal Disclaimer Filed Oct. 8, 2014, 4 pages, Doc 1978.
U.S. Appl. No. 13/860,482: Terminal Disclaimer Review Decision Oct. 9, 2014, 1 page, Doc 1979.
U.S. Appl. No. 13/860,482: Notice of Allowance and Fees Due dated Nov. 5, 2014, 95 pages, Doc 1981.
U.S. Appl. No. 13/860,482: Issue Fee Payment and Amendment Made After Notice of Allowance filed Feb. 4, 2015, 8 pages, Doc 1982.
U.S. Appl. No. 13/860,482: Issue Information Including Classification, Examiner, Name, Claim, Renumbering, etc. Feb. 6, 2015, 1 page, Doc 1983.
U.S. Appl. No. 13/860,482: Issue Notification dated Mar. 4, 2015, 1 page, Doc 1985.
U.S. Appl. No. 14/614,292: Application and Declaration filed Feb. 4, 2015, 82 pages, Doc 1986.
U.S. Appl. No. 14/614,292: Notice to File Missing Parts and Filing Receipt dated Feb. 20, 2015, 6 pages, Doc 1987.
U.S. Appl. No. 14/614,292: Applicant Response to Pre-Exam Formalities Notice dated Apr. 17, 2015, 34 pages, Doc 1988.
U.S. Appl. No. 14/614,292: Filing Receipt and Fee Worksheet Apr. 24, 2015, 4 pages, Doc 1989.
U.S. Appl. No. 14/614,292: Notice of Publication dated Aug. 6, 2015, 1 page, Doc 1990.
U.S. Appl. No. 14/614,292: e-Terminal Disclaimer Filed and Approved Nov. 20, 2015, 7 pages, Doc 1991.
U.S. Appl. No. 14/614,292: Non-Final Rejection dated May 19, 2016, 84 pages, Doc 1992.
U.S. Appl. No. 14/614,292: Amendment / Request for Reconsideration After Non-Final Rejection filed Aug. 18, 2016, 23 pages, Doc 1993.
U.S. Appl. No. 14/614,292: Notice of Allowance and Fees Due dated Sep. 21, 2016, 153 pages, Doc 1994.
U.S. Appl. No. 14/614,292: Issue Fee Payment and Amendment After Notice of Allowance filed Dec. 21, 2016, 8 pages, Doc 1995.
U.S. Appl. No. 14/614,292: Issue Notification dated Jan. 18, 2017, 1 page, Doc 1997.
U.S. Appl. No. 15/411,823: Application, Power of Attorney, Declaration and Preliminary Amendment filed Jan. 20, 2017, 116 pages, Doc 1998.
U.S. Appl. No. 15/411,823: Filing Receipt and Fee Worksheet Jan. 31, 2017, 4 pages, Doc 1999.
U.S. Appl. No. 15/411,823: Notice of Publication dated May 11, 2017, 1 page, Doc 2000.
U.S. Appl. No. 15/411,823: Non-Final Rejection dated Jan. 25, 2018, 85 pages, Doc 2001.
U.S. Appl. No. 15/411,823: e-Terminal Disclaimer Filed and Approved Apr. 24, 2018, 28 pages, Doc 2002.
U.S. Appl. No. 15/411,823: Notice of Allowance and Fees Due filed Jul. 13, 2018, 101 pages, Doc 2003.
U.S. Appl. No. 15/411,823: Issue Fee Payment filed and Miscellaneous Incoming Letter Oct. 15, 2018, 8 pages, Doc 2004.
U.S. Appl. No. 15/411,823: Issue Notification dated Nov. 7, 2018, 1 page, Doc 2008.
U.S. Appl. No. 16/164,430, filed Oct. 18, 2018, 84 pages, Doc 2009.
U.S. Appl. No. 16/164,430: Notice to File Missing Parts and Filing Receipt Nov. 6, 2018, 7 pages, Doc 2010.
U.S. Appl. No. 16/164,430: Response to Notice of Missing Parts filed Jan. 18, 2019, 37 pages, Doc 2011.
U.S. Appl. No. 16/164,430: Updatd Filing Receipt Jan. 23, 2019, 5 pages, Doc 2012.
U.S. Appl. No. 16/164,430: Notice of Publication dated May 2, 2019, 1 page, Doc 2013.
U.S. Appl. No. 16/164,430: Non-Final Rejection dated Oct. 18, 2019, 122 pages, Doc 2014.
U.S. Appl. No. 16/164,430: Non-final Office Action dated Oct. 18, 2019, 107 pages, Doc 1058.
U.S. Appl. No. 16/164,430: Response to Non-Final Rejection filed Jan. 21, 2020, 15 pages, Doc 2015.
U.S. Appl. No. 16/164,430: Notice of Allowance dated Mar. 6, 2020, 86 pages, Doc 2016.
U.S. Appl. No. 16/164,430: Issue Fee Payment filed Jun. 8, 2020, 4 pages, Doc 2017.
U.S. Appl. No. 16/164,430: Supplemental Notice of Allowability dated Jun. 16, 2020, 12 pages, Doc 2018.
U.S. Appl. No. 16/164,430: Issue Notification dated Jun. 17, 2020, 1 page, Doc 2154.
U.S. Appl. No. 16/164,430: Request for Certificate of Correction filed Sep. 3, 2020, 6 pages, Doc 2021.
U.S. Appl. No. 16/164,430: Certificate of Correction Oct. 6, 2020, 1 page, Doc 2023.
U.S. Appl. No. 16/898,134, filed Jun. 10, 2020, 84 pages, Doc 2024.

(56) References Cited

OTHER PUBLICATIONS

U.S. Appl. No. 16/898,134: Filing Receipt and Notice to File Missing Parts dated Jun. 19, 2020, 8 pages, Doc 2025.
U.S. Appl. No. 16/898,134: Preliminary Amendment and Response to Mising Parts filed Aug. 18, 2020, 39 pages, Doc 2026.
U.S. Appl. No. 16/898,134: Updated Filing Receipt Aug. 21, 2020, 6 pages, Doc 2027.
U.S. Appl. No. 16/898,134: Notice of Publication dated Nov. 27, 2020, 2 pages, Doc 2028.
U.S. Appl. No. 16/898,134: Non-final Office Action dated Jun. 30, 2021, 57 pages, Doc 2308.
U.S. Appl. No. 16/898,134: Response to Non-final Office Action and Terminal Disclaimer filed Jul. 30, 2021, 30 pages, Doc 2342.
U.S. Appl. No. 16/898,134: Notice of Allowance/Allowability dated Sep. 22, 2021, 8 pages, Doc 2349.
U.S. Appl. No. 16/898,134: Supplemental Notice of Allowability dated Oct. 14, 2021, 23 pages, Doc 2362.
U.S. Appl. No. 11/412,417, filed Apr. 26, 2006, 96 pages, Doc 2029.
U.S. Appl. No. 11/412,417: Pre-Exam Formalities Notice dated May 19, 2006, 2 pages, Doc 2030.
U.S. Appl. No. 11/412,417: Applicant Response to Pre-Exam Formalities Notice filed Jul. 19, 2006, 14 pages, Doc 2031.
U.S. Appl. No. 11/412,417: Non-Final Rejection dated Apr. 1, 2008, 53 pages, Doc 2032.
U.S. Appl. No. 11/412,417: Amendment / Request for Reconsideration After Non-Final Rejection filed Aug. 1, 2008, 34 pages, Doc 2033.
U.S. Appl. No. 11/412,417: Final Rejection Nov. 13, 2008, 40 pages, Doc 2034.
U.S. Appl. No. 11/412,417: Request for Continued Examination and Amendment Submitted with Filing of Request for Continued Examination filed May 12, 2009, 36 pages, Doc 2035.
U.S. Appl. No. 11/412,417: Non-Final Rejection dated Jun. 30, 2009, 141 pages, Doc 2036.
U.S. Appl. No. 11/412,417: Amendment / Request for Reconsideration After Non-Final Rejection filed Oct. 30, 2009, 36 pages, Doc 2037.
U.S. Appl. No. 11/412,417: Final Rejection dated Jan. 4, 2010, 43 pages, Doc 2038.
U.S. Appl. No. 11/412,417: Request for Continued Examination filed May 4, 2010, 32 pages, Doc 2039.
U.S. Appl. No. 11/412,417: Supplemental Remarks or Supplemental Amendment filed Jun. 22, 2010, 25 pages, Doc 2040.
U.S. Appl. No. 11/412,417: Notice of Allowance and Fees Due dated Jul. 6, 2010, 23 pages, Doc 2041.
U.S. Appl. No. 11/412,417: Request for Continued Examination filed Oct. 5, 2010, 4 pages, Doc 2043.
U.S. Appl. No. 11/412,417: Notice of Allowance and Fees Due dated Oct. 26, 2010, 17 pages, Doc 2044.
U.S. Appl. No. 11/412,417: Issue Fee Payment and Miscellaneous Incoming Letter filed Jan. 26, 2011, 3 pages, Doc 2045.
U.S. Appl. No. 11/412,417: Issue Notification dated Feb. 9, 2011, 1 page, Doc 2047.
U.S. Appl. No. 13/030,084: Application and Declaration filed Feb. 17, 2011, 105 pages, Doc 2048.
U.S. Appl. No. 13/030,084: Notice to File Missing Parts dated Mar. 3, 2011, 6 pages, Doc 2049.
U.S. Appl. No. 13/030,084: Applicant Response to Pre-Exam Formalities Notice filed Aug. 3, 2011, 29 pages, Doc 2050.
U.S. Appl. No. 13/030,084: Filing Receipt Aug. 11, 2011, 4 pages, Doc 2051.
U.S. Appl. No. 13/030,084: Non-Final Rejection dated Oct. 26, 2011, 39 pages, Doc 2052.
U.S. Appl. No. 13/030,084: Notice of Publication dated Nov. 17, 2011, 1 page, Doc 2053.
U.S. Appl. No. 13/030,084: Informal or Non-Responsive Amendment filed Jan. 26, 2012, 35 pages, Doc 2054.
U.S. Appl. No. 13/030,084: Notice to Applicant Regarding a Non-Compliant or Non-Responsive Amendment dated Jan. 31, 2012, 4 pages, Doc 2055.
U.S. Appl. No. 13/030,084: Amendment / Request for Reconsideration After Non-Final Rejection filed Feb. 9, 2012, 36 pages, Doc 2056.
U.S. Appl. No. 13/030,084: Final Rejection dated Mar. 28, 2012, 62 pages, Doc 2057.
U.S. Appl. No. 13/030,084: Response After Final Action filed Jun. 14, 2012, 90 pages, Doc 2058.
U.S. Appl. No. 13/030,084: Advisory Action dated Jun. 26, 2012, 4 pages, Doc 2059.
U.S. Appl. No. 13/030,084: Request for Continued Examination filed Jul. 23, 2012, 91 pages, Doc 2060.
U.S. Appl. No. 13/030,084: Notice to Applicant Regarding a Non-Compliant or Non-Responsive Amendment dated Jul. 25, 2012, 2 pages, Doc 2061.
U.S. Appl. No. 13/030,084: Amendment / Request for Reconsideration After Non-Final Rejection filed Jan. 2, 2013, 40 pages, Doc 2062.
U.S. Appl. No. 13/030,084: Non-Final Rejection dated Apr. 30, 2013, 45 pages, Doc 2064.
U.S. Appl. No. 13/030,084: Amendment / Request for Reconsideration After Non-Final Rejection dated Jul. 30, 2013, 30 pages, Doc 2065.
U.S. Appl. No. 13/030,084: Non-Final Rejection dated Oct. 10, 2013, 50 pages, Doc 2066.
U.S. Appl. No. 13/030,084: Amendment / Request for Reconsideration After Non-Final Rejection filed Jan. 2, 2014, 27 pages, Doc 2067.
U.S. Appl. No. 13/030,084: Final Rejection dated Mar. 19, 2014, 48 pages, Doc 2068.
U.S. Appl. No. 13/030,084: Amendment Submitted / Entered with Filing of CPA / Request for Continued Examination filed May 19, 2014, 41 pages, Doc 2069.
U.S. Appl. No. 13/030,084: Advisory Action dated Jun. 6, 2014, 6 pages, Doc 2070.
U.S. Appl. No. 13/030,084: Applicant Initiated Interview Summary dated Jul. 1, 2014, 3 pages, Doc 2071.
U.S. Appl. No. 13/030,084: Request for Continued Examination filed Aug. 15, 2014, 31 pages, Doc 2072.
U.S. Appl. No. 13/030,084: Non-Final Rejection dated Mar. 24, 2015, 45 pages, Doc 2073.
U.S. Appl. No. 13/030,084: Amendment / Request for Reconsideration After Non-Final Rejection filed Jun. 24, 2015, 31 pages, Doc 2074.
U.S. Appl. No. 13/030,084: e-Terminal Disclaimer filed and approved and Communication Re: Power of Attorney Sep. 10, 2015, 9 pages, Doc 2077.
U.S. Appl. No. 13/030,084: Notice of Allowance and Fees Due dated Sep. 17, 2015, 46 pages, Doc 2078.
U.S. Appl. No. 13/030,084: Post-Allowance Communication—Incoming dated Nov. 13, 2015, 4 pages, Doc 2082.
U.S. Appl. No. 13/030,084: Miscellaneous Communication Applicant dated Nov. 30, 2015, 49 pages, Doc 2083.
U.S. Appl. No. 13/030,084: Issue Fee Payment filed Dec. 10, 2015, 8 pages, Doc 2084.
U.S. Appl. No. 13/030,084: Issue Notification dated Jan. 16, 2016, 1 page, Doc 2086.
U.S. Appl. No. 14/968,429, filed Dec. 14, 2015, 119 pages, Doc 2087.
U.S. Appl. No. 14/968,429: Filing Receipt and Notice to File Corrected Application Papers dated Jan. 4, 2016, 6 pages, Doc 2088.
U.S. Appl. No. 14/968,429: Applicant Response to Pre-Exam Formalities Notice filed Jan. 14, 2016, 38 pages, Doc 2089.
U.S. Appl. No. 14/968,429: Filing Receipt and Miscellaneous Communication to Applicant dated Jan. 21, 2016, 5 pages, Doc 2090.
U.S. Appl. No. 14/968,429: Notice of Publication dated Apr. 28, 2016, 1 page, Doc 2093.
U.S. Appl. No. 14/968,429: Non-Final Rejection dated May 15, 2017, 56 pages, Doc 2094.
U.S. Appl. No. 14/968,429: Amendment / Request for Reconsideration After Non-Final Rejection, 22 pages, Doc 2095.
U.S. Appl. No. 14/968,429: Final Rejection dated Oct. 24, 2017, 11 pages, Doc 2096.

(56) References Cited

OTHER PUBLICATIONS

U.S. Appl. No. 14/968,429: Response After Final Action and After Final Consideration Program Request filed Dec. 26, 2017, 31 pages, Doc 2097.
U.S. Appl. No. 14/968,429: Advisory Action and After Final Consideration Program Decision dated Jan. 11, 2018, 7 pages, Doc 2098.
U.S. Appl. No. 14/968,429: e-Terminal Disclaimer filed and Approved and Response After Final Action filed Feb. 7, 2018, 25 pages, Doc 2099.
U.S. Appl. No. 14/968,429: Amendment After Final filed Feb. 26, 2018, 16 pages, Doc 2100.
U.S. Appl. No. 14/968,429: Notice of Allowance and Fees Due dated Mar. 19, 2018, 47 pages, Doc 2101.
U.S. Appl. No. 14/968,429: Amendment After Notice of Allowance and Issue Fee Payment filed May 29, 2018, 17 pages, Doc 2102.
U.S. Appl. No. 14/968,429: Amendment After Notice of Allowance filed May 31, 2018, 14 pages, Doc 2103.
U.S. Appl. No. 14/968,429: Amendment After Notice of Allowance filed Jun. 13, 2018, 14 pages, Doc 2104.
U.S. Appl. No. 14/968,429: Response to Amendment Under Rule 312 dated Jul. 10, 2018, 5 pages, Doc 2105.
U.S. Appl. No. 14/968,429: Response to Amendment Under Rule 312 dated Jul. 23, 2018, 3 pages, Doc 2106.
U.S. Appl. No. 14/968,429: Issue Notification dated Aug. 1, 2018, 1 page, Doc 2107.
U.S. Appl. No. 14/968,429: Request for Certificate of Correction filed Oct. 12, 2018, 6 pages, Doc 2108.
U.S. Appl. No. 14/968,429: Certificate of Correction Nov. 20, 2018, 1 page, Doc 2109.
U.S. Appl. No. 16/048,061, filed Jul. 27, 2018, 109 pages, Doc 2110.
U.S. Appl. No. 16/048,061: Notice to File Missing Parts and Filing Receipt dated Aug. 13, 2018, 7 pages, Doc 2111.
U.S. Appl. No. 16/048,061: Applicant Response to Pre-Exam Formalities Notice filed Oct. 12, 2018, 45 pages, Doc 2112.
U.S. Appl. No. 16/048,061: Filing Receipt Oct. 16, 2018, 5 pages, Doc 2113.
U.S. Appl. No. 16/048,061: Request for Corrected Filing Receipt filed Oct. 31, 2018, 8 pages, Doc 2114.
U.S. Appl. No. 16/048,061: Filing Receipt Nov. 5, 2018, 4 pages, Doc 2115.
U.S. Appl. No. 16/048,061: Notice of Publication dated Jan. 24, 2019, 1 page, Doc 2116.
U.S. Appl. No. 16/048,061: Non-Final Rejection dated Sep. 25, 2020, 68 pages, Doc 2117.
U.S. Appl. No. 16/048,061: Response to Non-Final Rejection filed Jan. 25, 2021, 17 pages, Doc 2167.
U.S. Appl. No. 16/048,061: Terminal Disclaimer filed Jan. 25, 2021, 6 pages, Doc 2168.
U.S. Appl. No. 16/048,061: Notice of Allowance/Allowability dated Apr. 9, 2021, 33 pages, Doc 2294.
U.S. Appl. No. 16/048,061: Issue Fee Payment and 312 Response filed Jul. 9, 2021, 19 pages, Doc 2312.
U.S. Appl. No. 16/048,061: eTerminal Disclaimer filed Jul. 9, 2021, 3 pages, Doc 2313.
U.S. Appl. No. 16/048,061: Issue Notification dated Aug. 4, 2021, 1 page, Doc 2350.
U.S. Appl. No. 16/164,535, filed Oct. 18, 2018, 122 pages, Doc 2118.
U.S. Appl. No. 16/164,535: Notice to File Corrected Application Papers and Filing Receipt dated Nov. 7, 2018, 7 pages, Doc 2119.
U.S. Appl. No. 16/164,535: Applicant Response to Pre-Exam Formalities Notice filed Jan. 7, 2019, 27 pages, Doc 2120.
U.S. Appl. No. 16/164,535: Updated Filing Receipt Jan. 11, 2019, 5 pages, Doc 2121.
U.S. Appl. No. 16/164,535: Notice of Publication dated Apr. 25, 2019, 1 page, Doc 2122.
U.S. Appl. No. 16/164,535: Non-Final Rejection dated Nov. 24, 2020, 76 pages, Doc 2123.
U.S. Appl. No. 16/164,535: Response to Non-Final Rejection filed Feb. 19, 2021, 17 pages, Doc 2169.
U.S. Appl. No. 16/164,535: Terminal Disclaimer filed Feb. 19, 2021, 6 pages, Doc 2170.
U.S. Appl. No. 16/164,535: Notice of Allowance/Allowability dated Feb. 19, 2021, 6 pages, Doc 2295.
U.S. Appl. No. 16/164,535: Request for Continued Examination and Amendment filed Jun. 17, 2021, 58 pages, Doc 2309.
U.S. Appl. No. 16/164,535: Notice of Allowance / Allowability and Examiner-Initialed SB08 Listing dated Jul. 8, 2021, 20 pages, Doc 2311.
U.S. Appl. No. 16/164,535: Issue Fee Payment and 312 Response filed Oct. 8, 2021, 17pages, Doc 2356.
U.S. Appl. No. 11/480,094: Application filed Jun. 29, 2006, 125 pages, Doc 2124.
U.S. Appl. No. 11/480,094: Pre-Exam Formalities Notice dated Aug. 2, 2006, 2 pages, Doc 2125.
U.S. Appl. No. 11/480,094: Applicant Response to Pre-Exam Formalities Notice filed Nov. 2, 2006, 32 pages, Doc 2126.
U.S. Appl. No. 11/480,094: Filing Receipt Dec. 7, 2006, 3 pages, Doc 2127.
U.S. Appl. No. 11/480,094: Non-Final Rejection dated Nov. 7, 2008, 28 pages, Doc 2128.
U.S. Appl. No. 11/480,094: Amendment / Request for Reconsideration After Non-Final Rejection filed May 7, 2009, 37 pages, Doc 2129.
U.S. Appl. No. 11/480,094: Final Rejection dated Jul. 28, 2009, 16 pages, Doc 2130.
U.S. Appl. No. 11/480,094: Request for Continued Examination filed Dec. 28, 2009, 39 pages, Doc 2131.
U.S. Appl. No. 11/480,094: Non-Final Rejection dated Dec. 15, 2010, 33 pages, Doc 2132.
U.S. Appl. No. 11/480,094: Amendment / Request for Reconsideration After Non-Final Rejection filed May 16, 2011, 34 pages, Doc 2133.
U.S. Appl. No. 11/480,094: Final Rejection dated Aug. 1, 2011, 26 pages, Doc 2134.
U.S. Appl. No. 11/480,094: Response After Final Action filed Nov. 1, 2011, 35 pages, Doc 2135.
U.S. Appl. No. 11/480,094: Advisory Action dated Nov. 14, 2011, 3 pages, Doc 2136.
U.S. Appl. No. 11/480,094: Notice of Appeal Filed Nov. 28, 2011, 5 pages, Doc 2137 pages.
U.S. Appl. No. 11/480,094: Abandonment Jul. 31, 2012, 2 pages, Doc 2138.
Grimm, Tralics a LaTeX to XML translator, 2003.
Knuth, Donald e., The Art of Computer Programming Second Edition vol. 1 Fundamental Algorithms, 1973.
Matula, David w., An Algorithm for Subtree Identification, Apr. 1968.
The Lucene system, which was allegedly used, offered for sale, or sold at least by Nov. 29, 2004, as described by reference to the enclosed documents concerning the structure, function, operation, and/or features of Lucene.
Tree Representation of Positive Integers, 1994, Abe.
A New Bijection between Natural Numbers and Rooted Trees, 2005, Cappello.
An Algorithm for Subtree Identification, Apr. 1968, Matula.
The Art of Computer Programming Second Edition vol. 1 Fundamental Algorithm, 1973, Knuth.
The Art of Computer Programming Second Edition vol. 1 Fundamental Algorithms, 1973, Knuth.
Abe, Y. Tree Representation of Positive Integers, Applied Mathematics Letters vol. 7 No. 1, Jan. 1994, p. 57.
Cappello, Peter R., A New Bijection between Natural Nos. and Rooted Trees, Department of Computer Science, 2005, pp. 1-10.
Sahinalp, "Distance Based Indexing for String Proximity Search", IEEE, pp. 125-136 (2003), Doc 2355.
Schmidt et al., "Comparision of Tree and Graph Encodings as Function of Problem Complexity", ACM, pp. 1674-1679, 2007.
Sechrest et al., "Blending Hierarchical and Attribute-Based File Naming", Distributed Computing System, 1992, Proceedings of the 1 ih International Conference on Jun. 9-12, 1992, pp. 572-580.

(56) References Cited

OTHER PUBLICATIONS

Shanmugasundaram et al., "Querying XML Views of Relational Data", Proceedings of the 2th VLDB Conference, Roma, Italy, 2001, 9 pages.
Siegel, "All Searches Are Divided into Three Parts String Searches Using Ternary Trees", ACM, pp. 57-68, 1988.
Sinha et al, "Efficient Trie Based Sorting of Large Sets of Strings," ACM, pp. 1-8, 2003.
Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) Dec. 2001, pp. 1-71.
Smorynski, Craig, "Logical Number Theory I: An Introduction", Springer—Verlag Berlin Heidelberg, ©1991, Arithmetic Encoding, The Cantor Pairing Function, pp. 14-23, and 305.
Somani et al., "Phased-Mission System Analysis Using Boolean Algebraic Methods", May 1994, ACM Press, vol. 22, Issue 1.
Spinells "Declarative Peephole Optimization Using String Pattern Matching", ACM, pp. 47-51, 1999.
Sproat et al., "Compilation of Weighted Finite-State Tranducers from Decision Trees" ACM, pp. 215-222, 1996.
Stanat, D.F., and McAllister, D.F., "Discrete Mathematics in Computer Science", Prentice-Hall, 1977, Binary Relations, Ch. 3, Sec. 3.2, Trees, p. 131-145.
Stefanov "Algorithmic Transformation Techniques for Efficient Exploration of Alternative Application Instances" Journal for the Association for Computing Machinery (ACM) (2002) pp. 7-12, 6 pages, Doc 2234.
Talukdar, "Learning to Create Data-Integrating Queries", ACM PVLDB, pp. 785-796, 2008.
Thiemann, "Grammar-Based Analysis of String Expressions", ACM, pp. 59-70, 2005.
Valiente, "Algorithms on Trees and Graphs", Tree Isomorphism, pp. 151-251, Springer 2002.
Valiente, Gabriel, "Tree Isomorphism," of Algorithms on Trees and Graphs, Chapter 4, published by Springer, 2002, 51 pages.
Vion-Dury, "Experimenting with the Circus Language for XML Modeling and Transformation", ACM pp. 82-87 (2002), Doc 2352.
Wagner et al., "The String-to-String Correction Problem", Journal of the Association for Computing Machinery, vol. 21, No. 1, pp. 168-173, 1974.
Wu, "A Prime Number Labeling Scheme for Dynamic Ordered XML Trees", IEEE, 2004, 13 pages.
Xie et al., "S-Looper: Automatice Summarization for Multipath String Loops", ACM, pp. 188-198, 2015.
Yang, "Interactive Hierarchical Dimension Ordering, Spacing and Filtering for Exploration of High Dimensional Datasets", IEEE, pp. 1-8 (Year: 2013), 8 pages, Doc 2324.
Yates et al, "A New Approach to Text Searchin", Communications of the ACM, vol. 35, No. 10, pp. 7 4-82, 1992.
Zaks, S., "Lexicographic Generation of Ordered Trees", Dept. of Computer Science, University of Illinois, The Journal of Theoretical Computer Science, vol. 10(1 ), pp. 63-82, Revised 1978.
Zanibbi, "Recognizing Mathematical Expressions Using Tree Transformation," IEEE, pp. 1455-1467 (2002), Doc 2353.
"Core Technology Benchmarks A White Paper", Jul. 2002, downloaded from the internet Mar. 2, 2004.
"Origin Data, Inc. White Paper", ©1999, pp. 1-13.
"The Associative Model of Data White Paper", Lazy Software, Ltd., 2000.
ACM Portal Search Results (Kleene and prime and enumeration and operation and natural and numerals and sequences and enumeration and operation) conducted by Examiner on Jul. 18, 2009, 1 page.
ACM Portal Search Results (Kleene and prime and enumeration and operationand natural and numerals and sequences and "enumeration operation") conducted by Examiner on Jul. 18, 2009, 6 pages.
Alderson et al., "Toward an Optimization Driven Framework for Designing and Generating Realistic Internet Topologies" ACM SIGCOMM Computer Communications Review 41, vol. 33, No. 1, pp. 41-46, 2003.
Apostol, "A Centennial History of the Prime Number Theorem", Engineering and Science, No. 4, 1996.
Benedikt et al., "Definable Relations and First-Order Query Languages over Strings" Journal of the ACM, vol. 50, No. 5, pp. 694-751, 2003.
Boppana et al., "Full Fault Dictionary Storage Based on Labeled Tree Encoding", Proceedings of 14th VLSI Test Symposium, 1996, pp. 174-179.
Borodin et al., "A Tradeoff Between Search and Update Time for the Implicit Dictionary Problem", Theoretical Computer Science vol. 1 No. 4 (1990), 425-447.
Cano et al., "Lazy Evaluation in Penniless Propagation over Join Trees", Networks, vol. 39(4), 2002 Wiley Periodicals, Inc., 175-185, 2002.
Caviness et al, "Simplification of Radical Expressions", ACM, pp. 329-338, 1976.
Coenen, Frans; Leng, Paul and Ahmed, Shakil; "T-Trees, Vertical Partitioning and Distributed Association Rule Mining", IEEE, 2003.
Cole, Richard, Hariharan, Ramesh, and Indyk, Piotr. "Tree pattern matching and subset matching in deterministic O(n log 3 n)-time", Proceedings of the Tenth Annual ACM-SIAM Symposium on Discrete Algorithms, p. 1-10, Jan. 2, 1999, Baltimore, Maryland, United States.
Cooper et al., "Oh! Pascal!", 1982, W.W. Norton & Company, Inc., Chapter 12, Arrays for Random Access, pp. 295-327.
Dubiner, M., Galil, Z., and Magen, E. "Faster Tree Pattern Matching.", Journal of the Association for Computing Machinery, vol. 41, No. 2, Mar. 1994, pp. 205-213.
Durango Bill's Enumeration of Trees. http://web.archive.org/web/20021028184112/http://www.durangobill.com/Trees.html, 1998.
Er, M.C., "Enumerating Ordered Trees Lexicographically", The Computation Journal, vol. 28, Issue 5, pp. 538-542, 1985.
Ferragina et al., "The String B-Tree: A New Data Structure for String Search in External Memory and Its Applications", Journal of the ACM, vol. 46, No. 2, pp. 236-280, 1999.
Fluri, "Change Distilling: Tree Differencing for Fine-Grained Source Code Change Extraction", IEEE pp. 725-743 (2007), Doc 2354.
Goldstein, "Using Aggregation and Dynamic Queries for Exploring Large Data Sets", ACM, pp. 23-29 (Year: 1994), 7 pages, Doc 2326.
Google Search (Kleene prime enumeration operation natural numerals sequences "enumeration operation") conducted by Examiner on Jul. 18, 2009, 2 pages.
Google search (Kleene prime enumeration operation natural numerals sequences "Kleene prime") conducted by Examiner on Jul. 18, 2009, 2 pages.
Google Search (Kleene prime enumeration operation) conducted by Examiner on Jul. 18, 2009, 2 pages.
Hirschberg, "Algorithm for Computing Maximal Common Sebsequences", Communication of the ACM, vol. 18, No. 6, pp. 341-343, 1975.
Hoffman et al., "Pattern Matching in Trees", Purdue University, Jan. 1982, Journal for the Association for Computing Machinery, vol. 29, Issue 1 , pp. 68-95.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
IEEE Explore Digital Library Search Result conducted by Examiner on Jul. 18, 2009, 1 page.
Jaiswal, "Local Pattern Transformation Based Feature Extraction Techniques for Classification of Epileptic EEG Signals", Biomedical Signal Processing and Control (2017) pp. 81-92, 12 pages, Doc 2205.
Johnston et al. Advances in Dataflow Programming Languages, ACM Computing Surveys, vol. 36, No. 1, pp. 1-34, 2004.
Katajainen et al., "Tree Compression and Optimization with Applications", International Journal of Foundations of Computer Science, vol. 1 No. 4 (1990), 425-447.

(56) References Cited

OTHER PUBLICATIONS

Kharbutli et al., "Using Prime Numbers for Cache Indexing to Eliminate Conflict Misses", Dept. of Electrical and Computer Engineering, North Carolina State University, Feb. 2004, 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Knott—"A Balanced Tree Storage and Retrieval Algorithm" ACM pp. 175-196, 1971, Doc 2296.
Knuth, "The Art of Computer Programming", vol. 1 Fundamental Algorithms, Second edition, Addison-Wesley Series in Computer Science and Information Processing, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Letourneau, "The Elementary Theory of Object Oriented Arithmetic", pp. 1-9, Apr. 1990.
Li—"An Immediate Approach to Balancing Nodes in Binary Search Trees" ACM, pp. 238-245, 2006, Doc 2242.
Malhotra et al., "A Methodology for Formal Expression of Hierarchy in Model Solution", IEEE, pp. 258-267, 1983.
Marton, "Hierarchical Object Geometric Categorization and Appearance Classification for Mobile Manipulation", IEEE pp. 365-370 (Year: 2010), 6 pages, Doc 2325.
Minn, "Linear Transformation of Multi-Level Signal Set in Multi-Code CDMA", IEEE (2001) pp. 1239-1243, 5 pages, Doc 2214.
Murray, "Code Transformation and Instruction Set Extension", Journal of the Association for Computing Machinery (2009) pp. 1-31, 32 pages, Doc 2215.
Navarro, "A Guided Tour to Approximate String Matching", ACM Computing Surveys, vol. 33, No. 1, pp. 31-88, 2001.
Neven, Frank and Thomas Schwentick, "Expressive and efficient pattern languages for tree-structured data" Proceedings of the Nineteenth ASM Sigact-Sigmod-Sigart Symposium on Principles of Database Systems, May 2000.
Paik, "Mining Association Rules in Tree Structured XML Data" ACM, pp. 807-811, 2009, 5 pages, Doc 2243.
Prasad et al., "Efficient Bit-Parallel Multi-Patterns String Matching Algorithms for Limited Expression", ACM, pp. 1-6, 2010.
Ramesh, R. and Ramakrishnan, I.V., "Nonlinear Pattern Matching in Trees." Journal of the Association for Computer Machinery, VOi. 39, No. 2. Apr. 1992, pp. 295-316.
Reiss, "Semantics-Based Code Search", IEEE ICSE, pp. 243-253, 2009.
Rizum, "Code Transformation by Direct Transformation of ASTs", Journal of the Association for Computing Machinery (2015) pp. 1-7, 7 pages, Doc 2220.

\* cited by examiner $P(1) = 2$ $P(2) = 3$ $P(3) = 5$ $P(4) = 7$ $P(2k - 1)$ $P(2k)$

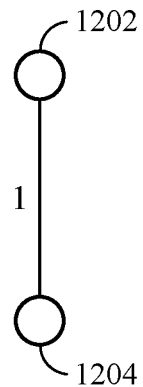 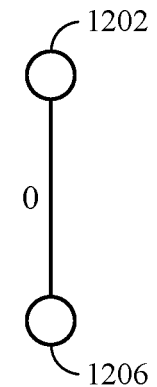
FIG. 13        FIG. 14
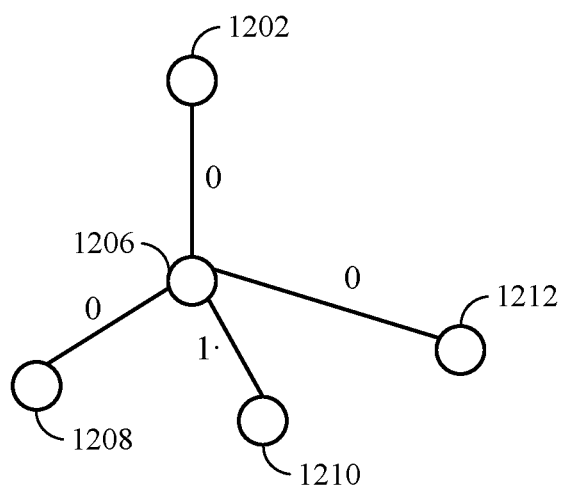
FIG. 15

US 12,013,829 B2

MANIPULATION AND/OR ANALYSIS OF HIERARCHICAL DATA

RELATED APPLICATION

This application is a continuation application of U.S. patent application Ser. No. 16/164,535, filed Oct. 18, 2018, at the time of filing, and is also a continuation application of U.S. patent application Ser. No. 16/048,061, filed Jul. 27, 2018, at the time of filing, which is a continuation of U.S. patent application Ser. No. 14/968,429, filed Dec. 14, 2015, now issued as U.S. Pat. No. 10,055,438, which is a continuation of U.S. patent application Ser. No. 13/030,084, filed Feb. 17, 2011, now issued as U.S. Pat. No. 9,245,050, which is a continuation of U.S. patent application Ser. No. 11/412,417, filed Apr. 26, 2006, now issued as U.S. Pat. No. 7,899,821, which claims the benefit of U.S. Provisional Patent Application No. 60/675,987, filed Apr. 29, 2005.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIGS. 12 through 15 are schematic diagrams illustrating, by way of example, rooted partial subtrees (RPSTs) according to an embodiment.

DETAILED DESCRIPTION

Figure 1:
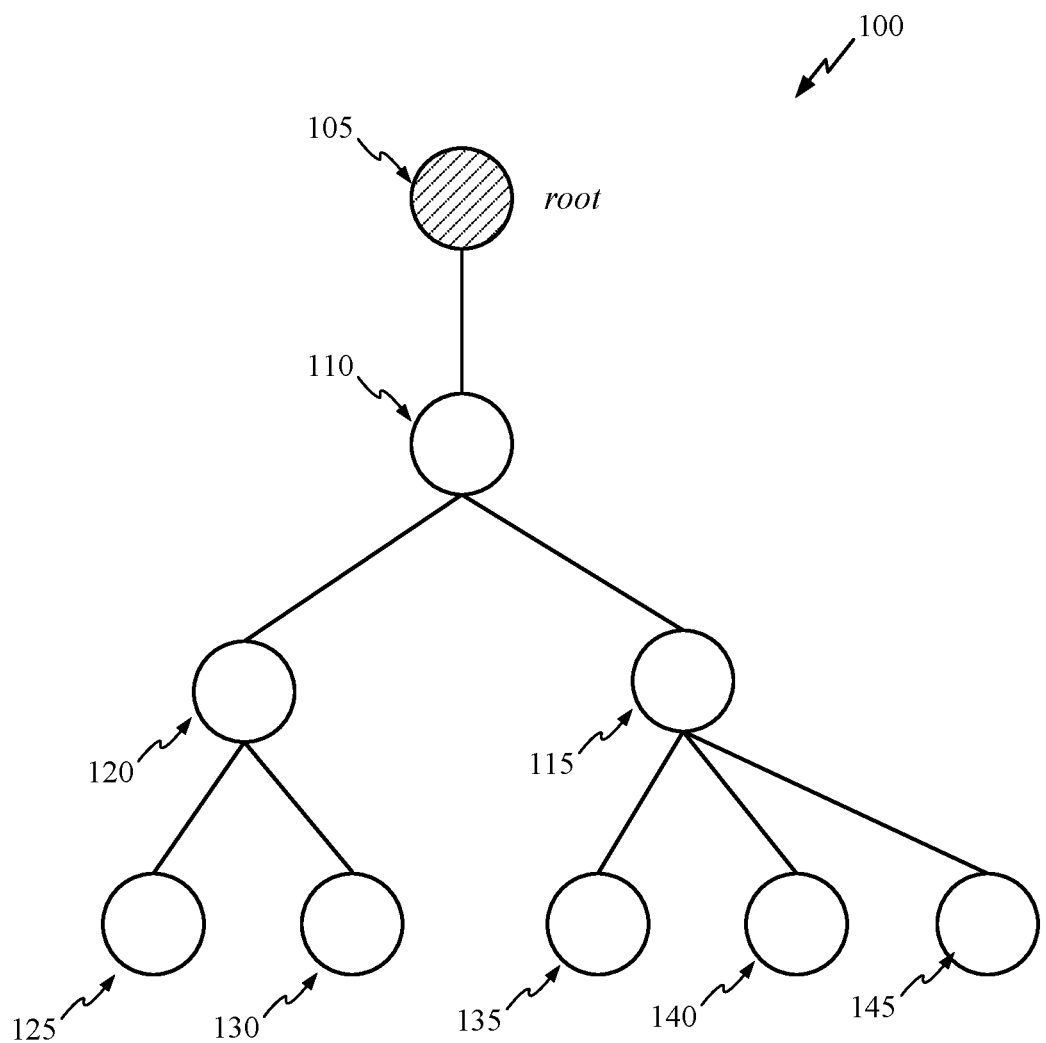
FIG. 1 is a schematic diagram of one embodiment of a tree.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "transforming," "converting," "factoring," "enumerating," "representing," "storing," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Further, unless specifically stated otherwise, processes described herein, with reference to flow diagrams or otherwise, may also be executed and/or controlled, in whole or in part, by such a computing platform.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete backtracking loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
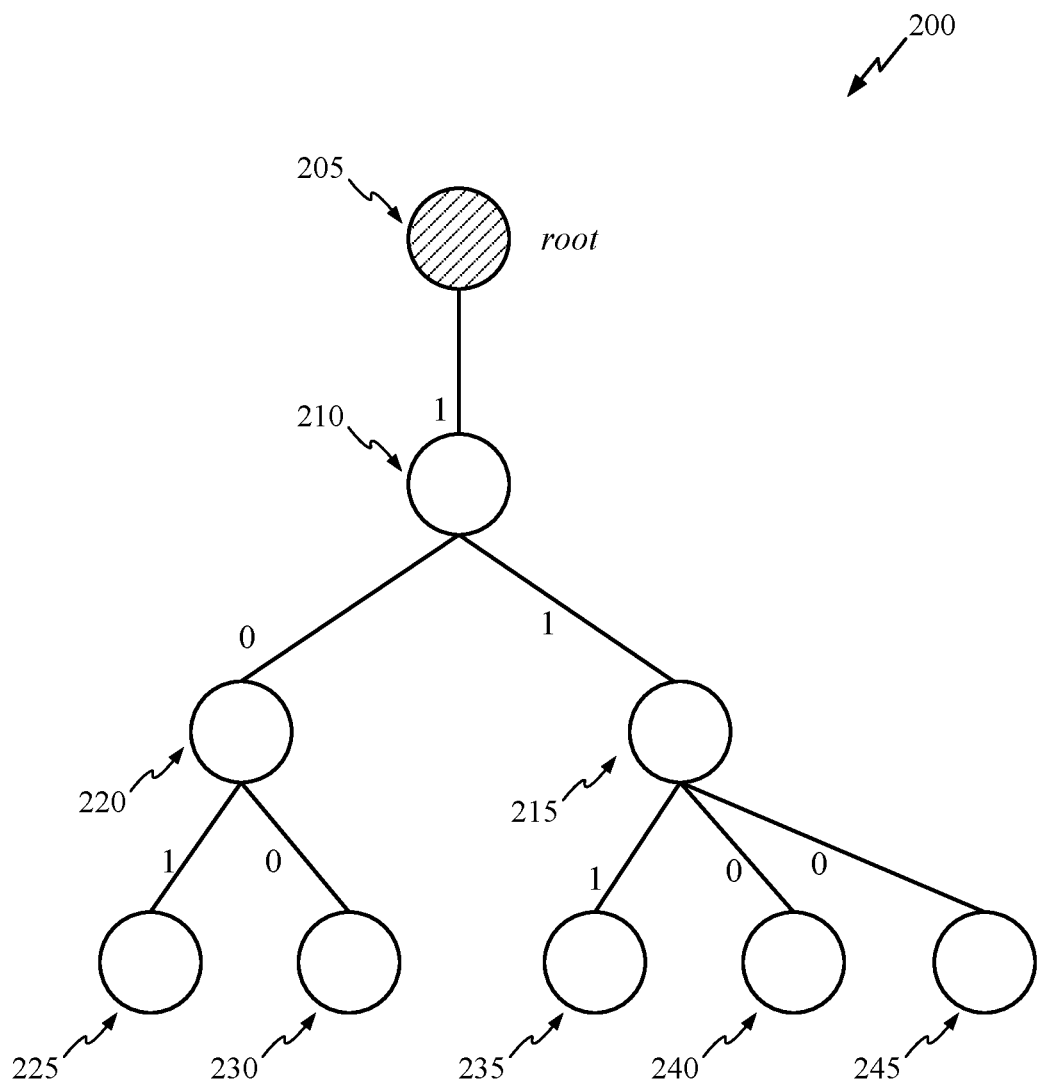
FIG. 2 is a schematic diagram illustrating one embodiment of a binary edge labeled tree (BELT)
Figure 3:
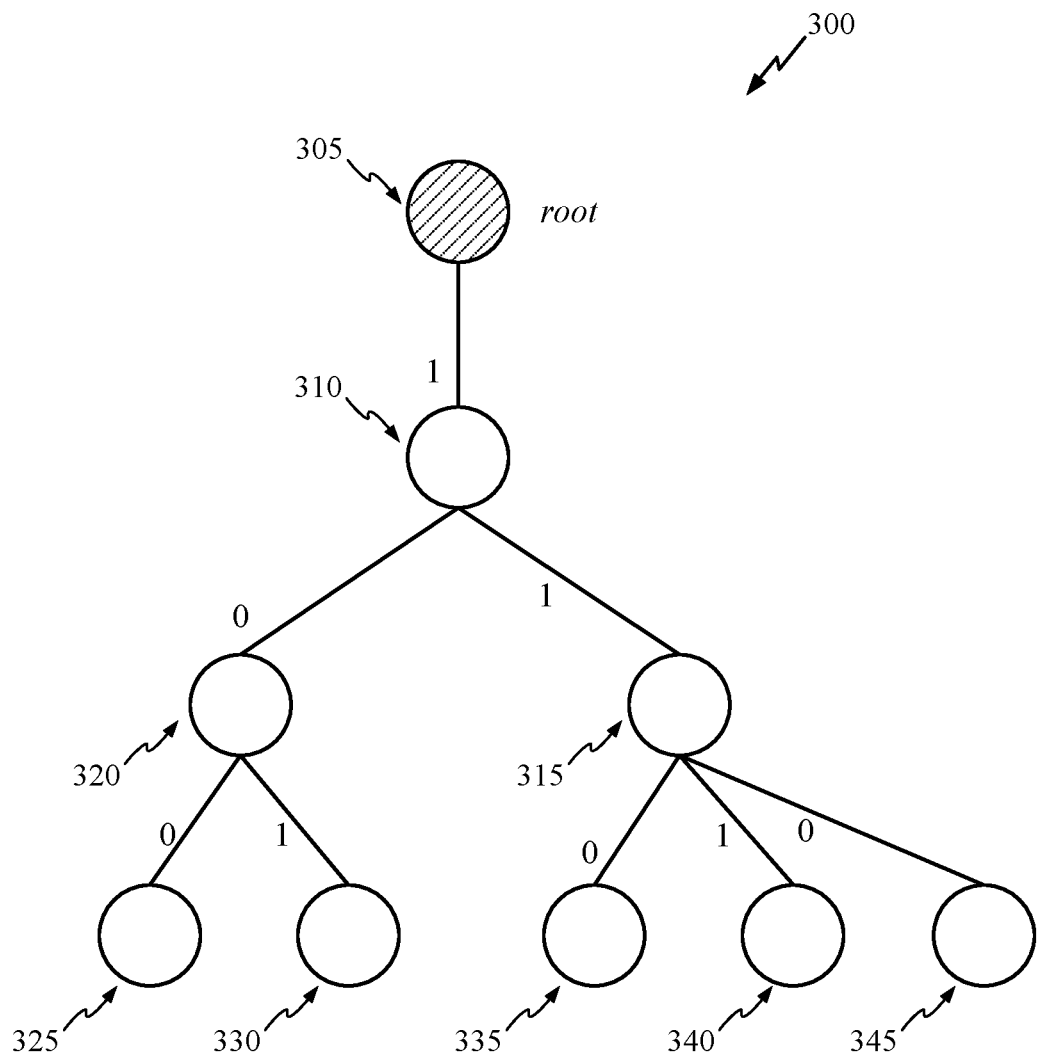
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of data may be found in U.S. patent application Ser. No. 11/005,859, filed on Dec. 6, 2004, by J. J. LeTourneau, titled, "Manipulating Sets of Hierarchical Data," assigned to the assignee of the subject matter claimed herein.

Figure 4:
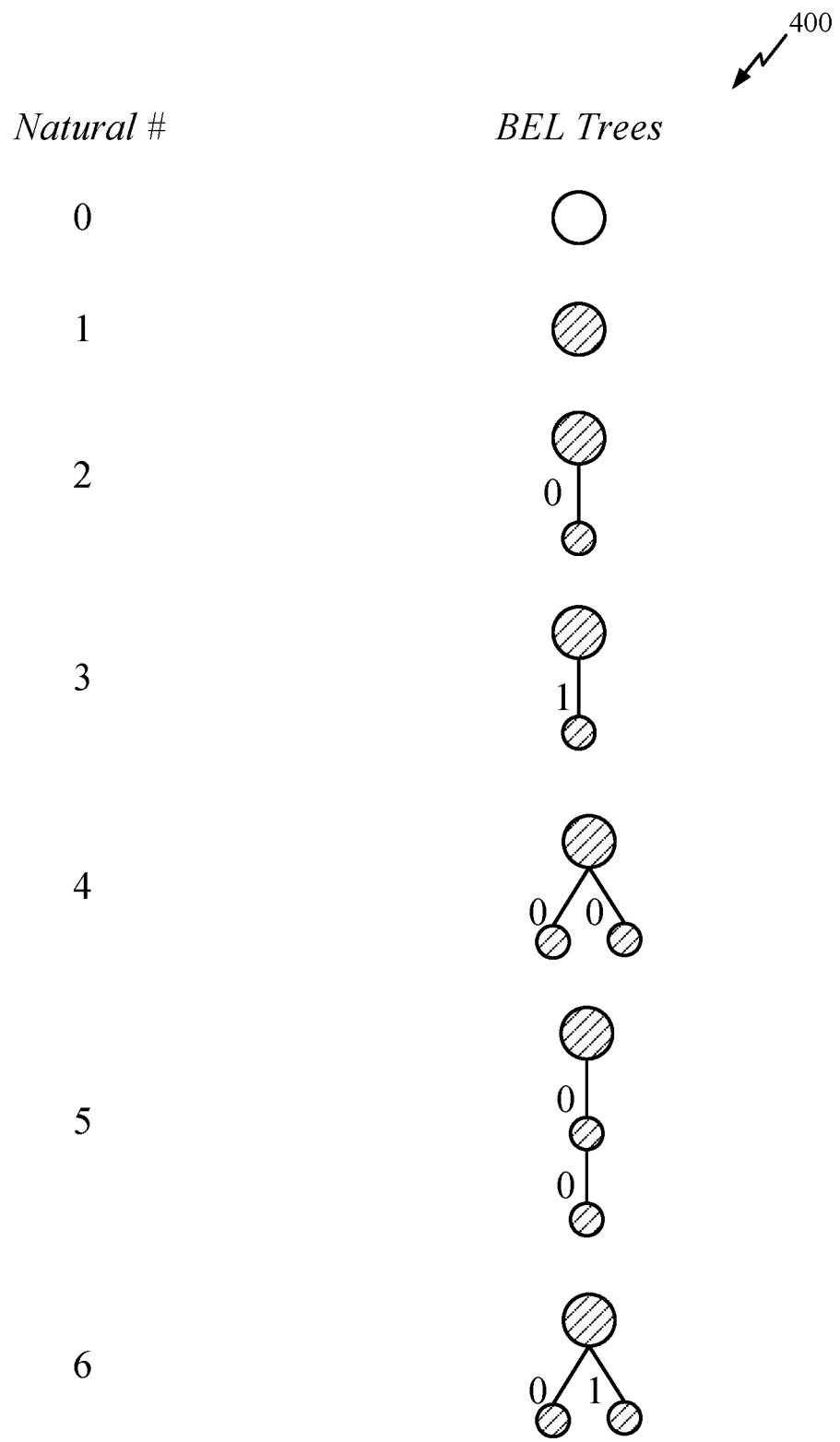
FIG. 4 is a table illustrating a particular embodiment of an association between natural numerals and BELTs.

The terms "non-composite numeral" and "primary numeral" shall be used interchangeably herein. Being trees, BELTs may also be enumerated. Thus, for this particular embodiment, although claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the numeral one and has a graphical representation of a single node. For higher positive natural numerals, however, this embodiment of a method of enumerating a set of trees comprises positioning a tree at location k, k being a positive numeral greater than three, where k is the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated, for example in FIG. 4, as described in more detail below.

However, for this particular embodiment, although claimed subject matter is not limited in scope in this respect, a method of enumerating a set of ordered trees may begin with enumeration of an empty binary edge labeled tree and a one node binary edge labeled tree. Thus, the empty tree is associated with numeral zero and has a symbolic representation as illustrated in FIG. 4 (circle). Likewise, the one node tree, which holds no data, is associated with numeral one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with numeral zero. Likewise, the one node tree root comprises a single node and is associated with numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the numeral two. Likewise, to obtain the binary edge labeled tree for position five, begin with the binary edge labeled tree for position two and follow the previously articulated approach of adding a root and an edge and labeling it with a binary zero.

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three. This follows from FIG. 5 since P(2*1)=P(2)=3. Likewise, the tree at position five is the zero-push of the tree at position 2. Again, this follows from FIG. 5 since P(2*2−1)=P(3)=5.

In this context, the approach just described may be referred to as vectorizing non-composite numerals. In the embodiment just described, this was accomplished in pairs, although, of course, claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 5.

In the previously described enumeration of binary edged labeled trees, a mechanism may be employed to reduce or convert and/or transform complex manipulations of hierarchical data to multiplication of natural numerals. For example, if it is desired to combine, or merge at their roots, two trees of hierarchical data, a complex task both computationally and graphically, instead, for this particular embodiment, the two trees may be transformed to numerical data by using the previously described association embodiment between binary edge labeled trees and natural numerals. The resulting numerical data from the prior conversion may then be multiplied, and the resulting product may then be transformed to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be transformed to a piece of numerical data, such as by using the previously described association embodiment. This data may then be factored into two pieces of numerical data whose product produces the previously mentioned piece of numerical data. These two pieces of numerical data may then be transformed to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve transforming the trees to numerical data, as previously described, using an association embodiment. The numerical data may then be ordered and the numerical data may then be transformed back to binary edge labeled trees using the previously described association embodiment, or an alternate association embodiment, for example.

It is noted that there may be any one of a number of different ways of transforming from numerals or numerical data values to a binary edge labeled tree or from a binary string to a binary edge labeled tree, and vice-versa. Nonetheless, a convenient method for doing so with this particular embodiment includes storing an array providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store an array as just described, although, claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 6, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 6:
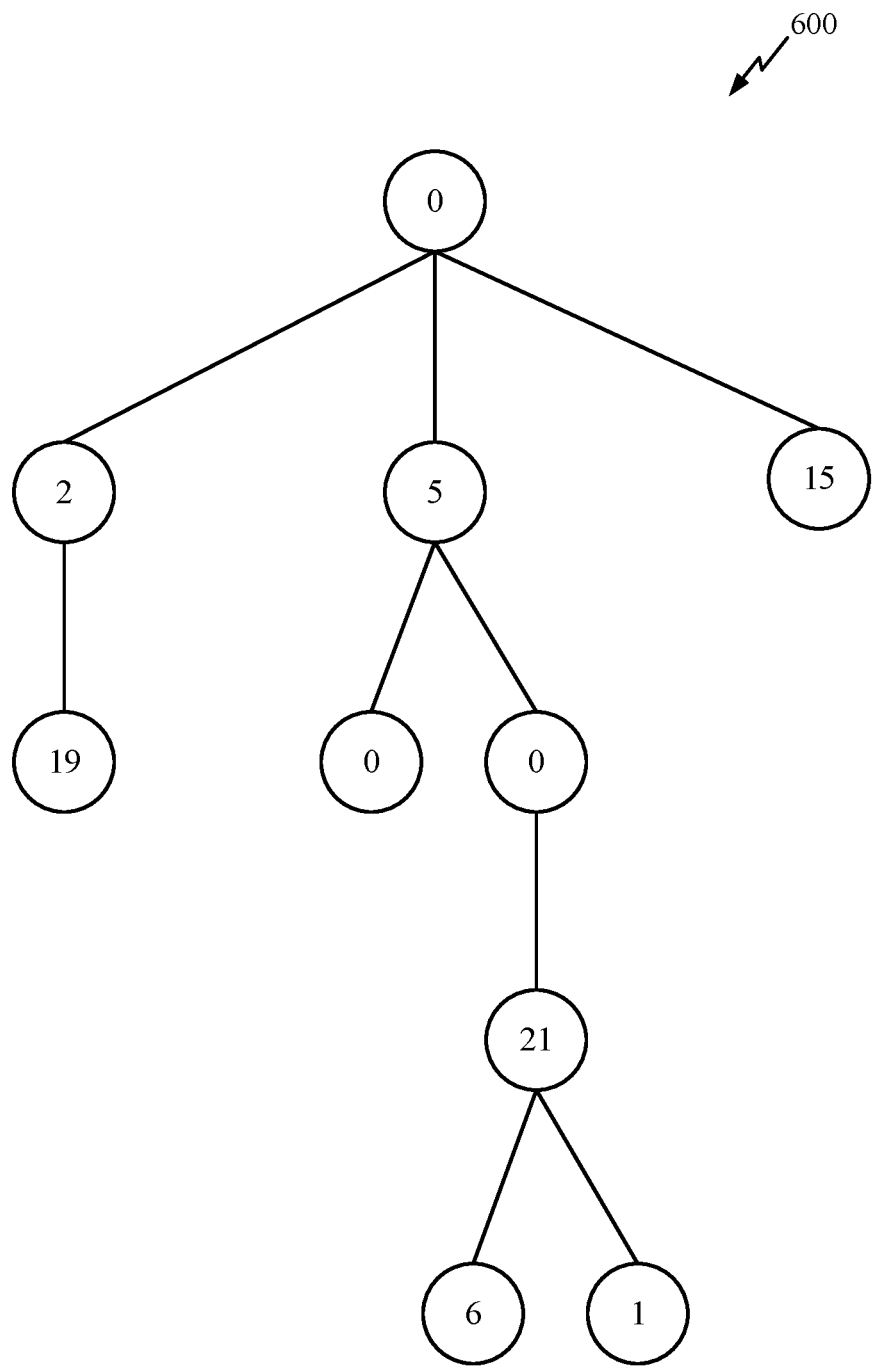
FIG. 6 is a schematic diagram of an embodiment of a node labeled tree.

As previously noted, claimed subject matter is not limited in scope to this particular example, however, as illustrated in more detail hereinafter, the tree illustrated in FIG. 6 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 600, is illustrated in FIG. 6, comprises a node labeled tree rather than an edge labeled tree. Without belaboring the present discussion, a process of converting a node labeled tree such as that illustrated in FIG. 6 to a BELT may be found in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Figure 7:
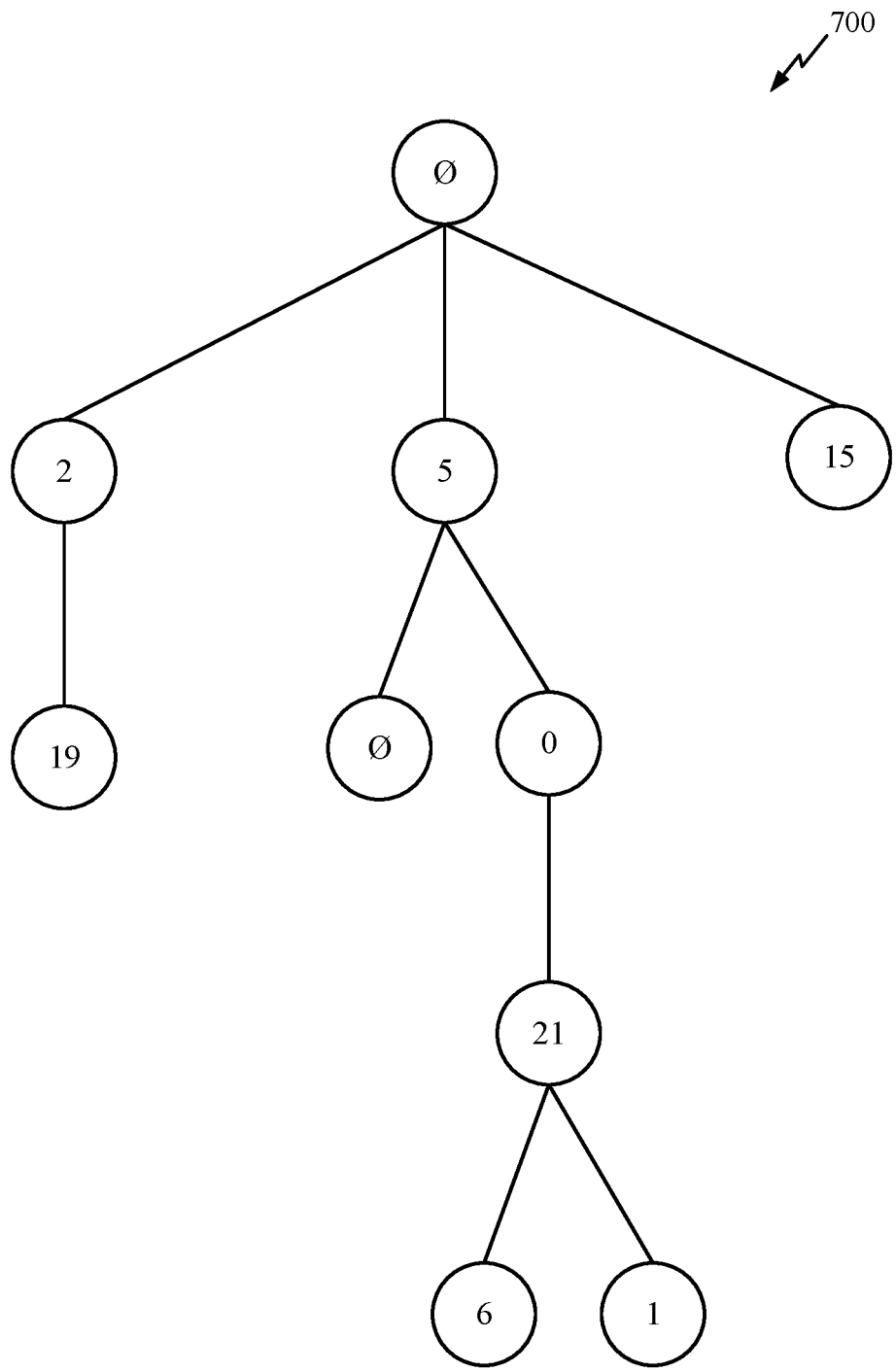
FIG. 7 is a schematic diagram illustrating another embodiment of a node labeled tree.

In another embodiment, however, a particular tree may include null types or, more particularly, some node values denoted by the empty set. This is illustrated, for example, by the tree in FIG. 7, although, of course, this is simply one example. An advantage of employing null types includes the ability to address a broader array of hierarchical data sets. For example, without loss of generality and not intending to limit the scope of claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp, 14-23, available from Springer-Verlag, 1991. This approach should produce a tree to which the previously described embodiments may then be applied. Furthermore, for one embodiment, a tree in which nodes are labeled with numerals or numerical data, rather than binary data, may be transformed to a binary edge labeled tree and/or binary node labeled tree, and, for another embodiment, a tree in which edges are labeled with numerals or numerical data, rather than binary data, may be transformed to a binary edge labeled tree and/or binary node labeled tree.

Furthermore, a tree in which both the nodes and the edges are labeled may be referred to in this context as a feature tree and may be transformed to a binary edge labeled tree and/or binary node labeled tree. For example, without intending to limit the scope of claimed subject matter, in one approach, a feature tree may be transformed by converting any labeled node with its labeled outgoing edge to an ordered pair of labels for the particular node. Using the embodiment described above, this tree may then be transformed to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be transformed to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

According to an embodiment, a tree may comprise one or more "subtrees" coupled at the root node of the tree. A subtree of a larger tree may comprise a "subtree root" node other than the root node of the larger and independently have properties of a tree, except that the subtree is part of the larger tree. In addition to a subtree root node, a subtree comprises terminal nodes of a larger tree which descend from the subtree root node, and edges and intermediate nodes connecting these terminal nodes with the subtree root node. In one embodiment, the subtree root node may be connected to the root node of the larger tree by a single edge. In another embodiment, the subtree node may be coupled to the root node of the larger tree by two or more edges and one or more intermediate nodes coupled between the root node of the larger tree and the subtree root node. While a subtree may comprise a portion of a larger tree, the size and shape of the subtree may express information like that of a tree having the same size and shape as the subtree. Subtrees coupled together at the root node of a larger tree may be referred to as "subtree children" of the root node where a subtree may be referred to as a "subtree child" of the tree in this embodiment.

According to an embodiment, a tree may comprise one or more "partial subtrees" (PSTs) representing at least a portion of the hierarchical data represented by the tree. Here, a PST may a subset of the nodes of a larger tree. This subset of nodes is connected by edges and a single node of the subset of nodes provides a "root" node of the PST. In a particular embodiment, a PST may represent a set of data and/or other information in a hierarchical fashion and may be represented as a finite, rooted, connected, unordered and acyclic graph. Accordingly, a PST has properties of a tree as illustrated above with reference to FIGS. 1-7, except that the PST is a part of a larger tree. As such, in a particular embodiment, any labels associated with nodes and edges in the full tree may also be associated with corresponding nodes and edges in any component PST. Also, in a particular embodiment, such a component PST may be represented by a natural numeral according to an association of natural numerals and trees such as that illustrated above with reference to FIG. 4, for example. However, this is merely an example of how a PST may be associated with a numeral according to a particular association embodiment and claimed subject matter may cover associations of PSTs to numerals according to other association embodiments. Unlike a subtree, a PST need not comprise terminal nodes of the larger tree. According to an embodiment, a PST may comprise a "rooted PST" (RPST) having properties of a PST with the additional feature that the root node of the RPST is the same as the root node of the larger tree.

Since a tree is finite, there are a finite number of paths between a root node of the tree and other nodes in the tree. Similarly, there are a finite number of combinations of paths between the root node of a tree and individual ones of the other nodes in the tree. Accordingly, in a particular embodiment, a finite number of RPSTs may be enumerated from a tree having a root node. Numerals may be associated with the enumerated RPSTs based, at least in part, on an association between trees and natural numerals such as, for example, illustrated above with reference to FIG. 4. However, this is merely an example of how RPSTs may be associated with numerals according to a particular embodiment and claimed subject matter is not limited in this respect.

According to an embodiment, the enumerated RPSTs of a tree may be represented as a "set" containing a collection of unordered elements. In a particular embodiment, the elements of the set of enumerated RPSTs may contain as elements natural numerals representing individual ones of the enumerated RPSTs according to the aforementioned association between trees and numerals. The elements of such a set may be alternatively expressed as graphical representations of the individual ones of the enumerated RPSTs. In a particular embodiment, a one-to-one mapping may relate elements of the set of RPSTs expressed as natural numerals and elements of the set of RPSTs expressed as graphical representations. Here, such a mapping may enable transforming graphical representations of RPSTs to corresponding natural numerals and manipulation of such natural numerals to provide resulting natural numerals. The resulting natural numerals may then be transformed back to graphical representations. However, these are merely examples of how a set of enumerated RPSTs may be expressed and claimed subject matter is not limited in these respects.

The term "depth" referred to herein in connection with a tree means the longest separation between the tree's root node and a terminal node of the tree. In a particular embodiment, although claimed subject matter is not limited in this respect, a depth may be quantified as a number of successively descending nodes are connected to the root node. In tree 100 of FIG. 1, for example, root node 105 is separated from terminal node 125 by three successively descending nodes, nodes 110, 120 and 125. However, quantifying a depth of a tree by a number of nodes between the root node and the furthest terminal node of the tree is merely an example of how depth may be quantified for a particular embodiment, and claimed subject matter is not limited in these respects.

As illustrated above, a tree is capable of storing, expressing and/or representing hierarchical data. As such, in particular embodiments of trees, it may be desirable to locate and/or detect particular elements and/or aspects of hierarchical data which is capable of being stored, expressed and/or represented in a tree. In one particular example, a tree may store, express and/or represent hierarchical data that is in a document that may comprise a piece of information that is of interest. In another embodiment, a tree may store, express and/or represent features of a pattern as hierarchical data where one or more features of the pattern may be of interest. Techniques for locating and/or detecting hierarchical data in a tree may include, for example, executing a process to traverse nodes of a tree that is stored in a memory. Such techniques may be computationally intensive.

According to an embodiment, a "target tree" may comprise hierarchical data that may or may not include a particular piece of information of interest. An embodiment of a process may represent portions of the tree as one or more "target numerals" according to an association of trees and numerals. The particular piece of information of interest may be represented as a probe numeral that is compared with the one or more target numerals to determine a match. In one embodiment, although claimed subject matter is not limited in this respect, such a match may indicate a presence of a particular piece of information that is of interest.

In a particular embodiment, although claimed subject matter is not limited in this respect, a piece of information of interest may be stored, expressed and/or represented as a "probe tree" having nodes and/or edges and having properties of a tree. As such, a probe tree may be associated with a "probe numeral" according to an association of trees and numerals such as that illustrated above with reference to FIG. 4, for example. In particular embodiments, the piece of information of interest may also be associated with a probe numeral irrespective of any representation and/or expression of the piece of information of interest as a probe tree. In one particular embodiment, although claimed subject matter is not limited in this respect, a probe tree and/or probe numeral may represent a query for locating and/or detecting a piece of information of interest that is represented in a tree. However, this is merely an example of how a probe tree and/or probe numeral may be applied in a particular embodiment and claimed subject matter is not limited in this respect.

Figure 8:
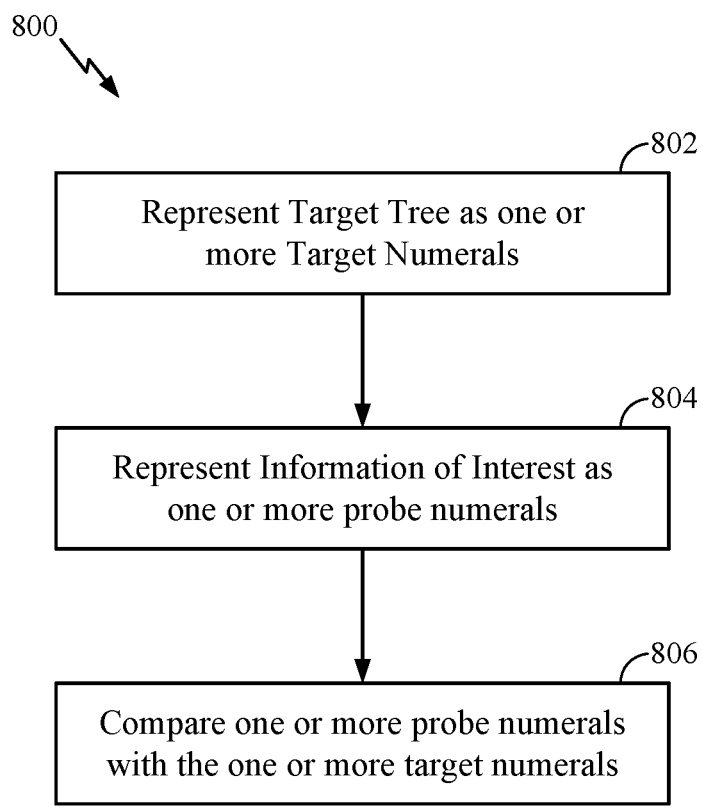
FIG. 8 is a flow diagram illustrating a process embodiment to detect and/or locate information in hierarchical data of a target tree according to an embodiment.

FIG. 8 is a flow diagram illustrating a process embodiment 800 to detect and/or locate information in hierarchical data of a target tree according to an embodiment. Block 802 represents a target tree as one or more numerals according to an association of trees and numerals. According to a particular embodiment of block 802, a computing device and/or computing platform may be used to represent the target tree as one or more target numerals according to an association of trees and numerals. Here, for example, such a computing device and/or computing platform may comprise one or more processors with a limited native word size. In executing processes to determine the target numerals, the one or more processors may also comprise limited memory. Also, as described in the aforementioned U.S. patent application Ser. No. 11/005,859, particular embodiments of enumerating numerals associated with trees may employ the use of non-composite numerals. Implementations of particular processes to enumerate such numerals associated with trees may only be capable of generating non-composite numerals up to a predetermined maximum non-composite numeral. Accordingly, a particular implementation of process embodiment 800, although claimed subject matter is not limited in this respect, may entail partitioning the target tree into smaller trees comprising clusters and/or subsets of the nodes making up the larger target tree. Block 802 may then determine the one or more target numerals based, at least in part, on numerals associated with the smaller trees according to an association of trees and numerals.

Block 804 represents information of interest as a probe numeral. Here, the information of interest may be represented and/or expressed as a probe tree as discussed above. Accordingly, block 804 may represent the information of interest as a probe numeral that is associated with the probe tree according to an association of trees and numerals such as that illustrated above with reference to FIG. 4, for example. However, this is merely an example of how a probe tree may be associated with a numeral according to a particular association embodiment, and claimed subject matter is not limited in these respects. Having properties of a tree, according to a particular embodiment, a probe tree may comprise nodes which are connected by edges in addition to node and/or edge label values. In particular embodiments, a target tree may comprise large amounts of data and be much larger than a probe tree. However, this is merely a comparison of a target tree and a probe tree in a particular embodiment and claimed subject matter is not limited in these respects. Further, a probe tree comprises a root node, and may comprise one or more terminal nodes. Although claimed subject matter is not limited in this respect, block 804 may employ techniques illustrated in the aforementioned U.S. patent application Ser. No. Ser. No. 11/005,859 to associate a probe tree with a probe numeral according to an association of trees and numerals.

Block 806 compares the probe numeral determined at block 804 with the one or more numerals representing the target tree to find a match. If a match is found, process 800 may determine that the target tree comprises the information of interest that is represented by the probe numeral.

Figure 9:
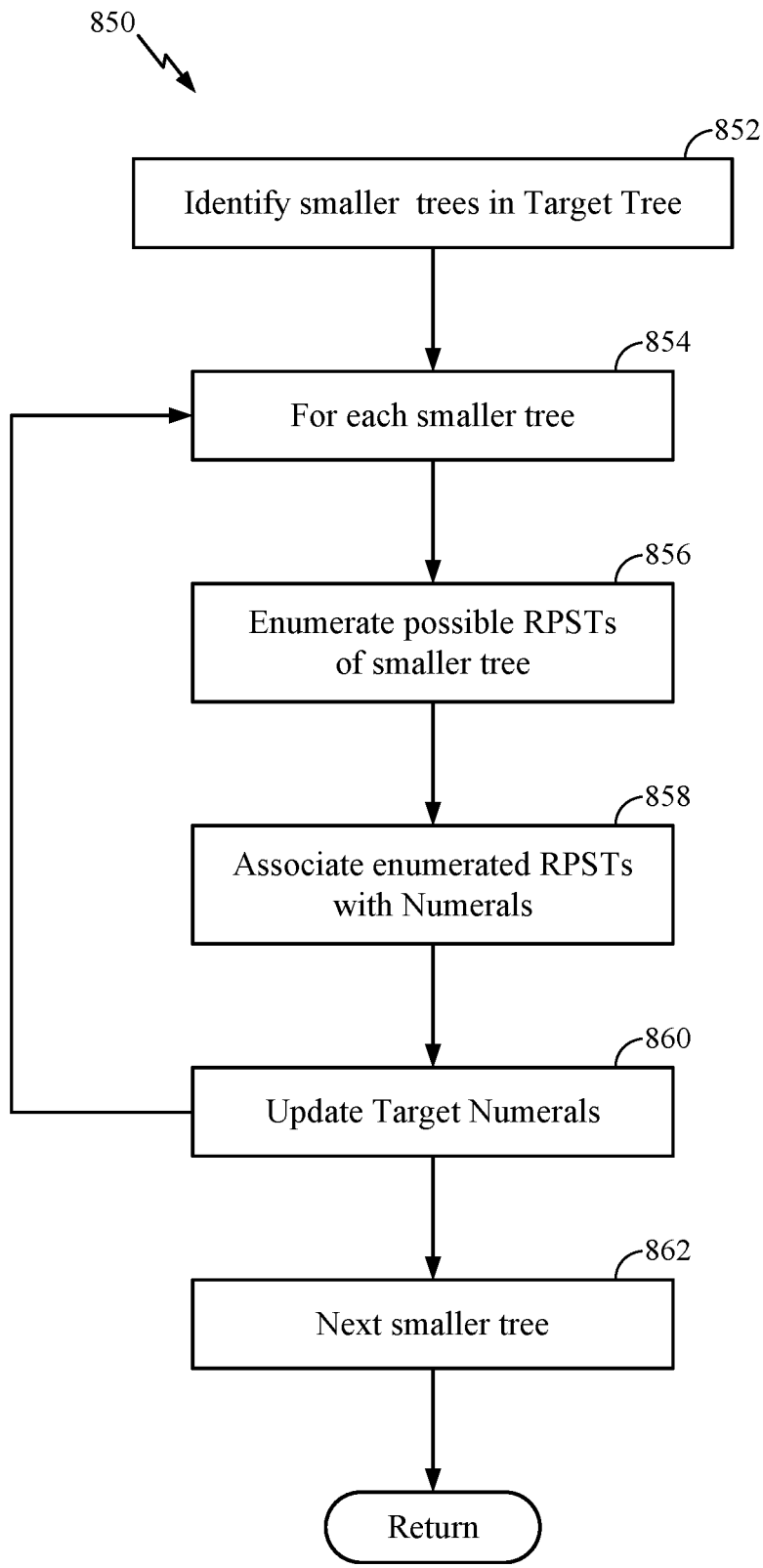
FIG. 9 is a flow diagram illustrating a process embodiment to represent a target tree as one or more numerals according to an embodiment of the process illustrated in FIG. 8.

FIG. 9 is a flow diagram illustrating a process embodiment 850 to represent a target tree as one or more numerals according to an embodiment of the process embodiment illustrated in FIG. 8. According to an embodiment, although claimed subject matter is not limited in this respect, process 850 may generate target numerals for an array. Block 806 (FIG. 8) may then compare the probe numeral with target numerals in the array for determining a match. Block 852 identifies smaller trees in the target tree. Process embodiment 850 generates the target numerals for the array through sequential iteration of blocks 854 through 862. Here, for each smaller tree identified at block 852, block 856 may enumerate possible RSPTs of the smaller tree as illustrated below with reference to a particular embodiment and in U.S. Provisional Patent Application No. 60/640,427, titled "Enumeration of Rooted Partial Subtrees" by Karl Schiffmann, J. J. LeTourneau and Mark Andrews, filed on Dec. 30, 2004. Block 858 may then associate the enumerated RPSTs with numerals according to an association of trees and numerals as illustrated below and in the aforementioned U.S. Provisional Application No. 60/640,427. Numerals determined at block 858 may then be combined with numerals in the array of target numerals at block 860 to provide an updated array.

Figure 10A:
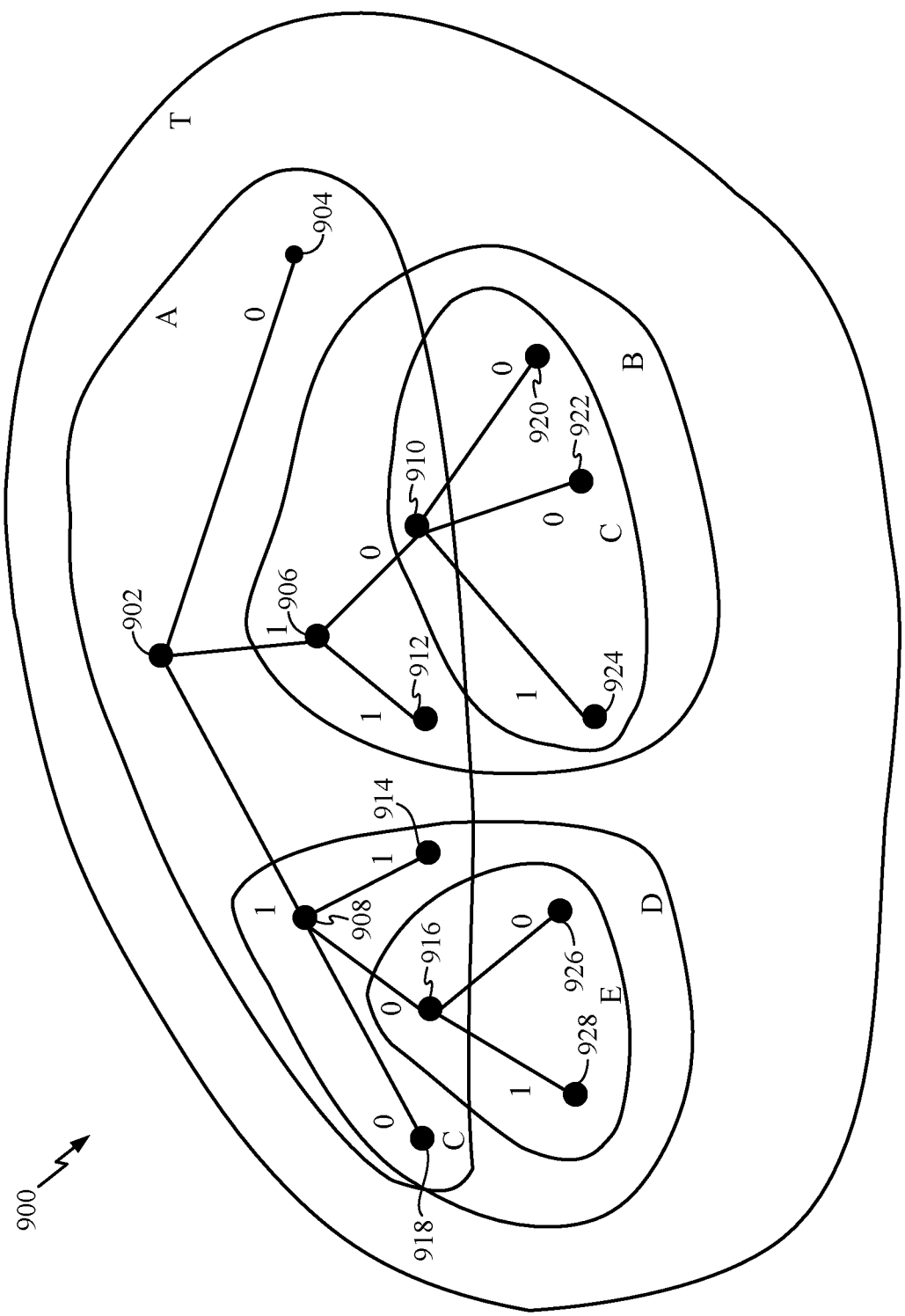
FIG. 10A is a schematic diagram of a target tree according to an embodiment.
Figure 10B:
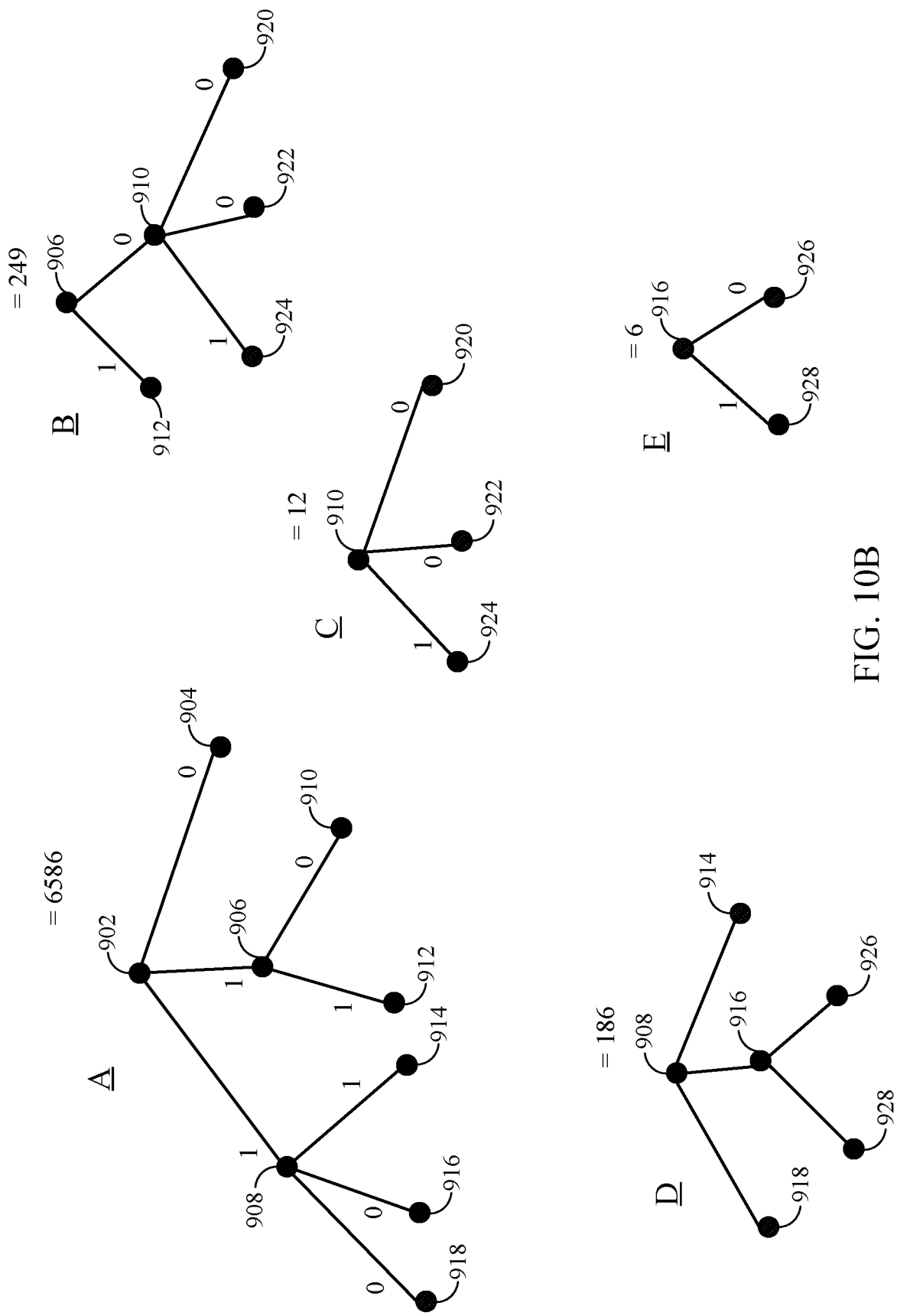
FIG. 10B is a schematic diagram of an embodiment of smaller trees of a target tree according to an embodiment of the target tree shown in FIG. 10A.

Returning to block 852 for identifying smaller trees of a target tree, in a particular example a target tree 900 shown in FIG. 10A comprises smaller trees A through E as shown in FIG. 10A and in FIG. 10B. In this particular embodiment, although claimed subject matter is not limited in this respect, tree 900 is shown comprising a BELT. However, this is merely an example of a tree of a particular type and/or configuration for a target tree, and other target trees may comprising different types and/or configurations such as, for example, node labeled trees, unlabeled and/or other edge labeled trees. In this particular embodiment, for an individual node in target tree 900 block 852 may identify smaller trees as comprising the individual node and nodes descending from the individual node up to a predetermined depth.

As illustrated below with reference to FIG. 10A, a larger target tree is expressed as a plurality of smaller trees according to a depth descending from root nodes from the smaller trees. In this particular embodiment, smaller tree may comprise a root node of the smaller trees and nodes descending from the root node up to a predetermined depth. In other embodiments, however, a target tree may be expressed as a plurality of smaller trees using other techniques. In a particular embodiment of an ordered target tree, for example, smaller trees expressing the target tree may be determined based, at least in part, on an order of nodes in the target tree. Again, these are merely examples of how a target tree may be expressed as a plurality of smaller trees and claimed subject matter is not limited in these respects.

In the particular embodiment illustrated with reference to FIG. 10A, although claimed subject matter is not limited in this respect, a smaller tree identified at block 852 may comprise the individual node and nodes descending from the individual node down to a depth of two. For example, smaller tree A comprises root node 902, nodes descending from root node 902 at a depth of one (nodes 904, 906 and 908) and nodes descending from root node 902 at a depth two (nodes 910, 912, 914 and 916), but does not comprising nodes descending at a depth of three (nodes 920 through 928). Block 852 may similarly identify smaller trees corresponding with other nodes in target tree 900 comprising at least one child node. In this particular example, block 852 may identify smaller tree B comprising node 906 as its root node, smaller tree C comprising node 910 as its root node, smaller tree D comprising node 908 as its root node and smaller tree E comprising node 916 as its root node.

It should be observed that smaller trees C and E, having nodes 910 and 916 as respective root nodes, comprise nodes descending from a root node at a depth of one but no nodes descending at a depth of two. Accordingly, for an individual node having at least one descendant child node, block 852 may identify a smaller tree comprising nodes descending down to the predetermined depth, to the extent that there are nodes descending from the individual node at the predetermined depth.

Figure 11:
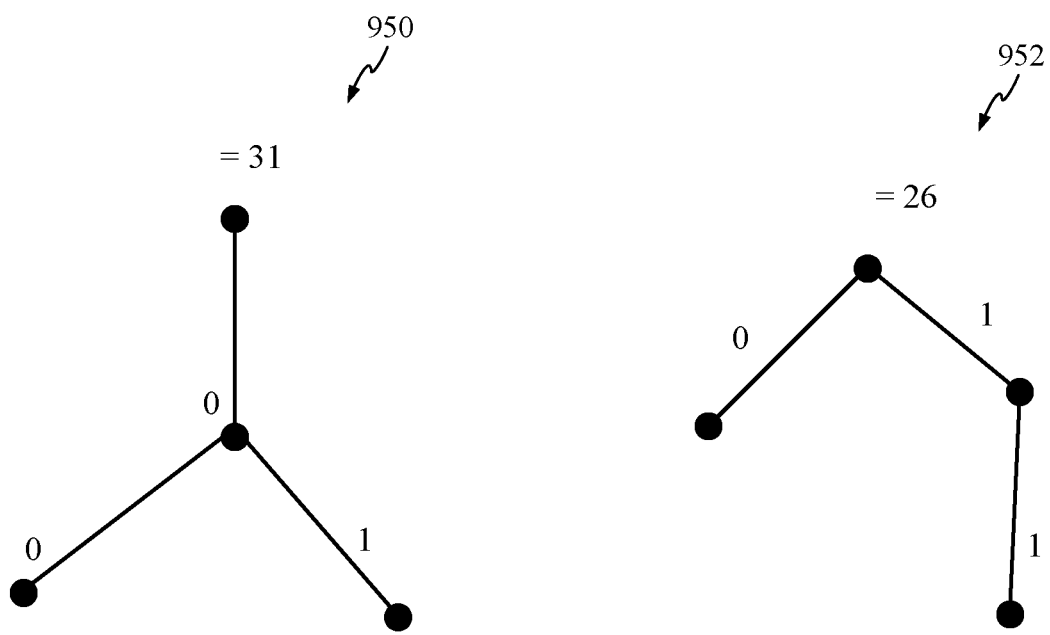
FIG. 11 is a schematic diagram of probe trees according to an embodiment.

As shown in FIG. 10A, according to a particular embodiment, smaller trees A through E are shown as overlapping in that some of the nodes in target tree 900 are a part of more than one of the smaller trees A through E. In this particular embodiment, smaller trees A through E comprise PSTs of target tree 900. Accordingly, possible PSTs of target tree 900 up to a particular depth (a depth of two in this particular example) may be identified as smaller trees in block 852. In a particular embodiment, although claimed subject matter is not limited in this respect, a depth of smaller trees may be based, at least in part, on an expected and/or maximum depth of a probe tree. Here, for example, a depth of smaller trees may be selected as a maximum depth of a probe tree to enable matching the probe tree with a smaller tree. Accordingly, in this particular embodiment, a probe numeral associated with such a maximum depth probe tree may be capable of matching one or more target numerals representing the target tree at block 806. FIG. 11 shows probe trees 950 and 952 comprising a depth of two. By identifying smaller trees of target tree 900 having up to a depth of two thus enables finding a match of probe numerals (associated with respective probe trees 950 and/or 952) with one or more numerals associated with RPSTs of smaller trees A through E.

It should be understood that the particular predetermined depth used for identifying smaller trees in this particular example is arbitrary and that other depths of one or greater may be chosen. In one particular embodiment, although claimed subject matter is not limited in this respect, a particular depth may be chosen based, at least in part, on resources available at a computing device and/or computing platform for enumerating RPSTs at block 856 and associating numerals with enumerated RPSTs at block 858. Here, for example, blocks 856 and/or 858 may be capable of performing these operations for a smaller tree having a shorter depth with fewer computing resources than for a smaller tree having a longer depth. On the other hand, as discussed above, the particular predetermined depth used for identifying smaller trees may also be based, at least in part, on an expected size of a probe tree.

While nodes of a smaller tree may be determined based, at least in part, on a depth descending from a root node of the smaller tree in particular embodiments, such nodes of a smaller tree may be determined using other techniques and claimed subject matter is not limited in this respect. In one alternative embodiment, for example, one or more nodes of a smaller tree may be determined, at least in part, on node and/or edge label values associated with the one or more nodes. Here, for example, a node descending from a root node of a smaller tree may determined to be included in the smaller tree based, at least in part, on a node and/or edge label value associated with the descending. Again, this is merely another example of how descending nodes may be determined to be included as part of the smaller tree and claimed subject matter is not limited in this respect.

Process embodiments 800 and 850 will be illustrated by way of example with reference to FIGS. 10A, 10B and 11. Here, tree 900 comprises a target tree which expresses and/or represents hierarchical data. Trees 950 and 952, in this particular example, are probe trees representing pieces of information that are of interest. Block 802 represents the target tree 900 as one or more target numerals. Here, according to a particular embodiment, process embodiment 850 may identify smaller trees having a depth of two as A through E of the target tree 900 as illustrated above with reference to FIG. 10. Here, as illustrated in FIG. 10B, these smaller trees A through E may be associated with numerals according to the association of BELTs and numerals illustrated above with reference to FIG. 4 as follows:

A: 6586
B: 249
C: 12
D: 186
E: 6

However, it should be understood that these are numerals associated with smaller trees A through E according to a particular association of trees with numerals and that claimed subject matter is not limited in this respect.

For a particular embodiment, a "full tree" is defined as an integral tree comprising all of its nodes, edges coupling the nodes to one another and any labels associated with the nodes or edges. Therefore, a full tree includes all of its nodes and elements completely connected. Also, such a full tree may be represented by a numeral denoted here as "FT" according to an association of trees and numerals. The notation "{RPSTs:: FT}" provides a shorthand notation for this particular embodiment to indicate the set of unique, unordered RPSTs that may be formed from a full tree "FT." In one embodiment, the elements of {RPSTs:: FT} may comprise natural numerals representing corresponding member RPSTs.

Returning to process embodiment 850, in this particular example, blocks 854 through 862 may generate an array of numerals comprising numerals associated with RPSTs of smaller trees A through E. In particular, based at least in part on numerals associated with respective smaller trees A through E according to a particular association of trees and numerals, blocks 854 through 862 may form an array of target numerals to comprise {RPSTs:: 6586} U {RPSTs:: 249} U {RPSTs:: 12} U {RPSTs:: 186} U {RPSTs:: 6}. The discussion below with reference to FIGS. 8 through 18 describes a particular embodiment of a process for enumerating RPSTs to determine member numerals for the individual expressions {RPSTs:: 6586}, {RPSTs:: 249}, {RPSTs:: 12}, {RPSTs:: 186} and {RPSTs:: 6} corresponding with smaller trees A, B, C, D and E, respectively. The discussion below with reference to FIGS. 19 through 28 illustrates a particular numerical example for determining member numerals of {RPSTs:: 249} corresponding with smaller tree B in this particular embodiment. It should be understood that the process embodiment described with reference to FIGS. 8 through 18 may be similarly applied to determine member numerals of {RPSTs:: 249} and the remaining expressions corresponding with smaller trees A, C, D and E as follows:

A: {RPSTs:: 6586}={2, 3, 6, 7, 9, 13, 14, 18, 19, 21, 26, 37, 38, 39, 42, 49, 57, 74, 78, 89, 91, 98, 111, 114, 133, 169, 178, 182, 222, 247, 259, 266, 267, 338, 481, 494, 518, 534, 623, 703, 962, 1157, 1246, 1369, 1406, 2314, 2738, 3293, 6586};
B: {RPSTs:: 249}={2, 3, 5, 6, 11, 15, 17, 31, 33, 51, 83, 93, 249};
C: {RPSTs:: 12}={2, 3, 4, 6, 12};
D: {RPSTs:: 186}={2, 3, 4, 5, 6, 10, 11, 12, 15, 22, 30, 31, 33, 62, 66, 93, 166}; and
E: {RPSTs:: 6}={2, 3, 6}.

Probe trees 950 and 952, shown in FIG. 11, have a depth of two corresponding with the maximum depth of the smaller trees A through E. Returning to process embodiment 800 in this particular example, block 804 represents probe trees 950 and 952 (FIG. 11) as probe numerals. Here, probe trees 950 and 952 may be associated with numerals "31" and "26", respectively, according to an association of trees and numerals as illustrated with reference to FIG. 4 in this particular example (although probe trees 950 and 952 may be associated with different numerals according to a different association between trees and numerals). Accordingly, probe numerals determined at block 804 may comprise "31"

and "26" in this particular embodiment. Here, block 806 may determine a match of probe numeral "26" with a target numeral associated with an RSPT of smaller tree A, and determine a match of probe numeral "31" with a target numeral associated with an RSPT of smaller trees B and D. A match of probe numeral "26" may be graphically observed as a match of probe tree 952 with the PST of target tree 900 (in smaller tree A) formed by nodes 902, 904, 908 and 914, and binary labeled edges connecting these nodes. Similarly, a first match of probe numeral "31" may be graphically observed as a match of probe tree 950 with a first PST of tree 900 (in smaller tree B) formed by nodes 906, 910, 920 (and/or 922) and 924, and binary labeled edges connecting these nodes. A second match of probe numeral "31" may be graphically observed as a match of probe tree 950 with a second PST of tree 900 (in smaller tree D) formed by nodes 908, 916, 926 and 928, and binary labeled edges connecting these nodes.

The embodiments described above relate to, among other things, detecting a presence of a piece of information of interest in hierarchical data represented and/or expressed as a target tree. In other embodiments, although claimed subject matter is not limited in this respect, a location of the detected piece of information of interest may be determined. Here, particular elements of a target tree (e.g., nodes, edges and/or smaller trees) may themselves be associated with particular data locations in a hierarchical database, for example. As illustrated above, target numerals may be associated with particular smaller trees formed from a larger target tree. In addition to finding a match between a probe numeral and a target numeral generated from any of the smaller trees, process 800 may also provide an indication of which smaller tree produced matching target numeral(s). In the example above, for the purposes of illustration, probe numeral "26" matches a target numeral from smaller tree A and probe numeral "31" matches target numerals from smaller trees B and D. With smaller tree A being associated with a particular location in a database, in a particular example, matching probe numeral "26" with a target numeral from smaller tree A may indicate a location of information of interest in a location of the database associated smaller tree A. Similarly, with smaller trees B and D being associated with particular locations in a database, in a particular example, matching probe numeral "31" may indicate a location of information of interest in locations of the database associated with smaller trees B and D.

In one particular example of the above described process applied to biometric pattern recognition, although claimed subject matter is not limited in this respect, a known biometric pattern (e.g., facial features) may be modeled as hierarchical data in a target tree. One or more detected features of a subject or specimen may be modeled as hierarchical data in a probe tree. One or more target numerals may represent the known biometric pattern and a probe numeral may represent the detected features. A comparison of the target numerals with the probe numerals may then indicate whether the one or more detected features are present in the known biometric pattern upon detection of one or more matches.

In another particular example, the technique described above may be used for processing queries to an extensible markup language (XML) document or set of documents. Here, hierarchical data in an XML document or set of documents may be expressed and/or represented as one or more target trees. A query to the one or more XML documents may be represented as a probe tree. Applying the techniques above, according to a particular embodiment, the target tree representing the one or more XML documents may be represented as one or more target numerals and the probe tree may be represented as a probe numeral. The probe numerals, representing the probe tree and the query, may then be compared with the one or more target numerals, representing the target tree and hierarchical data in the one or more XML documents. Detecting a match with a probe numeral with one or more of the target numeral may indicate a presence of information in the one or more XML documents that is the subject of the query. However, this is merely a particular example of an application of the above described process and claimed subject matter is not limited in this respect.

Embodiments described above with reference to FIGS. 8 through 11 employ a particular example which represents and/or expresses hierarchical data in the form of a BELT. However, process embodiments 800 and 850 may employ representations of hierarchical data in other types of trees which are associated with numerals according to an association of trees and numerals. In other embodiments, for example, a target tree and/or probe tree may comprise node labeled trees, trees with neither edge nor node labels, or m-ary edge labeled trees having edges capable of storing, holding and/or representing three or more possible values. Regardless of a particular form of a target tree and/or probe tree in any particular embodiment, a target tree may be represented as one or more target numerals according to an association of trees and numerals. Information of interest, represented by a probe tree in the particular form for example, may similarly be represented as a probe numeral for comparison with the one or more target numerals.

Figure 12:
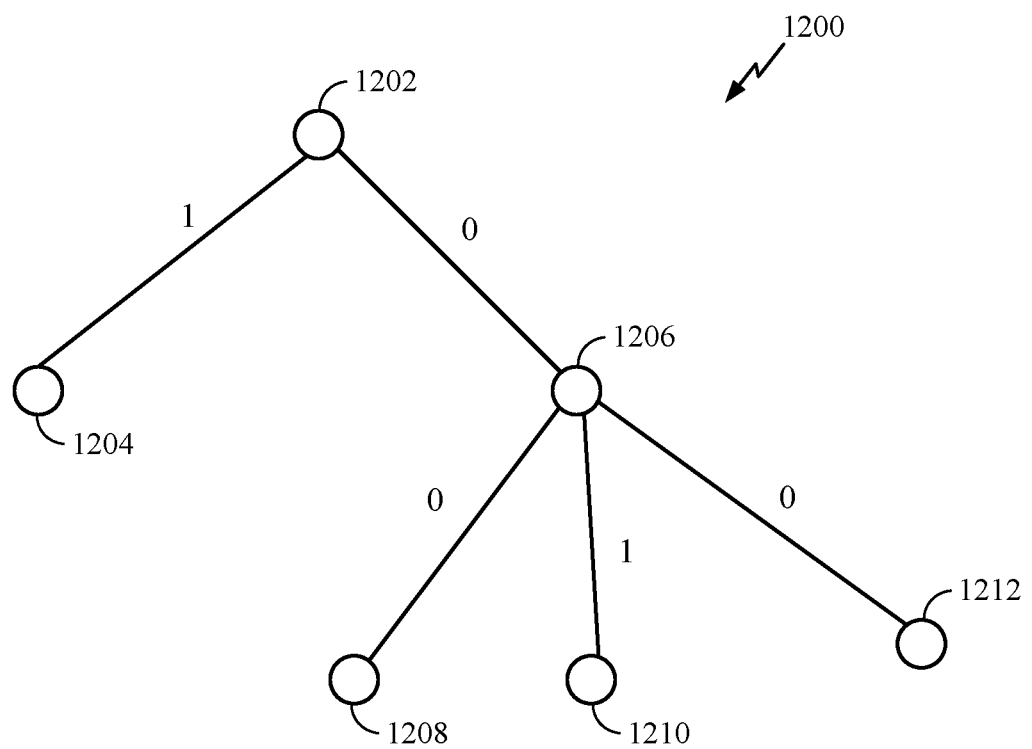

FIGS. 12 through 31 illustrate an embodiment of a process to enumerate RPSTs of a tree (e.g., a smaller PST of a target tree as illustrated above). As shown in FIGS. 12 through 15, where FT represents tree 1200, elements of {RPSTs:: FT} comprise the component RPSTs shown in FIGS. 13, 14 and 15 (among other component RPSTs as illustrated below). FIG. 12 is a schematic diagram of a tree 1200 illustrating, by way of example, RPSTs of tree 1200. Tree 1200 comprises a root node 1202 and nodes 1204, 1206, 1208, 1210 and 1212 coupled to the root node 1202 by edges and intermediate nodes. In the presently illustrated embodiment, tree 1200 comprises a BELT. It should be understood, however, that other types of trees (either labeled trees or unlabeled structure trees) may similarly comprise RPSTs and that claimed subject matter is not limited in this respect.

FIGS. 13, 14 and 15 are schematic diagrams of some RPSTs of tree 1200 according to an embodiment. These RPSTs include root node 1202 of tree 1200, at least one other node of tree 1200, and any edges or intermediate nodes in tree 1200 coupling the at least one other node to the root node 1202. However, it should also be understood that the set of RPSTs of tree 1200 may also include, for example, a single node 1202 or the full tree 1200. FIGS. 13 and 14 show RPSTs including root node 1202 and one other node in tree 1200 which connected via an edge in tree 1200 between root node 1202 and the one other node. FIG. 15 shows an RPST including root node 1202, nodes 1208, 1210 and 1212, and intermediate node 1206 coupling the root node 1202 to the nodes 1208, 1210 and 1212. It should be understood that FIGS. 13, 14 and 15 are merely examples of RPSTs that may be formed from tree 1200, and that these examples are not intended to provide an exhaustive enumeration of RPSTs that may be formed from tree 1200.

Figure 16:
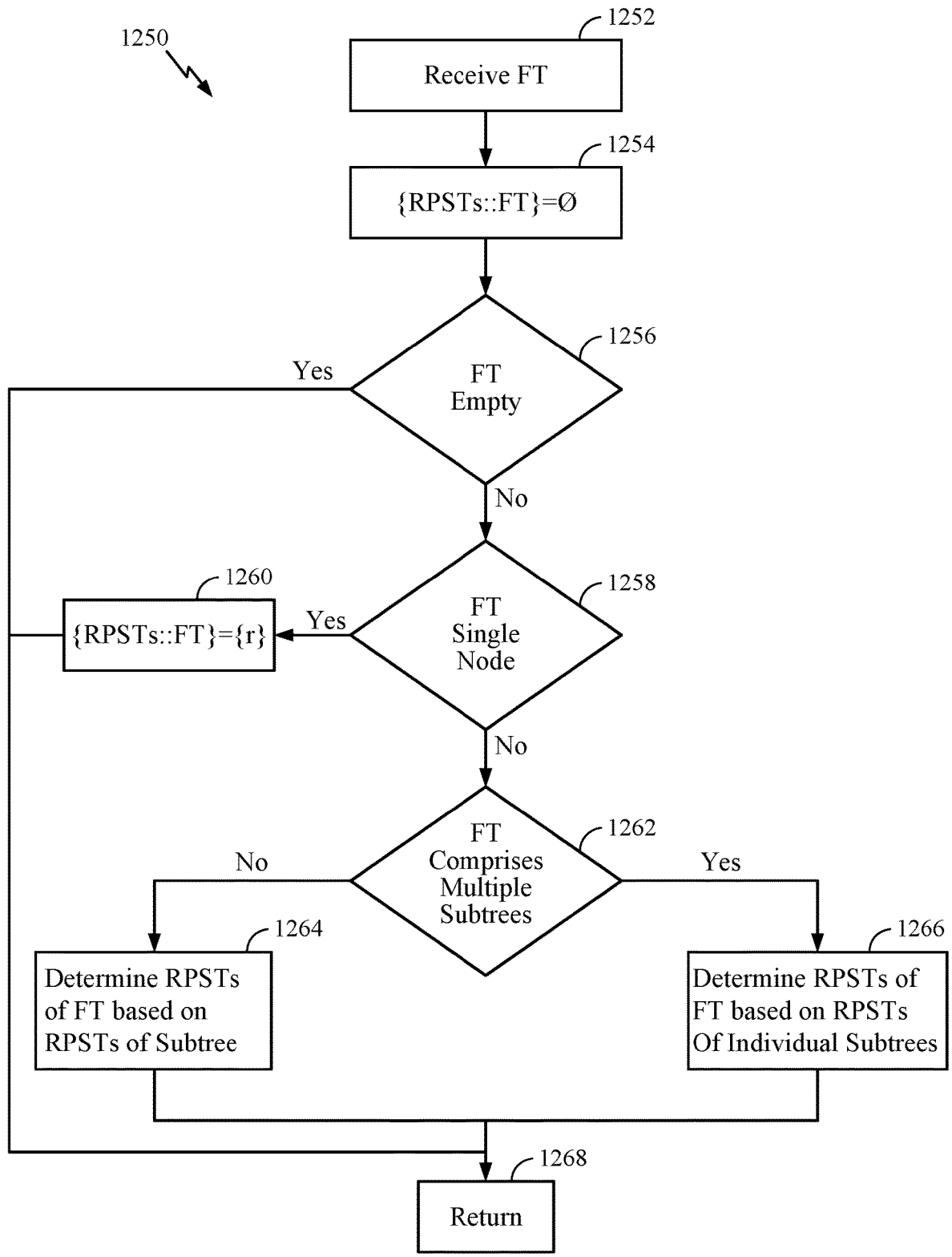
FIG. 16 is a flow diagram illustrating a process to enumerate RPSTs from a tree according to an embodiment.

FIG. 16 is a flow diagram illustrating a process 1250 to enumerate RPSTs from a tree according to an embodiment.

In this particular embodiment, the process 1250 may enumerate the RPSTs of full tree FT to define elements of {RPSTs:: FT} as a result. FT may be represented as a natural numeral received at block 1252. {RPSTs:: FT} may be initialized as the empty set at block 1254 to be subsequently filled with elements representing RPSTs enumerated in subsequent portions or process 1250.

According to an embodiment, the process 1250 recognizes that the full tree may represent any one of four different configurations: an empty tree; a single node tree; a tree comprising a single subtree connected to a root node of the full tree by an edge; and two or more subtrees connected to the root node of the full tree by respective edges. Accordingly, the process 1250 enumerates the RPSTs of the full tree based, at least in part, on the particular configuration of the full tree. Diamond 1256 determines whether FT represents an empty tree containing no nodes. If so, {RPSTs:: FT} remains defined as the empty set and process 1250 terminates at block 1268. If diamond 1258 determines that FT contains a single node tree, block 1260 updates {RPSTs:: FT} to include a natural numeral expressing a single node tree (here, {r}).

At diamond 1262 through block 1268, process 1250 enumerates RPSTs based, at least in part, on the configuration of the full tree as having either a single subtree connected to the root node of the full tree by an edge, or two or more subtrees connected to the root node by respective edges. If FT represents a single subtree connected to the root node of the full tree by an edge, block 1264 enumerates the RPSTs of the single subtree. Here, the RPSTs of the full tree may be determined, at least in part, from the RPSTs of the single subtree.

If FT represents a full tree having two or more subtrees connected to the root node of the tree by respective edges, block 1266 may enumerate the RPSTs of the individual ones of the two or more subtrees. At least some of the RPSTs of the full tree may be determined, at least in part, from RPSTs of the individual subtrees. Block 1266 may then enumerate additional RPSTs of the full tree based, at least in part, combinations of the enumerated RPSTs merged at the root node of the full tree.

According to an embodiment, blocks 1264 and 1266 may be carried out by recursive execution of at least a portion of the process 1250. At block 1264, for example, the single subtree of the full tree may itself comprise two or more subtree children connected by respective edges to a node. Block 1264 may execute portions of block 1266 to enumerate the RPSTs of the subtree based, at least in part, on RPSTs enumerated from individual ones of the subtree children of the single subtree. Similarly, block 1266 may enumerate RPSTs of individual ones of the subtrees connected to the root node of the full tree by executing portions of block 1264.

Figure 17:
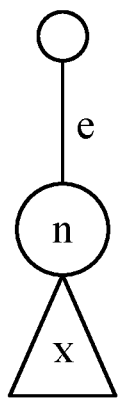
FIG. 17 is a schematic diagram illustrating a representation of an embodiment of a subtree according to an embodiment.

FIG. 17 is a schematic diagram illustrating a representation an embodiment of a subtree comprising an edge having a label "e" with a subtree root node having a label "n" where "e" and "n" may be represented by discrete values (e.g., Boolean, binary, integer, natural numeral and/or whole numeral values). A value associated with a "child tree" of the subtree may be represented by "x" which may represent information expressed as a natural numeral according to an association of natural numerals with trees as illustrated above with reference to FIG. 4. Like a tree, subtree and RPST, such a child tree may have properties of a tree and be associated with a natural numeral according to an association between trees and natural numerals. However, this is merely an example of a representation of a subtree and its child tree, and claimed subject matter is not limited in this respect.

As described below in connection with relation (1), a push operation may define a relationship between a subtree and a child tree of the subtree. As an association between trees and natural numerals may associate particular trees with natural numerals (e.g., as illustrated in FIG. 4), a push operation may define a relationship between a natural numeral associated with a subtree and a natural numeral associated with a child tree of the subtree. Similarly, a push operation may also define a relationship between natural numerals representing RPSTs of the child tree and natural numerals associated with at least some of the RPSTs of the subtree. A value of, or natural numeral associated with, the subtree shown in FIG. 17 may be expressed as the result of a push operation on the child tree having the value x. Such a push operation on the child tree may be represented in relation (1) as follows:

$$\text{push}(j,k,x) = P[kx+j-k+(2-r)], \text{ if } j < k \text{ and } k > 0 \quad (1)$$

where:
P(m)=Kleene enumeration function for generating a sequence of non-composite numerals illustrated with reference to FIG. 5;
k=total number of values possible for a label;
j=actual computed label index value;
x=value of, or natural numeral associated with, "pushed" child tree; and
r=defined value of tree system root/single node tree (e.g., either 0 or 1).

It should be understood that while the push operation of relation (1) is suitable for performing specific embodiments described herein, this push operation is merely an example of how a push operation may be performed and claimed subject matter is not limited in this respect. Additionally, it should be noted that the value of "r" is selected based upon a particular association of natural numerals and trees according to an association embodiment. Here, such an association of natural numerals may define a particular natural numeral to represent a tree comprising a single node. In the association of natural numeral with trees of FIG. 4, for example, the single node is associated with "1" defining r=1. However, this is merely an example of how a natural numeral may represent a single node for a particular association embodiment and claimed subject matter is not limited in this respect.

It should also be noted that "j" (the actual computed label index value associating the root node with the pushed subtree) is a function of the specific values of "e" (the specific edge label) and "n" (the specific node label). In the particular case of a BELT, for example, there may be no node values such that "j"="e". The value of "k" (total number of possible index values) may be determined as function of the possibilities of values of "e" (edge label value) and "n" (node label value) and, in a particular embodiment, "k" may be determined as the number of possibilities for "e" multiplied by the number of possibilities for "n." Again, in the particular case of a BELT, "k" equals the number of possibilities for the value "e" since there are no node labels.

The techniques described herein for enumerating RPSTs of a full tree may be applied to any particular type of tree. For illustration purposes, particular examples described herein are directed to enumerating RPSTs of a BELT. Accordingly, while it is understood that an actual computed index value associating the root node with the pushed subtree may be determined from node labels (having a value "n") and/or edge labels (having a value "e"), for simplicity the remaining discussion will denote the actual computed label index value "j" as an edge label value of an edge connecting a root node of a tree to a pushed child tree.

In enumerating at least some RPSTs of a tree based, at least in part, on enumerated RPSTs of a subtree of the RPST, it may be useful to express a push operation on multiple RPSTs in a single push operation. In addition to applying a push operation to a tree having a value x, the push operation may be applied to multiple trees or tree elements of a set (here, an unordered collection of elements representing trees, RPSTs, subtrees and/or child trees of a subtree) in relation (2) as follows:

$$\text{push}[j,k,\{a,b,c\}] = \{\text{push}(j,k,a)\} \cup \{\text{push}(j,k,b)\} \cup \{\text{push}(j,k,c)\} \quad (2)$$

where a, b and c are numerical representations of tree elements in the pushed set. The result of the operation of relation (2) may be referred to as a "pushed set" of tree elements.

Figure 18:
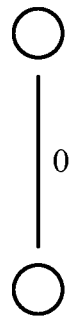
FIGS. 18 and 19 are schematic diagrams illustrating applications of one embodiment of a push operation according to an embodiment.
Figure 19:

FIGS. 18 and 19 illustrate applications of the push operation of relation (1) to specific subtrees. FIG. 18 shows a BELT having a value of "2" according to the association of trees and natural numerals shown in FIG. 4. As such, a push operation on this tree would define x=2, k=2 and r=1. FIG. 19 illustrates the result of a push of the tree in FIG. 18 by an edge having a label zero (i.e., a zero-push). The value of j for this push operation is zero. Accordingly, the push operation provides a numeral associated with the pushed BELT as follows:

$$\text{push}(j,k,x) = P[2*2+0-2+2-1] = P[3] = 5.$$

It should be understood, however, the application of the push operation of relation (1) to a BELT as illustrated in FIGS. 18 and 19 are merely particular examples of the push operation and the push operation may be similarly applied to non-BELT trees.

Figure 5:
FIG. 5 is a table illustrating a portion of the Kleene enumeration of non-composite numerals.

To enumerate RPSTs of a subtree of a full tree, it may be useful to determine a numeral associated with a child tree of the subtree based, at least in part, on a numeral associated with the subtree (the natural numerals being based, at least in part, on an association between trees and numerals). Like the push operation of relation (1), according to an embodiment, an "inverse push" operation may define a relationship between a subtree (e.g., a subtree of a parent full tree) and the child tree of the subtree (as illustrated in FIG. 13). Here, such an inverse push operation may define a relationship between numerals associated with such subtrees and numerals associated with respective child trees of such subtrees. Operating on such a natural numeral associated with a subtree (according to an association of trees with natural numerals as illustrated with reference to FIG. 4, for example), an inverse push operation may provide a natural numeral associated with a child tree portion. In a particular embodiment, an inverse push operation may provide as a result as (1) a natural numeral representing a child tree ("Child") and an edge label value linking the child tree with the root node of the parent full tree ("j"). For example, an inverse push operation on a tree may be represented in relation (3) as follows:

$$\text{push}^{-1}(r,k,ST) = <\text{Child},j>\text{Child} = \text{Int}[(P^{-1}(ST)+k-(2-r))/k]; \text{ and}$$

$$j = [P^{-1}(ST)+k-(2-r)] \text{ modulo}[k] \quad (3)$$

where:

$P^{-1}(h)$=an inverse of the Kleene enumeration function for generating a sequence of non-composite numbers illustrated with reference to FIG. 5;

ST=value of, or natural numeral associated with, subtree with edge label value "j";

Child=natural numeral representing child tree of subtree represented by ST;

j=edge label value linking the child tree with the root node of parent full tree;

k=total number of possible edge label index values linking the child tree with the root node of parent full tree; and r=defined value of tree system root/singleton node (either 0 or 1).

It should also be understood that the inverse push operation of relation (3) is merely an example of an inverse push operation used to determine a natural numeral associated with a child tree based, at least in part on a natural numeral associated with a parent subtree, and that claimed subject matter is not limited in this respect. For example, for simplicity relation (3) assumes that information of a computed index value "j" associating the root node of the parent full tree and the child tree may be derived from edge label values in the absence of node label values (e.g., as in the case of a BELT). However, relation (3) may be expanded to apply to other non-BELT trees. Applied to the tree of FIG. 17, for example, the inverse push operation of relation (3) may be expanded to yield a natural numeral representing the child tree as the value "x" and the label index value j (being a function of edge and node label values "e" and "n").

In the particular embodiment of an inverse push operation illustrated in relation (3), the inverse Kleene enumeration function, $P^{-1}(h)$, provides a result based upon ST (value of, or natural numeral associated with the subtree). Since the Kleene enumeration function generates non-composite natural numerals, the domain of $P^{-1}(h)$ may be limited to non-composite natural numerals. In connection with the association of natural numerals and trees illustrated with reference to FIG. 4, accordingly, the inverse push operation of relation (3) may be applied to natural numerals representing trees having a root node coupled to a single node (or having a single subtree connected to the root node). In one particular implementation of the inverse of the Kleene enumeration function, $P^{-1}(h)$, a look-up table may associate values of h and $P^{-1}(h)$ as shown in Table 1 as follows:

TABLE 1

| h | $P^{-1}$ (h) |
|---|---|
| 2 | 1 |
| 3 | 2 |
| 5 | 3 |
| 7 | 4 |
| 11 | 5 |
| 13 | 6 |
| 17 | 7 |
| 19 | 8 |
| 23 | 9 |
| 29 | 10 |
| 31 | 11 |
| 37 | 12 |
| 41 | 13 |
| 43 | 14 |
| 47 | 15 |
| 53 | 16 |
| 59 | 17 |
| 61 | 18 |
| 67 | 19 |

TABLE 1-continued

| h | P$^{-1}$ (h) |
|---|---|
| 71 | 20 |
| 73 | 21 |
| 79 | 22 |
| 83 | 23 |

To enumerate at least some of the RPSTs of a full tree having two or more subtrees connected to the root node of FT by different edges, it may be useful to determine combinations of RPSTs enumerated from the different subtrees. In the case of a full tree comprising two subtrees connected to the root node by two edges, in a particular example, individual elements of a first set of RPSTs of the full tree derived from a first subtree (denoted as "X" for the purposes of illustration) may be combined or merged with individual elements of a second set of RSPTs of the tree derived from a second subtree (denoted as "Y" for the purposes of illustration). Here, the elements of X and Y may represent individually enumerated RPSTs of the tree derived from the first and second subtrees, respectively. In a particular embodiment, the elements of X and Y may be represented as natural numerals associated with enumerated RPSTs derived from the respective first and second subtrees (according to an association of trees and natural numerals as illustrated in FIG. 4, for example). Accordingly, a merger of an RPST represented by an element in X with an RPST represented by an element in Y at the root node of the tree may be represented by a multiplication of these natural numerals resulting in a natural numeral representing the RPST resulting from the merger.

Figure 20:
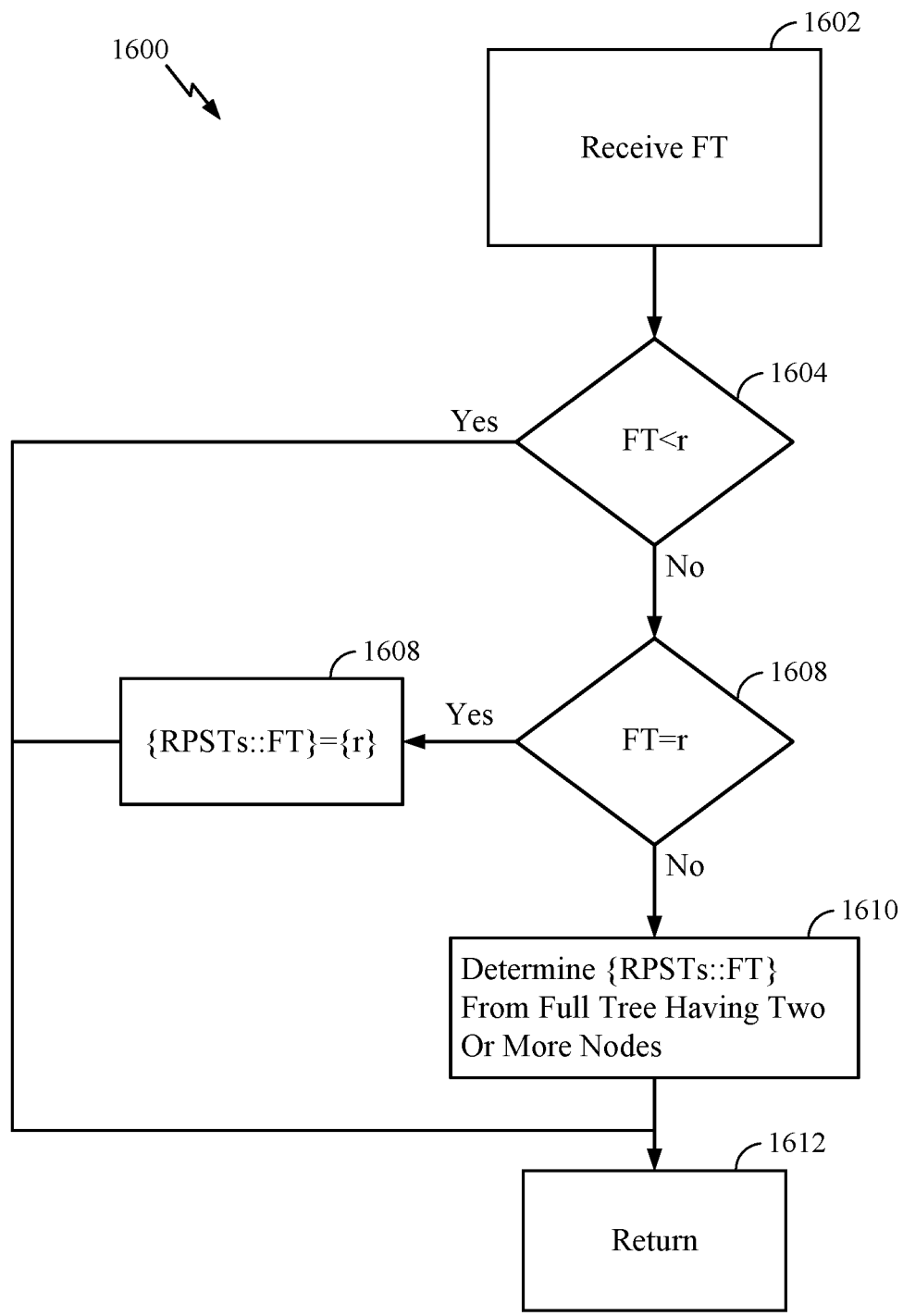
FIGS. 20, 21 and 22 are flow diagrams illustrating a process to enumerate RPSTs from a tree according to an embodiment.
Figure 21:
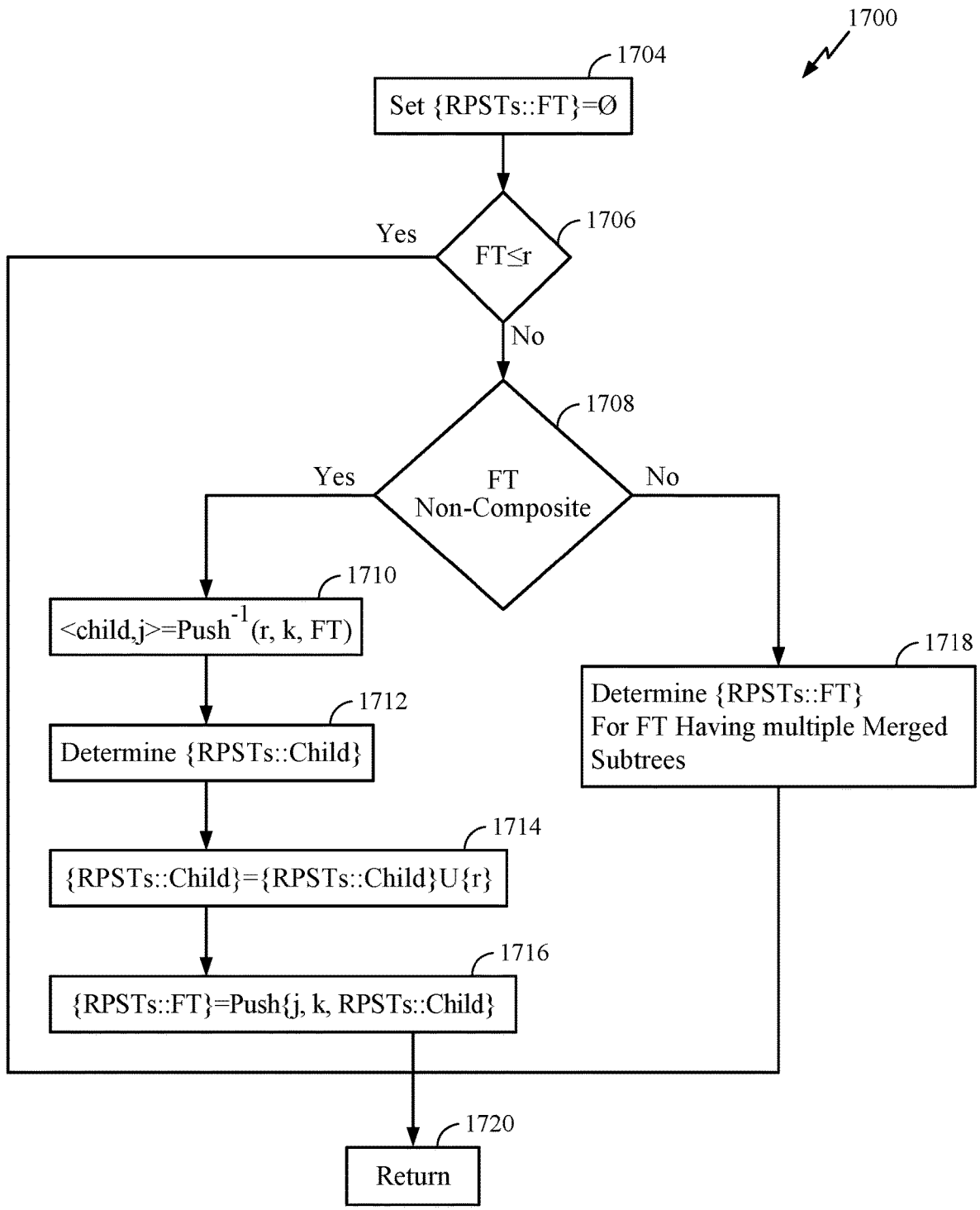
Figure 22:
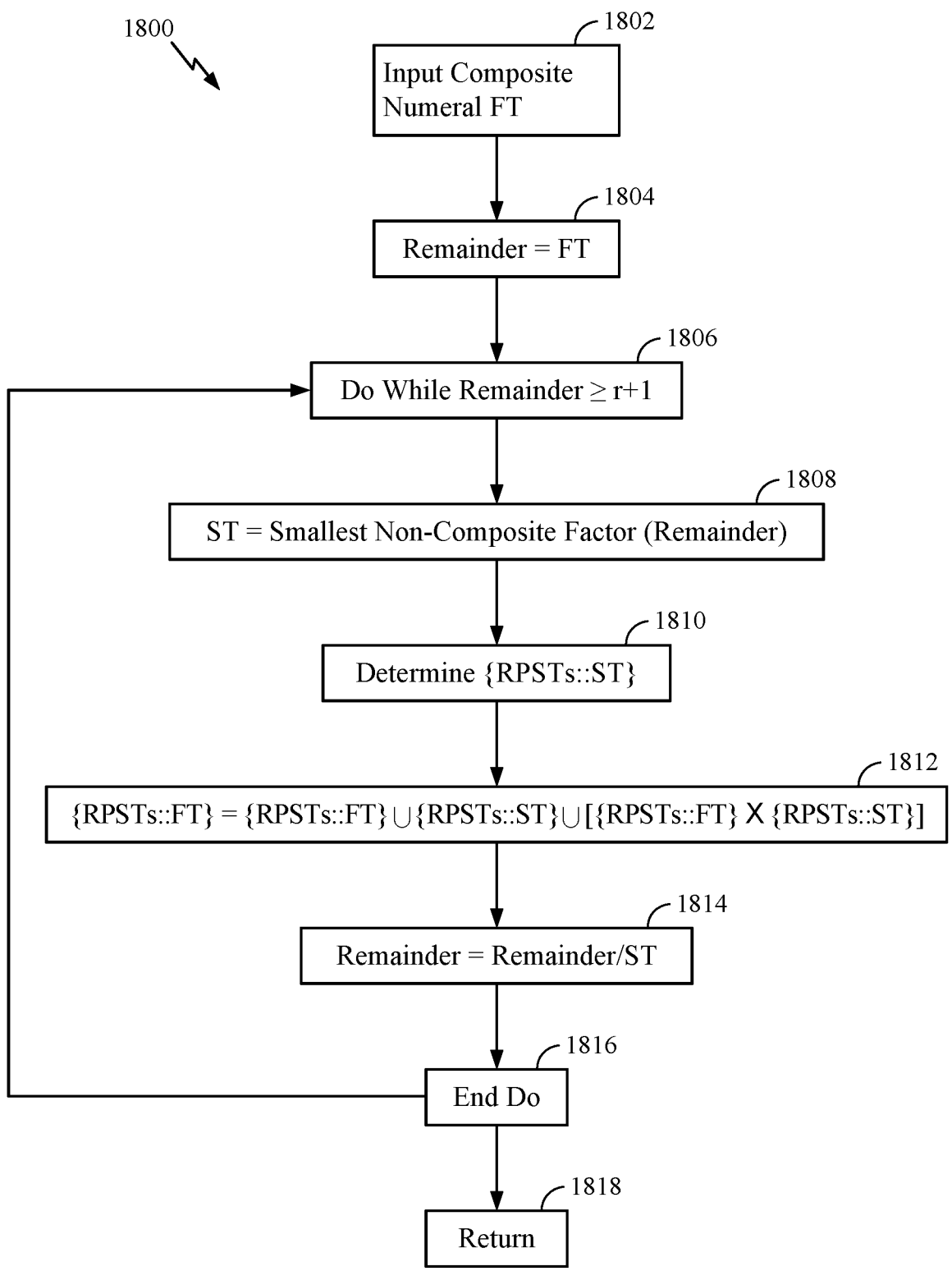

According to one embodiment, a merger operation discussed above (e.g., for combining trees at their root nodes to provide a graphical and numerical expression of the resulting merged trees) may be expanded to create a set merger operation to include a merger among RPSTs (e.g., derived from different subtrees as illustrated above). Here, a member RPST of a first set merges with a member RPST of a second set to provide a member of a third, merged set containing the merged RPSTs as elements, for all members of both first and second sets. Regarding the aforementioned representation of the RPSTs as natural numerals, the set merger operation to merge sets X and Y may be expressed as follows:

$$X \times Y = \{x_1, x_2, x_3, \ldots, x_n\} \times \{y_1, y_2, y_3, \ldots, y_m\} = \quad (4)$$

$$\{x_1 * y_1, x_1 * y_2, x_1 * y_3, \ldots, x_1 * y_m\} \cup$$

$$\{x_2 * y_1, x_2 * y_2, x_2 * y_3, \ldots, x_1 * y_m\} \cup \{x_3 * y_2, x_3 * y_2, x_3 * y_3,$$

$$\ldots, x_3 * y_m\} \cup \ldots \cup \{x_n * y_1, x_n * y_2, x_n * y_3, \ldots, x_n * y_m\}$$

where:

$x_1, x_2, x_3, \ldots x_n$ are the natural numerals representing RPSTs in set X; and $y_1, y_2, y_3, \ldots y_m$ are the natural numerals representing RPSTs in set Y;

FIGS. 20, 21 and 22 are flow diagrams illustrating a process to enumerate RPSTs from a full tree which applies the aforementioned push operations, inverse push operation and set merger operation of relations (1) through (4) according to a particular embodiment. FIG. 20 illustrates a process 1600 to receive a natural numeral representing a full tree, FT, at block 1602. Diamond 1604 may determine whether the tree represented by FT comprises an empty tree. In this particular embodiment, the value "r" is zero or one depending on whether a single node tree is associated with a value of zero or one (e.g., depending on a particular association embodiment defined above in connection with the push operation of relation (1)). Here, diamond 1604 determines whether the tree represented by FT is an empty tree based upon whether FT is less than r. However, this is merely an example of a technique to identify an empty tree and claimed subject matter is not limited in this respect. Process 1600 terminates at block 1612 if diamond 1604 determines that FT represents an empty tree. Diamond 1606 determines whether FT represents a single node tree based upon whether FT equals r. However, this is merely an example of a technique to identify a single node tree and claimed subject matter is not limited in this respect. If FT comprises a single node tree, block 1608 assigns r as the RPST element of {RPSTs:: FT} and the process 1600 terminates at block 1612.

Diamond 1606 determines whether FT comprises two or more nodes by determining whether FT is greater than r. If so, block 1610 may initiate execution of process 1700 shown in FIG. 21. Block 1704 initializes the set {RPSTs:: FT} to contain no elements while execution of the remaining portions of process 1700 may subsequently add elements to this set. As discussed below, process 1700 may be recursively executed to determine, for example, RPSTs of subtrees of the full tree represented by FT. Accordingly, diamond 1706 determines, much like diamond 1606 of process 1600, whether FT (e.g., in a recursive execution) represents a single node tree. If so, then process 1700 (and process 1600) terminate at block 1720.

If FT is greater than r, diamond 1708 determines whether FT represents a tree comprising a single subtree (e.g., comprising a child tree pushed from the full tree node by an edge as shown in FIG. 17) or a tree comprising a root node that merges two or more subtrees (e.g., as shown in FIG. 12). Here, diamond 1708 determines that FT represents a tree comprising a single subtree if FT comprises a non-composite numeral, and determines that FT represents a tree having a root node merging two or more subtrees if FT comprises a composite numeral. For this embodiment, an association between trees and natural numerals may associate composite natural numerals with trees merging two or more subtrees at a root node, and may associate non-composite numerals with trees comprising a single subtree (here, a pushed child tree coupled to the root node of the tree by an edge). However, this is merely an example of an association embodiment, and claimed subject matter is not limited in this respect.

Similar to the process 1250 illustrated above with reference to FIG. 16, process 1700 employs a process to enumerate the RPSTs of a full tree based, at least in part, on the configuration of the full tree. Here, it should be observed that block 1710 through 1716 collectively represent a process of enumerating RPSTs of a full tree having a single subtree connected to the root node of the full tree by a single edge. Process 1700 may employ a different process at block 1718 if the full tree comprises two or more subtrees merged at a root node. As illustrated below, the RPSTs of a full tree may be determined, at least in part, by an enumeration of RPSTs of child trees of subtrees. Accordingly, the process 1700 of enumerating RPSTs of a full tree may be recursively executed for determining such RPSTs of the child trees.

If diamond 1708 determines that FT represents a tree comprising a single subtree connected to a root node by a single edge, block 1710 executes an inverse push operation on FT as illustrated above in relation (3) to determine a natural numeral "child" representing the child tree coupled to the root node of the tree represented by FT (and edge label value "j" linking the root node with the child tree). At least some of the RPSTs of the tree represented by FT may be derived from RPSTs of the child tree determined at block 1710. Accordingly, block 1712 may recursively execute process 1700 to enumerate the RPSTs of the child tree ({RPSTs:: child}). Here, the recursively executed process may apply the natural numeral "child" representing the child tree (e.g., as determined at block 1710) as the FT input value. Block 1714 then combines the single node tree represented by "r" with the set of enumerated RPSTs determined at block 1712. Block 1716 then performs a push operation according to relation (2) on the elements of this combined set {RPSTs:: child} to complete the enumeration of the elements of {RPSTs:: FT} in a pushed set with the edge label value "j" determined from the inverse push operation at block 1710.

If diamond 1708 determines that FT represents a tree comprising a root node that merges two or more subtrees, block 1718 may enumerate the elements of {RPSTs:: FT} by executing a process 1800 shown in FIG. 22. As such, block 1718 may provide the composite numeral FT as an input value to process 1800 at block 1802. Subsequent blocks 1804 through 1818 may then enumerate RPSTs for individual subtrees merged at the root node of the tree represented by FT, and determine {RPSTs:: FT} from combinations of the RPSTs enumerated from particular ones of the merged subtrees.

A processing loop of blocks 1806 through 1816 incrementally factors the composite numeral FT into non-composite numerals "ST" representing individual subtrees merged at the root node of the tree represented by FT. Again, this particular embodiment includes an association between trees and natural numerals that associates composite natural numerals with trees merging two or more subtrees at a root node and associates non-composite numerals with trees having a root node coupled to a single pushed subtree; however, claimed subject matter is not limited in scope to this particular embodiment. Here, block 1804 initializes a "remainder" as FT and block 1808 determines the non-composite numeral ST as the smallest non-composite factor of the remainder. If the remainder is decreased to below r, representing a single node tree in this particular embodiment), sequential execution returns to process 1700 at block 1818.

Through successive executions of the processing loop of blocks 1806 through 1816, block 1808 may sequentially factor the numeral FT into non-composite numerals representing subtrees of the tree represented by FT and connected to a root node of FT. According to a particular association embodiment, these non-composite numerals may represent individual ones of subtrees merged at a root node of the tree represented by FT. As at least a portion of the RPSTs of the tree represented by FT may be determined from the RSPTs of these subtrees, block 1810 may recursively execute the process 1700 to enumerate the RPSTs of the subtrees represented by the non-composite values ST determined at block 1808.

It should be observed that the elements of {RPSTs:: FT} are derived from the RPSTs enumerated from individual subtrees (determined through loop iterations of block 1810). In addition to these elements, {RPSTs:: FT} also includes merged combinations of RPSTs derived from RPSTs enumerated from different subtrees at block 1810 in different loop iterations. Through executions of the loop of block 1806 through 1816, block 1812 updates {RPSTs:: FT}. By way of example, for the purpose of illustration, in an initial iteration of the loop, block 1812 may merely assign elements to {RPSTs:: FT} (which is initialized as the empty set) to include the RPSTs enumerated at block 1810 from a first subtree of the tree represented by FT. In a second iteration of the loop, block 1810 enumerates RPSTs of a second subtree of the tree represented by FT. In addition to adding the enumerated RPSTs of the second subtree to {RPSTs:: FT} (updated in the initial loop iteration to include RPSTs enumerated from the first subtree), block 1812 in the second iteration also updates {RPSTs:: FT} to include RPSTs formed from the merger of the current individual elements of {RPSTs:: FT} (again, updated from the initial iteration) with individual enumerated RPSTs of the second subtree. Here, block 1812 employs a set merger operation according to relation (4) to determine a merger of the current individual elements of {RPSTs:: FT} (e.g., assigning the elements of {RPSTs:: FT} to "X") with the individual elements of the enumerated RPSTs of the second subtree (e.g., assigning the elements of RPSTs of the second subtree to "Y"). Subsequent iterations of the processing loop of blocks 1806 through 1816 may then enumerate the RPSTs of additional subtrees, and update {RPSTs:: FT} based upon the elements of {RPSTs:: FT} updated in the previous iteration and the enumerated RPSTs of the subsequent subtree children in like fashion.

Figure 23:
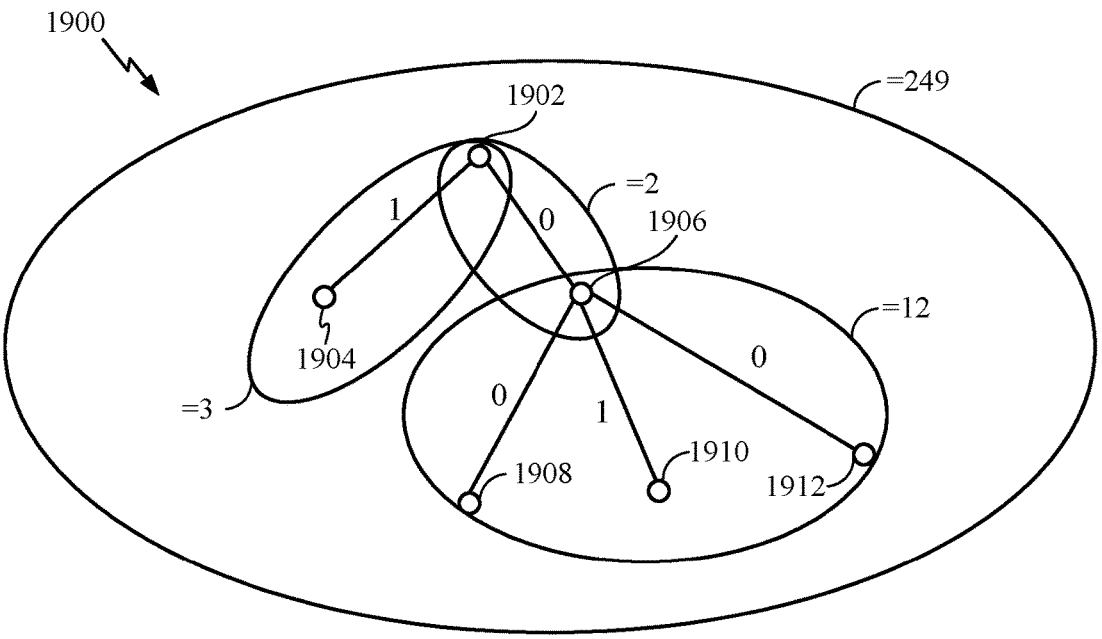
FIGS. 23 through 31 are schematic diagrams illustrating, by way of example, a process to enumerate RPSTs from a tree according to an embodiment.

FIGS. 23 through 31 are schematic diagrams of trees illustrating a specific example of enumerating RPSTs of a tree according to the process embodiments of FIGS. 20, 21 and 22. FIG. 23 shows a tree 1900 which comprises a BELT for this particular illustration of an embodiment, however, it should be understood that the processes described for enumerating RPSTs are applicable to non-BELT trees as well, and that claimed subject matter is not limited in this respect.

Tree 1900 may be represented as a numeral "249" according to an association of trees and natural numerals as described above with reference to FIG. 4, for example. As tree 1900 comprises two or more subtrees merged at a root node 1902, the natural numeral 249 comprises a non-composite natural numeral. Commencing execution of process 1600 for determining {RPSTs:: 249}, block 1602 defines FT=249. Since tree 1900 comprises a BELT in this particular embodiment, the value of "r" may be "1" consistent with the application of the push operation of relation (1). Accordingly, diamonds 1604 and 1606 direct initiating execution of process 1700 through block 1610.

Block 1704 initializes {RPSTs:: 249} as an empty set to be subsequently filled with natural numerals representing RPSTs of tree 1900. Since 249 (here, FT) comprises a composite natural numeral, block 1718 may initiate an instance of process 1800. Block 1804 initializes "remainder"=249 and block 1808 determines ST to be the natural numeral 3 (since 249 may be factored into two non-composite numerals 3 and 83).

Block 1810 may initiate a first recursive instance of process 1700 while providing FT=ST=3 as an input value, diamond 1708 determines that 3 is a non-composite numeral. Block 1710 performs an inverse push operation according to relation (3) to determine a natural numeral representative of the child tree of the subtree corresponding to the natural numeral 3 and an edge label value of an edge linking the child tree with the root node as follows:

$$\text{push}^{-1}(r = 1, k = 2, ST = 3) = \langle \text{child}, j \rangle \qquad (5)$$

$$\text{child} = Int\left[\left(P^{-1}(3) + 2 - (2 - 1)\right)/2\right]$$

-continued $$= Int[(2 + 2 - (2 - 1))/2]$$
$$= 1$$
$$j = [(P^{-1}(3) + 2 - (2 - 1)]modulo[2]$$
$$= [(2 + 2 - (2 - 1)]modulo[2]$$
$$= 1$$

Block 1712 initiates execution of a second recursive instance of process 1700, initializing {RPSTs:: child}=Ø and terminating at block 1720 through diamond 1706 (since child=1≤r). Returning to block 1714 of the first recursive instance of process 1700, {RPSTs:: child} is updated to be {r}={1} for this particular case of a BELT. Block 1716 then performs a push operation on the elements of the set {r} according to relation (2) (applying the edge label value j=1 as determined in relation (5) for block 1710) to provide an RPST, {3}, which is graphically illustrated in FIG. 24.

Execution of the initial instance of process 1800 then returns to block 1812 for updating {RPSTs:: FT} by including {RPSTs:: ST} (={3} as determined above) and merged combinations of the enumerated {RPSTs:: ST} with any other previously enumerated RPSTs according to relation (4). Since {RPSTs:: FT} at this point comprises an empty set, block 1812 merely updates {RPSTs:: FT} to include the single element of {RPSTs:: ST}. Block 1814 updates the remainder as FT/ST=249/3=83. This numeral corresponds to a subtree of tree 1900 formed by nodes 1902, 1906, 1908, 1910 and 1912 graphically illustrated as subtree 2100 in FIG. 25.

On a second iteration of the processing loop of blocks 1806 through 1816, block 1808 determines the non-composite factor of the remainder updated at block 1814 of the first iteration of the processing loop. Here, the natural numeral remainder, 83 as determined at block 1814 in the first iteration, comprises a non-composite numeral. Accordingly, block 1808 determines the natural numeral ST of the current iteration to be 83. Block 1810 then determines {RPSTs:: 83} by initiating a third recursive instance of process 1700. Since 83 is a non-composite natural numeral (as determined at diamond 1708), block 1710 determines the inverse push of 83 according to relation (3) as follows:

$$push^{-1}(r = 1, k = 2, ST = 83) = \langle child, j \rangle \quad (6)$$
$$child = Int[(P^{-1}(83) + 2 - (2 - 1))/2]$$
$$= Int[(23 + 2 - (2 - 1))/2]$$
$$= 12$$
$$j = [(P^{-1}(83) + 2 - (2 - 1)]modulo[2]$$
$$= [(23 + 2 - (2 - 1)]modulo[2]$$
$$= 0$$

Figure 26:
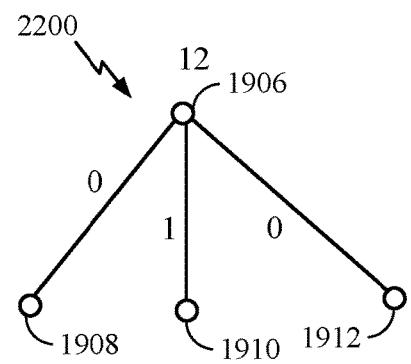

The result of this inverse push operation is graphically illustrated in FIG. 26 which includes a child tree 2200 of the subtree 2100 formed by the nodes 1906, 1908, 1910 and 1912. Block 1712 then determines {RPSTs:: 12} by initiating a fourth recursive instance of process 1700 (setting FT=child=12). Since the natural numeral "12" is a composite numeral (representing a tree which merges subtrees at a root node), block 1718 may determine {RPSTs:: 12} by initiating a first recursive instance of process 1800. As block 1804 sets remainder="12", block 1808 determines ST (the natural numeral representing a first merged subtree) as "2." Block 1810 may then determine {RPSTs:: 2} by initiating a fifth recursive instance of process 1700. Here, since "2" is a non-composite numeral (as determined at diamond 1708), block 1710 may determine the inverse push of "2" according to relation (3) as follows:

$$push^{-1}(r = 1, k = 0, ST = 2) = \langle child, j \rangle \quad (7)$$
$$child = Int[(P^{-1}(2) + 2 - (2 - 1))/2]$$
$$= Int[(1 + 2 - (2 - 1))/2]$$
$$= 1$$
$$j = [(P^{-1}(2) + 2 - (2 - 1)]modulo[2]$$
$$= [(1 + 2 - (2 - 1)]modulo[2]$$
$$= 0$$

Block 1712 may initiate a sixth recursive instance of process 1700 to determine {RPSTs:: 1}. Diamond 1706 of the sixth recursive instance of process 1700 may terminate and return {RPSTs:: 1}=Ø (i.e., the empty set). Returning to the fifth recursive instance of process 1700, block 1714 updates {RPSTs:: child} to include {r} ({r}={1} for this particular case where tree 1200 is a BELT). Accordingly, {RPSTs:: 2}=push {1}={2} (using the edge label value j=0 as determined at block 1710 of the fifth recursive instance of process 1700 and shown in relation (7)). This corresponds with the RPST 2300 of child tree 2200 formed by node 1906, and either node 1908 or 1912 as shown in FIG. 27.

Returning to block 1812 of the first recursive instance of process 1800, {RPSTs:: 12} is updated as {2}. The remainder is updated to be the natural numeral remainder/ST=12/2=6. Block 1808 determines ST to be the smallest non-composite factor of the updated remainder (here, "6") to be "2." As illustrated above in the fifth recursive instance of process 1700, block 1810 determines {RPSTs:: 2} to be {2} (again, corresponding with the RPST of subtree 2200 formed by node 1906, and either node 1908 or 1912). Block 1812 may then determine combinations of the previously enumerated elements of {RPSTs:: 12} with the elements of {RPSTs:: ST} using the set merger operation of relation (4) and update {RPSTs:: 12} as follows:

$$\{RPSTs::12\} = \begin{matrix} \{RPSTs::12\} \cup \{RPSTs::2\} \cup \\ [\{RPSTs::12\} \times \{RPSTs::12\}] \end{matrix} \quad (8)$$
$$= \{RPSTs::2\} \cup \{RPSTs::2\} \cup [\{RPSTs::2\} \times \{RPSTs::2\}]$$
$$= \{2\} \cup \{2\} \cup [\{2\} \times \{2\}]$$
$$= \{2, 4\}$$

Figure 27:
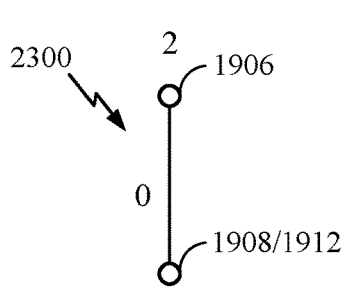
Figure 28:
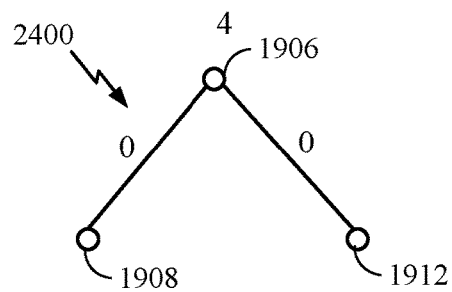
Figure 29:
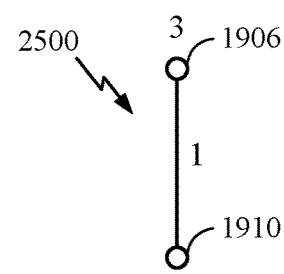

This updated {RPSTs:: 12} is graphically illustrated in FIG. 27 (illustrating the RPST 2300 of child tree 2200) and 28 (illustrating an RPST 2400 of subtree 2200 associated with the natural numeral 4).

Block 1814 then updates the remainder=remainder/ST=6/2=3, and the next iteration of the processing loop of blocks 1806 through 1816 determines ST as "3" at block 1808. Block 1810 may determine {RPSTs:: ST}={RPSTs:: 3}={3} as illustrated above in the first recursive instance of process 1700. This resulting RSPT of the child tree 2200 includes nodes 1906 and 1910 as shown in RPST 2500 of FIG. 29. Block 1812 then updates {RPSTs:: 12} (from {RPSTs:: 12}={2, 4} at relation (8)) as follows:

$$\{RPSTs::12\} = \{2, 4\} \cup \{3\} \cup [\{2, 4\} \times \{3\}] \quad (9)$$

$$= \{2, 3, 4\} \cup \{6, 12\} = \{2, 3, 4, 6, 12\}$$

Figure 30:
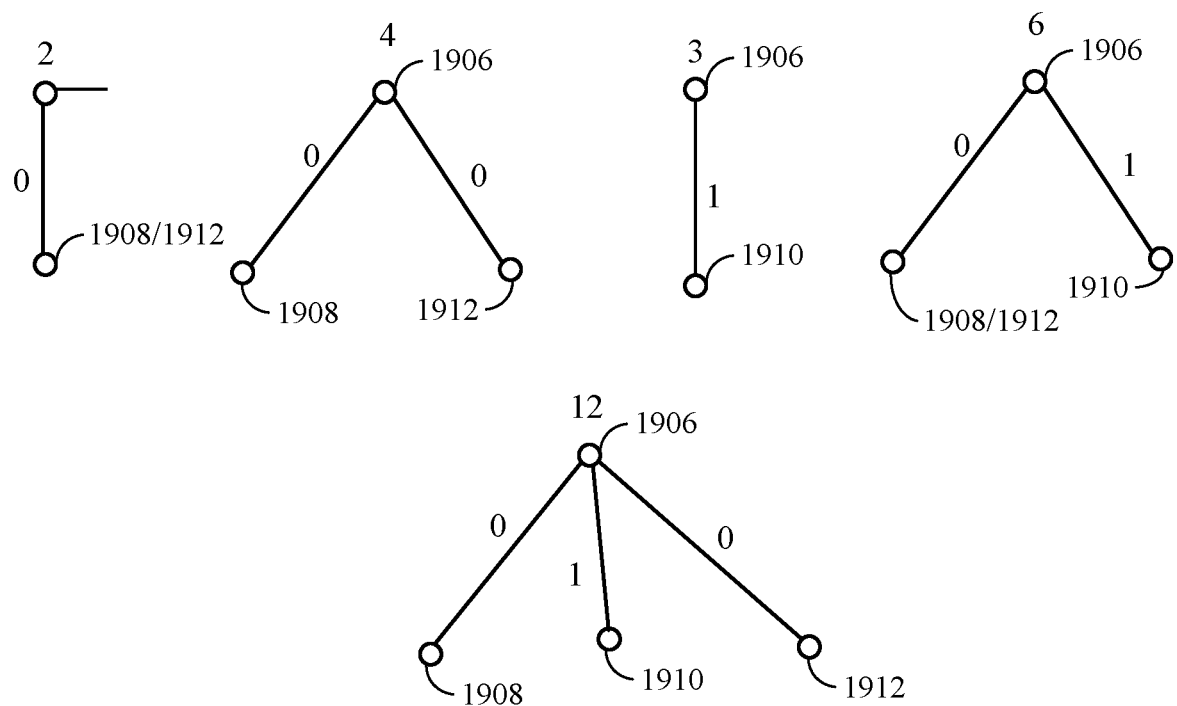

The resulting elements of {RPSTs:: 12} are graphically illustrated in FIG. 30 with corresponding nodes 1906, 1908, 1910 and 1912 of the child tree 2200 shown in FIG. 26. It should be noted that in the process of enumerating of elements of the set {RPSTs:: 12} at relations (8) and (9), duplicate RPSTs were enumerated for the RPST corresponding with numeral "4." Here, in listing the elements of the set {RPSTs:: 12} at relations (8) and (9) in this particular embodiment such a duplicate listing the RPST corresponding with the numeral "4" was not included so as to provide unique, unordered elements of the set {RPSTs:: 12}. However, this is merely a particular embodiment provided for illustration and claimed subject matter is not limited in this respect. For example, it should be readily appreciated that the process of enumerating RPSTs of a tree or subtree described herein may be readily applied alternative embodiments for enumerating RPSTs of a tree or subtree that includes such duplicated RPSTs. Again, this example of enumerating duplicate RPSTs is also merely an example provided for the purpose of illustration and claimed subject matter is not limited in this respect.

Returning to the third recursive instance of process 1700 (following the identification of 2200 as the child tree of RPST 2100 at block 1710 and the enumeration of the RPSTs of subtree 2200 as the elements of {RPSTs:: 12} in block 1712}), block 1714 updates {RPSTs:: child} to include {RPSTs:: 12} U {r}={1, 2, 3, 4, 6, 12}. Block 1716 may then complete the enumeration of the elements of {RPSTs:: 83} by performing a push operation on the elements of {RPSTs:: child} according to relation (2) (with label index value j=0 as determined in relation (6)) as follows:

$$\{RPSTs::83\} = \text{zero-push}(\{1,2,3,4,6,12\}) = \{2,5,11,17, 31,83\} \quad (10)$$

Figure 25:
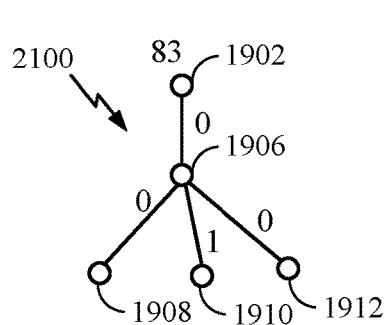

The resulting elements of {RPSTs:: 83} are graphically illustrated with reference to FIG. 31 with corresponding nodes 1902, 1906, 1908, 1910 and 1912 of the subtree 2100 shown in FIG. 25.

Figure 24:
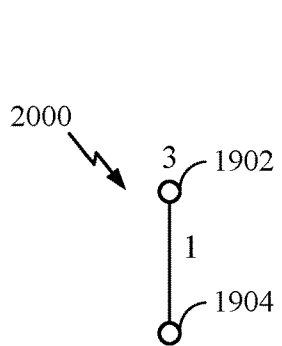
Figure 31:
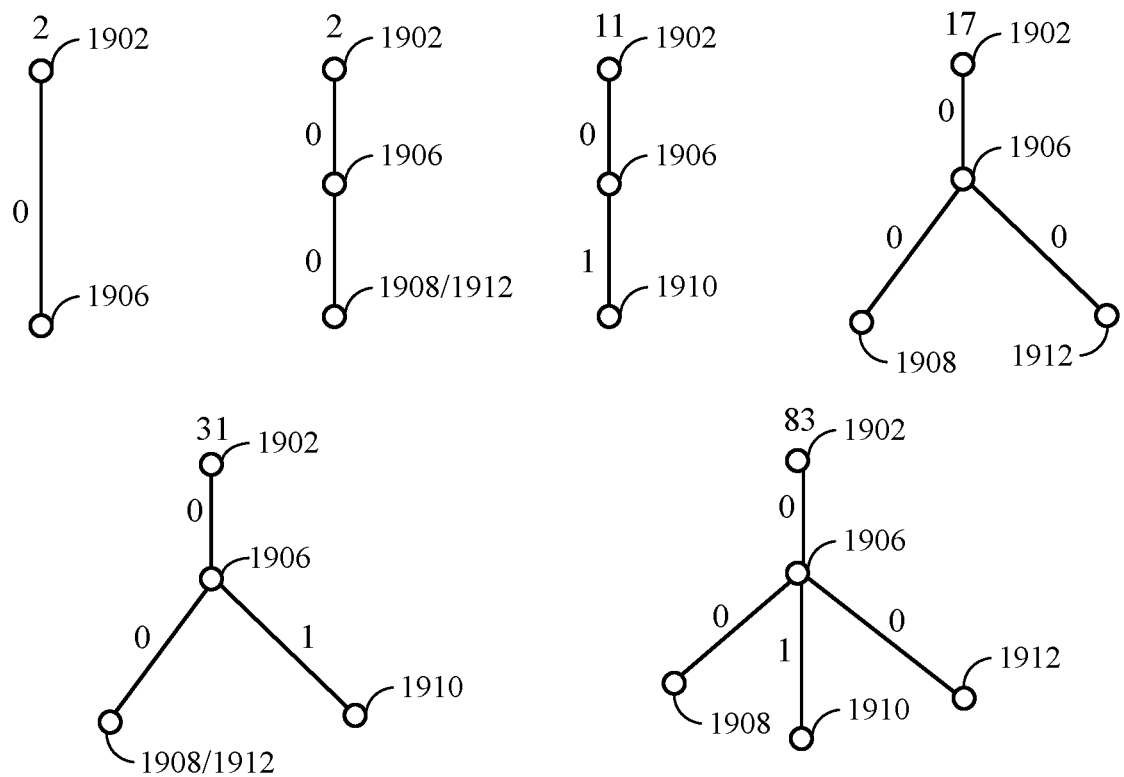

Returning to the initial instance of process 1800 (following the enumeration of elements in {RPSTs:: 3} corresponding with a first subtree merged at root node 1902 as graphically illustrated in FIG. 24 and the enumeration of elements in {RPSTs:: 83} corresponding with a second subtree merged at root node 1902 as graphically illustrated in FIG. 31), block 1812 updates {RPSTs:: FT} as follows:

$$\{RPSTs::FT\} = \frac{\{RPSTs::3\} \cup \{RPSTs::83\} \cup}{[\{RPSTs::3\}] \times \{RPSTs::83\}} \quad (11)$$

$$= \{2, 3, 5, 11, 17, 31, 83\} \cup [\{3\} \times \{2, 5, 11, 17, 31, 83\}]$$

$$= \{2, 3, 5, 11, 17, 31, 83\} \cup \{6, 15, 33, 51, 93, 249\}$$

$$= \{2, 3, 5, 6, 11, 15, 17, 31, 33, 51, 83, 93, 249\}$$

While the above illustrated example is a specific case of enumerating RPSTs from one particular BELT (associated with the natural numeral 249), it should be understood that the processes are general enough to enumerate RPSTs for any tree. Also, while the illustrated example is specifically directed to enumerating RPSTs of a BELT, claimed subject matter is not limited to this specific example or specifically to BELTs.

It should also be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
   accessing a first set of instructions from one or more physical memory devices for execution by one or more processors;
   executing the first set of instructions accessed from the one or more physical memory devices by the one or more processors;
   storing, in at least one of the physical memory devices, at least one target value resulting from having executed the first set of instructions on the one or more processors, wherein the one or more physical memory devices also store a database, wherein the at least one target value corresponds to at least some content within the database;
   accessing a second set of instructions from one or more physical memory devices for execution by one or more processors;

executing the second set of instructions accessed from the one or more physical memory devices by the one or more processors;

wherein the executing the second set of instructions comprises:

transforming a query into a first hierarchically structured tree query;

processing the first hierarchically structured tree query in relation to the database, wherein the processing comprises comparing the first hierarchically structured tree query with the at least one target value; and performing a fetch operation on the at least some content within the database, wherein the fetch operation occurs when there is a correspondence between the first hierarchically structured tree query and the at least one target value, wherein the fetch operation on the at least some content within the database comprises a response, the response comprising a hierarchically structured target tree, and wherein the target value is associated with the hierarchically structured target tree.

2. The method of claim 1, wherein the query comprises a second hierarchically structured tree query.

3. The method of claim 1, wherein the query comprises a query string.

4. The method of claim 1, wherein the executing the first set of instructions further comprises:

locating the at least some content within the database.

5. The method of claim 1, wherein the at least one target value comprises at least one numeral.

6. The method of claim 1, wherein the at least one target value comprises numerical data.

7. The method of claim 1, wherein comparing the first hierarchically structured tree query with the at least one target value comprises comparing a tree structure of the first hierarchically structured tree query with the at least one target value.

8. The method of claim 1, wherein comparing the first hierarchically structured tree query with the at least one target value comprises comparing at least one subtree of the first hierarchically structured tree query with the at least one target value.

9. The method of claim 1, wherein comparing the first hierarchically structured tree query with the at least one target value comprises comparing at least one node of the first hierarchically structured tree query with the at least one target value.

10. The method of claim 1, wherein comparing the first hierarchically structured tree query with the at least one target value comprises comparing at least one edge of the first hierarchically structured tree query with the at least one target value.

11. The method of claim 1, wherein the first hierarchically structured tree query comprises information of interest, and wherein comparing the first hierarchically structured tree query with the at least one target value comprises comparing the information of interest with the at least one target value.

12. The method of claim 1, wherein the at least one target value comprises an array of target values, and wherein comparing the first hierarchically structured tree query with the at least one target value comprises comparing the first hierarchically structured tree query with the array of target values.

13. The method of claim 1, wherein the first hierarchically structured tree query or portion thereof is associated with at least one probe value, and wherein comparing the first hierarchically structured tree query with the at least one target value comprises comparing the at least one probe value with the at least one target value.

14. The method of claim 13, wherein the first hierarchically structured tree query or portion thereof being associated with the at least one probe value comprises a query tree structure of the first hierarchically structured tree query or a portion thereof being associated with the at least one probe value.

15. The method of claim 13, wherein the first hierarchically structured tree query or portion thereof being associated with the at least one probe value comprises at least one query subtree of the first hierarchically structured tree query or a portion thereof being associated with the at least one probe value.

16. The method of claim 13, wherein the first hierarchically structured tree query or portion thereof being associated with the at least one probe value comprises at least one node of the first hierarchically structured tree query or a portion thereof being associated with the at least one probe value.

17. The method of claim 13, wherein the first hierarchically structured tree query or portion thereof being associated with the at least one probe value comprises at least one edge of the first hierarchically structured tree query or a portion thereof being associated with the at least one probe value.

18. The method of claim 13, wherein the first hierarchically structured tree query comprises information of interest, and wherein the first hierarchically structured tree query or portion thereof being associated with the at least one probe value comprises the information of interest being associated with the at least one probe value.

19. The method of claim 1, wherein the least one target value being associated with the hierarchically structured target tree comprises the at least one target value being associated with a target tree structure of the hierarchically structured target tree.

20. The method of claim 1, wherein the least one target value being associated with the hierarchically structured target tree comprises the at least one target value being associated with at least one target subtree of the hierarchically structured target tree.

21. The method of claim 1, wherein the least one target value being associated with the hierarchically structured target tree comprises the at least one target value being associated with at least one target node of the hierarchically structured target tree.

22. The method of claim 1, wherein the least one target value being associated with the hierarchically structured target tree comprises the at least one target value being associated with at least one target edge of the hierarchically structured target tree.

23. The method of claim 1, wherein hierarchically structured target tree comprises target data, and wherein the at least one target value being associated with the hierarchically structured target tree comprises the at least one target value being associated with the target data.

24. The method of claim 1, wherein at least a portion of the at least some content within the database comprises a hierarchical structure.

25. The method of claim 1, wherein the correspondence between the first hierarchically structured tree query and the at least one target value comprises a match between the first hierarchically structured tree query and the at least one target value.

* * * * *